US010666486B2

(12) United States Patent
Kohda

(10) Patent No.: US 10,666,486 B2
(45) Date of Patent: May 26, 2020

(54) RECEIVER METHOD, RECEIVER, TRANSMISSION METHOD, TRANSMITTER, TRANSMITTER-RECEIVER SYSTEM, AND COMMUNICATION APPARATUS

(71) Applicant: RADIUS CO., LTD., Tokyo (JP)

(72) Inventor: Tohru Kohda, Fukuoka (JP)

(73) Assignee: radius co., ltd., Tokyo (JP)

( * ) Notice: Subject to any disclaimer, the term of this patent is extended or adjusted under 35 U.S.C. 154(b) by 0 days.

(21) Appl. No.: 16/369,053

(22) Filed: Mar. 29, 2019

(65) Prior Publication Data

US 2019/0229972 A1 Jul. 25, 2019

Related U.S. Application Data

(63) Continuation of application No. PCT/JP2018/024592, filed on Jun. 28, 2018.

(30) Foreign Application Priority Data

Jan. 22, 2018 (WO) .................. PCT/JP2018/001735

(51) Int. Cl.
*H04L 27/26* (2006.01)
*H04B 1/7075* (2011.01)
*H04B 1/7093* (2011.01)
*H04L 27/32* (2006.01)

(52) U.S. Cl.
CPC ....... *H04L 27/2669* (2013.01); *H04B 1/7093* (2013.01); *H04B 1/70757* (2013.01); *H04L 27/2602* (2013.01); *H04L 27/2657* (2013.01); *H04L 27/2662* (2013.01); *H04L 27/2679* (2013.01); *H04L 27/32* (2013.01)

(58) Field of Classification Search
CPC . H04L 27/2669; H04L 27/2679; H04L 27/32; H04L 27/2662; H04L 27/2602; H04L 27/2657; H04B 1/70757; H04B 1/7093
See application file for complete search history.

(56) References Cited

U.S. PATENT DOCUMENTS

| 5,970,047 | A | 10/1999 | Suzuki |
| 9,900,048 | B2 * | 2/2018 | Hadani ................. H04L 5/0016 |
| 2004/0101048 | A1 | 5/2004 | Paris |

(Continued)

FOREIGN PATENT DOCUMENTS

| EP | 2670102 A1 | 4/2013 |
| EP | 2330762 B1 | 2/2014 |

(Continued)

OTHER PUBLICATIONS

KIPO, Search Report for South Korean Patent Application No. 10-2019-7009104, dated Apr. 9, 2019.

(Continued)

*Primary Examiner* — Kenneth T Lam
(74) *Attorney, Agent, or Firm* — NK Patent Law

(57) ABSTRACT

In accordance with an embodiment of the present invention, a method for receiving a signal, comprising the estimation step for estimating time and frequency shifts that are embedded in the received signal, to cancel-out shifts, wherein the method refers to the non-commutative shift parameter space of co-dimension 2.

16 Claims, 15 Drawing Sheets

(56) References Cited

U.S. PATENT DOCUMENTS

Figure 1:
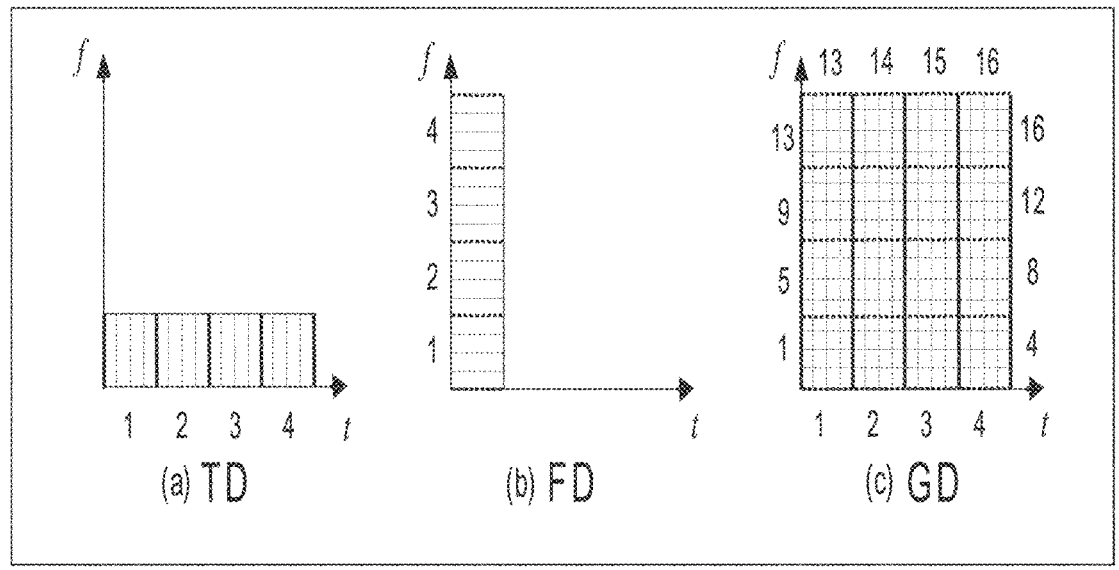

| | | | |
|---|---|---|---|
| 2007/0019763 A1* | 1/2007 | Kim | H04L 27/2679 375/346 |
| 2011/0096680 A1 | 4/2011 | Lindoff et al. | |
| 2011/0292971 A1 | 12/2011 | Hadani et al. | |
| 2011/0292994 A1 | 12/2011 | Lim et al. | |
| 2011/0293030 A1* | 12/2011 | Rakib | H04L 5/0016 375/267 |
| 2012/0201322 A1 | 8/2012 | Rakib et al. | |
| 2012/0207254 A1 | 8/2012 | Park et al. | |
| 2013/0154642 A1 | 6/2013 | Sueoka | |
| 2014/0161154 A1 | 6/2014 | Hadani et al. | |
| 2014/0169385 A1 | 6/2014 | Hadani et al. | |
| 2014/0169406 A1 | 6/2014 | Hadani et al. | |
| 2014/0169433 A1 | 6/2014 | Hadani et al. | |
| 2014/0169436 A1 | 6/2014 | Hadani et al. | |
| 2014/0169437 A1 | 6/2014 | Hadani et al. | |
| 2014/0169441 A1 | 6/2014 | Hadani et al. | |
| 2015/0078438 A1 | 3/2015 | Lim et al. | |
| 2015/0117395 A1 | 4/2015 | Hadani et al. | |
| 2015/0160842 A1 | 6/2015 | Yabuki | |
| 2015/0326273 A1 | 11/2015 | Rakib et al. | |
| 2015/0327085 A1 | 11/2015 | Hadani et al. | |
| 2016/0043835 A1 | 2/2016 | Hadani et al. | |
| 2016/0182269 A1 | 6/2016 | Hadani et al. | |
| 2016/0191217 A1 | 6/2016 | Hadani et al. | |
| 2016/0191280 A1 | 6/2016 | Hadani et al. | |
| 2016/0330454 A1 | 11/2016 | Lim et al. | |
| 2016/0381576 A1 | 12/2016 | Hadani et al. | |
| 2017/0012749 A1 | 1/2017 | Rakib et al. | |
| 2017/0012810 A1 | 1/2017 | Rakib et al. | |
| 2017/0033899 A1 | 2/2017 | Rakib et al. | |
| 2017/0078054 A1 | 3/2017 | Hadani et al. | |
| 2017/0099122 A1 | 4/2017 | Hadani et al. | |
| 2017/0099607 A1 | 4/2017 | Hadani et al. | |
| 2017/0149594 A1 | 5/2017 | Rakib et al. | |
| 2017/0149595 A1 | 5/2017 | Rakib et al. | |
| 2017/0201354 A1 | 7/2017 | Hadani et al. | |
| 2017/0207817 A1 | 7/2017 | Hadani et al. | |
| 2017/0222700 A1 | 8/2017 | Hadani et al. | |
| 2017/0230215 A1 | 8/2017 | Rakib et al. | |
| 2017/0244524 A1 | 8/2017 | Hadani et al. | |
| 2017/0288710 A1* | 10/2017 | Delfeld | H04L 25/0222 |
| 2017/0303146 A1 | 10/2017 | Hadani et al. | |
| 2017/0324601 A1 | 11/2017 | Hadani et al. | |
| 2017/0346665 A1 | 11/2017 | Hadani et al. | |
| 2018/0109284 A1 | 4/2018 | Hadani et al. | |
| 2018/0205481 A1 | 7/2018 | Shlomo et al. | |
| 2018/0227159 A1 | 8/2018 | Rakib et al. | |
| 2018/0242170 A1 | 8/2018 | Hadani et al. | |
| 2018/0262306 A1 | 9/2018 | Hadani et al. | |
| 2018/0332294 A1 | 11/2018 | Lim et al. | |

FOREIGN PATENT DOCUMENTS

| | | |
|---|---|---|
| JP | 2012170083 A | 9/2012 |
| JP | 2013126508 A | 6/2013 |
| JP | 2013251902 A | 12/2013 |
| JP | 2016189500 A | 11/2016 |
| JP | 2016189501 A | 11/2016 |
| JP | 2016189502 A | 11/2016 |
| KR | 20130109976 A | 10/2013 |
| KR | 20150029721 A | 3/2015 |
| RU | 2549359 C2 | 12/2013 |
| WO | WO2008052192 A1 | 5/2008 |
| WO | WO2010095889 A2 | 8/2010 |
| WO | 2012153732 A1 | 11/2012 |
| WO | 2013183722 A1 | 12/2013 |
| WO | 2014034664 A1 | 3/2014 |
| WO | 2015110155 A1 | 7/2015 |
| WO | 2016183230 A1 | 11/2016 |
| WO | WO2017196220 A1 | 11/2017 |

OTHER PUBLICATIONS

T. Khoda, Y. Jitsumatsu, and K. Aihara, "PLL-free Receiver for Gabor Division/Spread Spectrum System", Networking and Communications (WiMob), 2013, pp. 662-669.

T. Khoda, Y. Jitsumatsu, and K. Aihara, "Signals that can be easily time-frequeny synchronized from their ambiguity function", 2013 IEEE Information Theory Workshop (ITW), Sep. 2013, 5 pages.

Moyal, J.E., "Quantum mechanics as a Statistical Theory", Proceedings of the Cambridge Philosophical Society, 1949, pp. 99-124, vol. 45.

Blahut, R.E., "Theory of Remote Image Formation", Cambridge University Press, Nov. 18, 2004, 1 edition. pp. 208-209 and 221.

Fettweis, G.P.,"Designing a Possible 5G Phy with GFDM", 5GPHY-WS-at-Globecom, Dec. 8, 2014, 43 pages.

Matz, Gerald, et al., "Time-Frequency Foundations of Communications: Concepts and Tools", IEEE Signal Processing Magazine, Nov. 2013, pp. 87-96, vol. 30, No. 6.

Oppenheim, A.V., et al., "The Importance of Phase in Signals", Proceedings of the IEEE, May 1981, pp. 529-541, vol. 69, No. 5.

Montgomery, W.D., "Restoration of images processing a finite Fourier series", Optics Letters, 1982, pp. 54-56, vol. 7, No. 2.

Montgomery, W.D., "Optical applications of von Neumann's alternating-projection theorem", Optics Letters, 1982, pp. 1-3, vol. 7, Issue 1.

Lee, Tai Sing, "Image representation using 2d Gabor wavelets", IEEE Transactions on Pattern Analysis and Machine Intelligence, Oct. 1996, pp. 1-13, vol. 18, No. 10.

Jones, J.P., et al., "An Evaluation of the Two-Dimensional Gabor Filter Model of Simple Receptive Fields in Cat Striate Cortex", Journal of Neurophysiology, Dec. 1987, pp. 1233-1258, vol. 58, No. 6.

Feichtinger, Hans G., et al., "Gabor Analysis and Algorithms", Birkhauser, 1998 edition, pp. 22-23 and 462-263.

Movella, Javier R., "Tutorial on Gabor Filters", Retrieved May 14, 2008, Original tutorial dated: 1996, Amended: 2002 and 2008, 23 pages.

Daugman, J.G., "Complete Discrete 2-D Gabor Transforms by Neural Networks for Image Analysis and Compression", IEEE Transactions on Acoustics, Speech and Signal Processing, Jul. 1998, pp. 1169-1179, vol. 36, No. 7.

Daugman, J.G., "Two-Dimensional Spectral Analysis of Cortical Receptive Field Profiles", Vision Research, 1980, pp. 847-856, vol. 20.

T. Khoda, Y. Jitsumatsu, and K. Aihara, "Frequency synchronisation using SS technique", 2012 International Symposium on Wireless Communication Systems, ISWCS, 2012, pp. 855-859.

T. Khoda, Y. Jitsumatsu, and K. Aihara, "Frequency-division spread spectrum makes frequency synchronisation easy", GLOBECOM—IEEE Global Telecommunications Conference, 2012, 7 pages.

Jitsumatsu, Y., Kohda,T., "Digital phase updating loop and delay-Doppler space division multiplexing for higher order MPSK", M. Jonnsson et al, (Eds.) MACOM 2014, LNCS 8715, Aug. 27-28, 2014, pp. 1-15, Springer International Publishing.

T. Khoda, Y. Jitsumatsu, and K. Aihara, "Phase-tuned layers with multiple 2D SS codes realize 16PSK communication", IEEE Wireless Communications Networking Conference, WCNC 2014, pp. 457-462.

T. Khoda, Y. Jitsumatsu, and K. Aihara, "Recovering noncoherent MPSK signal with unknown delay and Doppler using its ambiguity function", 2013 13th International Conference on ITS Telecommunications (ITST), 2013. pp. 251-256.

Jitsumatsu, Y., Kohda,T., Aihara, K., "Delay-Doppler space division-based multiple-access solves multiple-target detection", M. Jonnsson et al, (Eds.) MACOM 2013 LNCS 8310, 2013, pp. 39-53, Springer International Publishing.

Jitsumatsu, Y., Kohda,T., Aihara, K., "Spread Spectrum-based Cooperative and individual time-frequency synchronization", The Tenth International Symposium on Wireless Communication Systems (ISWCS), 2013, pp. 497-501.

T. Khoda, Y. Jitsumatsu, and K. Aihara, "Gabor Division/Spread Spectrum System is Separable in Time and Frequency Synchronization", 2013 IEEE 78th Vehicular Technology Conference (VTC Fall), 2013 Fall, 2013, pp. 1-5.

(56) References Cited

OTHER PUBLICATIONS

Kohda, T., Y. Jitsumatsu, K. Aihara, "Separability of Time-Frequency Synchronization", Proceedings International Radar Symposium, Jun. 2013, pp. 964-969.
Stark, H., et al., "Restoration of arbitrary finite-energy optical objects from limited spatial and spectral information", J. Opt. Soc. Am., Jun. 1981, pp. 635-642, vol. 71. No. 6.
Youla, D.C., "Generalized image restoration by the method of alternating orthogonal projections", IEEE Transactions on Circuits and Systems, Sep. 1978, pp. 694-702, vol. CAS-25, No. 9.
Von Neumann, J., "The Geometry of Orthogonal Spaces", Functional Operators (AM-22), vol. 2, 1951, pp. 55-56, Princeton University Press.
Sakurai, J.J., et al., "Fundamental Concepts—Chapter One", Modern Quantum Mechanics, Rev. Ed., 1994, pp. 46-49, Addison-Wesley Publishing Company.
Levanson, N. et al.,"Radar Signals," pp. 100-102 and 332-336, 2004, IEEE Press, Wiley Interscience, A John Wiley & Sons, Inc. Publication.
Helmstrom, C.M., "Elements of Signal Detection and Estimation", 1995, pp. 106, 129, 130, 250-252, Prentice-Hall.
Auslander L., et al., "Radar Ambiguity Functions and Group Theory", SIAM J. Math. Anal., May 1985, pp. 577-601, vol. 16, No. 3.
Wilcox, C.H., "The synthesis problem for radar ambiguity functions", MRC Technical Report, #157, 1960, pp. 1-46, Mathematics Research Center, U.S. Army, University of Wisconsin, Madison.
Woodward, P.M., "Probability and Information Theory, with Applications to Radar", 1953, pp. 80 and 125, Pergamon Press, New York.
Ville. J., "Theorie et application de la notion de signal analytique," Cables et transmission, No. 1, Sep. 1947, pp. 61-77 (Ville, J., "Theory and Applications of the Notion of Complex Signal", U.S. Air Force Project Rand, Aug. 1, 1958, pp. 1-34 (translated from the French by I.Stein,T-92, 8-1-5).
Vaidyanathan, P.P., "Multirate Systems and Filter Banks", 1993, pp. 117-118,197, 230-232, Prentice-Hall.
Boroujeny, B.F.,"OFDM Versus Filter Bank Multicarrier", IEEE Signal Processing Magazine, May 2011, pp. 92-112, vol. 28, No. 3.
Siclet, C., et al., "Perfect reconstruction conditions and design of oversampled DFT-based transmultiplexers", EURASIP Journal on Applied Signal Processing, 2006, pp. 1-14, vol. 2006, Article ID 15756.
Siohan, P., et al., "OFDM/OQAM: Analysis and Design of OFDM/OQAM Systems Based on Filterbank Theory", IEEE Transactions on Signal Processing, May 2002, pp. 1170-1183, vol. 50, No. 5.
Floch, B., et al., "Coded Orthgonal Frequency Division Multiplex", Proceedings of IEEE, Jun. 1995, pp. 982-996, vol. 83, No. 6.
Daubechies, I., The wavelet transform, time-frequency localization and signal analysis, IEEE Transaction on Information Theory, Sep. 1990, pp. 961-1004, vol. 36, No. 4.
Daubechies, I., Time-frequency localization operators: A geometric phase space approach, IEEE Transaction on Information Theory, Jul. 1988, pp. 6015-6612, vol. 34, No. 4.
Rosenberg, J., "A Selective History of the Stone-von Neumann Theorem", Contemporary Mathematics, American Mathematical Society, 2004, pp. 331-353, vol. 365.
Howe, R., "On the role of the Heisenberg groups in harmonic analysis", Bulletin of the American Mathematical Society, Sep. 1980, pp. 821-843, vol. 3, No. 2.
Folland, G.B., "Harmonic Analysis in Phase Space", Annals of Mathematics Studies, 1989, pp. 17-19 and 164-166, Princeton University Press.
Couch, L.W., II, "Digital and Analog Communication Systems, 8th Ed.", 2013, pp. 388-389, Pearson.
Gabor, D., "Lectures on Communication Theory", Technical Report. No. 238, Apr. 13, 1952, pp. 1-48, Research Laboratory of Electronics, Massachusettes Institute of Technology, Cambribge.
Gabor, D., "Theory of Communication", Institution of Electrical Engineers, Pt.III, 1946, pp. 429-441, vol. 93.
Vaidyanathan, P.P., "Multirate Digital Filters, Filter Banks, Polyphase Networks, and Applications: A Tutorial", Proceedings of the IEEE, Jan. 1990, vol. 78, No. 1.
Luef, Mag. Franz, Gabor Analysis meets Non-Commutative Geometry, Dissertation, Nov. 2005, pp. 1-150.
Man'Ko, V.I., et al, Non-commutative time-frequency tomography, arXiv:physics/9712022v1 [physics.data-an] Dec. 12, 1997, pp. 1-23.
IP Australia, Office Action in Australian Application No. 2018338597 dated May 29, 2019.
Kohda, Tohru, et al, Special Lecture: Remarks on Synchronization in Digital Transmission, The Institute of Electronics, Information and Communication Engineers, Dec. 6, 2013, pp. 1-6 (Full translation attached).
Kohda, Tohru, et al, PLL-free Receiver for Gabor Division/Spread Spectrum System, IEEE 9th International Conference on Wireless and Mobil Computing, Networking and Communications (WiMob), 2013, pp. 662-669.
Kohda, Tohru, et al, Signals that can be easily time-frequency synchronized from their ambiguity function, IEEE Information Theory Workshop, 2013, pp. 439-443.
Taiwan Intellectual Property Office, Office Action in Application No. 108102227 dated Jan. 7, 2020.

* cited by examiner

SFB for signature $v[k; X, X']$

SFB for signature $V[\ell; X, X']$

SFB for data embedded transmit TD signal

SFB for data embedded transmit FD signal

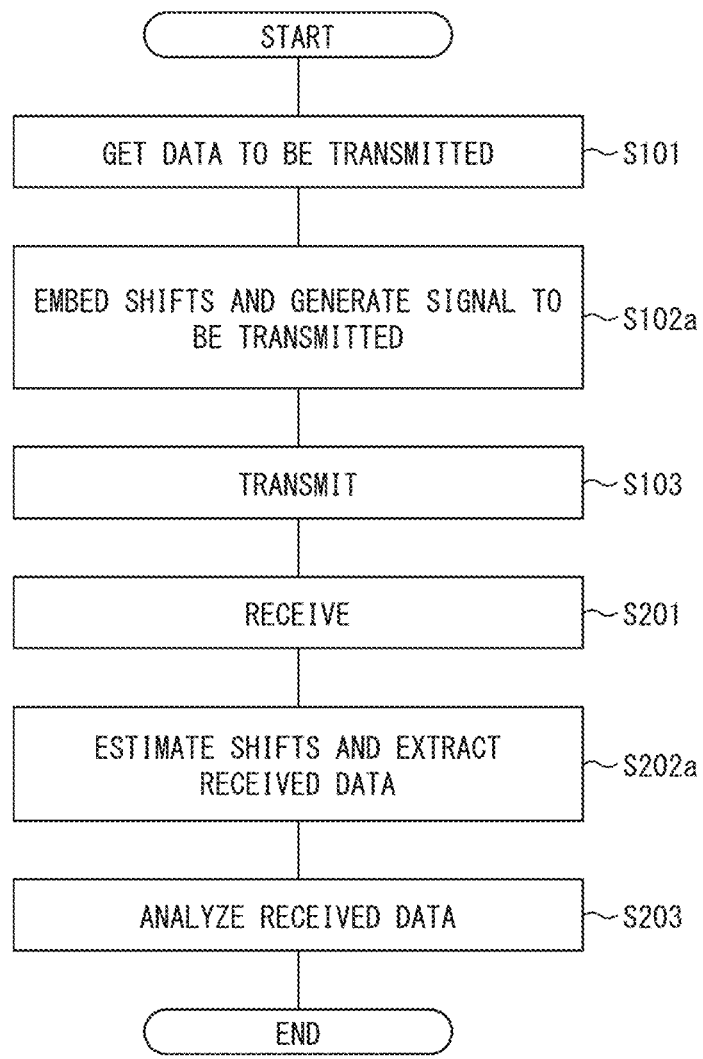

RECEIVER METHOD, RECEIVER, TRANSMISSION METHOD, TRANSMITTER, TRANSMITTER-RECEIVER SYSTEM, AND COMMUNICATION APPARATUS

CROSS REFERENCE TO RELATED APPLICATIONS

This Nonprovisional application is a continuation of PCT International Application No. PCT/JP2018/024592 filed in Japan on Jun. 28, 2018, which claims priority under 35 U.S.C. § 119 on PCT International Application No. PCT/JP2018/001735 filed in Japan on Jan. 22, 2018, the entire contents of which are hereby incorporated by reference.

TECHNICAL FIELD

The present patent proposes for designing receive methods, receive apparatus, transmitting method, transmitting apparatus, and transmitter-receiver systems.

BACKGROUND FIELD

There are many kinds of techniques about communication systems; These techniques have also led to technical changes in communication; The inventor has been proposed a transmitter-receiver system using time-division and frequency-division schemes (e.g., Patent list [1]-[6] and Non-Patent list [1]-[32]):

CITATION LIST

Patent Literature

References

[1] JT2016-189500
[2] WO2012/153732 A1
[3] WO2014/034664A1
[4] WO2013/183722 A1
[5] JP2016-189501A
[6] JP2016-189502A
[7] JP2013-251902A
[8] JP2012-170083A

Non-Patent Literature

References

[1] D. Gabor, "Theory of Communication", in *Proc. Inst. Elect. Engr*, pt. III, 93, 429-41, 1946
[2] D. Gabor, "Lectures on communication theory", in *Technical Report.*, No., 238. Research Laboratory of Electronics, Massachusetts Institute of technology Cambridge, 1-48, 1952.
[3] L. W. Couch, II, *Digital and Analog Communication Systems*, 8th Ed.," Pearson, 2013.
[4] G. B. Folland, *Harmonic Analysis in Phase Space*, Annals of Mathematics Studies Princeton Univ. Press, 1989.
[5] Howe, R. On the role of the Heisenberg groups in harmonic analysis," *Bulletin of the American Mathematical Society*, 3-2, 821-840(1980)
[6] Rosenberg, J. A selective history of the Stone-von Neumann theorem, *Contemporary Mathematics*, 365. American Mathematical Society (2004)
[7] I. Daubechies, Time-frequency localization operators: a geometric phase space approach," *IEEE Trans. Information Theory*, 34-4, 605-612, 1988.
[8] I. Daubechies, The wavelet transform, time-frequency localization and signal analysis," *IEEE Trans. Information Theory*, 36-5, 961-1005, 1990.
[9] B. Le. Floch, M. Alard & C. Berrou, "coded OFDM: Coded Orthogonal Frequency Division Multiplex," *Proc. of IEEE*, 83-6, 982-996, 1995.
[10] P. Siohan, C. Sciclet, & N. Lacaille, "OFDM/OQAM: Analysis and Design of OFDM/OQAM Systems, based on Filterbank Theory," *IEEE, Trans. Sig.* 50-5, 1170-1183, May, 2002.
[11] Sciclet, C., Siohan, P. & Pinchon, D. Perfect reconstruction conditions and design of oversampled DFT-based transmultiplexers, *EURASIP J. on Applied Signal Processing*, 2006, Article ID 15756, 1-14, 2006.
[12] B. F. Boroujeny, "OFDM Versus Filter Bank Multicarrier," *IEEE Signal Processing Magazine*, 28-3, 92-112, 2011.
[13] P. P. Vaidyanathan, "*Multirate Systems and Filter Banks*," Prentice-Hall, 1993.
[14] J. Ville, "Theorie et application de la notion de signal analytique," Cables et transmission, no. 2, pp. 61-74. 1948. (J. Ville: "Theory and Applications of the notion of complex signal", translated from the French by I. Stein, T-92, 8-1-58, U.S. Air Force Project Rand, 1958)
[15] P. M. Woodward, *Probability and Information Theory, with Applications to Radar*, Pergamon Press, New York, 1953.
[16] C. H. Wilcox, "The synthesis problem for radar ambiguity function," *MRC Technical Report*, No. 157, pp. 1-46. Mathematics Reaearch Center, U.S. Army, Univ. Wisconsin, Madison, 1960.
[17] L. Auslander and R. Tolimieri, "Radar Ambiguity Functions and Group Theory, *SIAM J. Math. Anal.*, 16-3, 577-601, 1985.
[18] C. W. Helstrom, *Elements of Signal Detection and Estimation*," PTR Prentice-Hall, 1995.
[19] N. Levanson and E. Mozeson, "Radar Signals," Wiley interscience, 2004
[20] Sakurai, J. J. *Modern quantum mechanics*, S. F. Tuan editor, Rev. ed., Addison-Wesley Pub. Comp. 1994.
[21] J. von Neumann, *The Geometry of Operators*, vol. II (*Ann. Math. Studies*, no. 22), 1950.
[22] Youla, D. C Generalized image restoration by the method of alternating orthogonal projections, *IEEE Trans. Circuits and Systems*, CAS-25-9, 694-702, 1978.
[23] Stark, H., Cahana, D.& Webb, H. Restoration of arbitrary finiteenergy optical objects from limited spatial and spectral information, *J. Opt. Soc. Amer.*, 71-6, 635-642, 1981.
[24] Kohda, T., Jitsumatsu, Y.& Aihara, K. Separability of time-frequency synchronization, *Proc. Int. Radar Symp.*, 964-969, 2013.
[25] T. Kohda, Y Jitsumatsu, and K. Aihara, "Gabor division/spread spectrum system is separable in time and frequency synchronization," Proc. VTC 2013 Fall, 1-5, 2013.
[26] Y. Jitsumatsu, T. Kohda, and K. Aihara, "Spread Spectrum-based Cooperative and individual time-frequency synchronization," Proc. (ISWCS), 1-5 2013.
[27] Jitsumatsu, Y., Kohada, T. &Aihara, K. Delay-Doppler space division-based multiple-access solves multiple-target detection, Jonnsson, M., et al, (eds.) *MACOM*2013, *LNCS*8310, *Springer*, 39-53, 2013

[28] T. Kohada, Y. Jitsumatsu, and K. Aihara, "Recovering noncoherent MPSK signal with unknown delay and Doppler using its ambiguity function," 4th International workshop on recent Advanced in Broadband Access NetWork, (RABAN2013), 251-256, 2013.

[29] T. Kohda, Y. Jitsumatsu and K. Aihara "Phase-tuned layers with multiple 2D SS codes realize 16PSK communication," 2014 2014 IEEE Wireless Commun. Networking Conference, WCNC 2014, 469-474 (2014).

[30] Jitsumatsu, Y.& Kohda, T. Digital phase updating loop and delay-Doppler space division multiplexing for higher order MPSK, Jonnsson, M., et al, (eds.) MACOM2014, LNCS8715, Springer, 1-15, 2014.

[31] T. Kohda, Y. Jitsumatsu, and K. Aihara, "Frequency-division spread spectrum makes frequency synchronisation easy," Proc. IEEE Globecom 2012, 3952-3958, 2012.

[32] T. Kohda, Y. Jitsumatsu, and K. Aihara, "Frequency synchronisation using SS technique," Proc. The ninth Int. Sympo. on Wireless Communication Systems, 855-859, 2012.

[33] J. F. Daughman, "Two-dimensional analysis of cortical receptive field profiles," *Vision Research,* 20, 846-856, 1980.

[34] J. F. Daughman, "Image analysis by local 2-D spectral signatures," *J. Opt. Soc. Amer.* (A), 2, p. P74, 1985.

[35] J. F. Daughman, "Complete Discrete 2-D Gabor Transform by Neural Networks for Image Analysis and Compression," *IEEE Trans. Acoustics, Speech and Signal Processing,* 36-7, 1169-1179, 1988.

[36] Movella, Javier R. "Tutorial on Gabor filters". Archived from on 2009 Apr. 19, Retrieved 2008 May 14.

[37] Hans G. Feichtinger and Thomas Strohmer: *Gabor Analysis and Algorithms,* Birkhauser, 1998.

[38] Jones, J. P. and Palmer, L. A. "An evaluation of the two-dimensional gabor filter model of simple receptive fields in cat striate cortex". *J. Neurophysiol.* 58(6): 1233-1258. 1987

[39] Tai Sing Lee, "Image representation using 2d Gabor wavelets," *IEEE Trans. on pattern analysis and machine intelligence,* 18-10, 1-13, 1996.

[40] W. D. Montgomery, "Optical applications of von Neumann's alternating projection theorem," *Optics Letters,* 7-1, 1-3, 1982.

[41] W. D. Montgomery "Restoration of images processing a finite Fourier series," *Optics Letters,* 7-2, 54-56, 1982.

[42] A. V. Oppenheim and J. S. Lim, "Importance of phase in Signals," 1980, *Proc of the IEEE,* 96-5, 529-541, 1981

SUMMARY OF THE INVENTION

Problems to be Solved by the Invention

The inventor remarked that the time-frequency shift operator (TFSO) representing the non-commutative property (NCP) of time-frequency shift (TFS)s in the time-frequency plane (TFP) plays an important role in signal detection and estimation and concluded that the NCP of the TFSO should be noticed.

To solve the above problem, in accordance with an embodiment of the present invention, a proposed method mainly depends on this remark and its aim is to give efficient receive method, receiver, transmission method, transmitter, and transmitter-receiver system.

Solution to Problem

To solve the above problem, a method, in accordance with an embodiment of the present invention, for receiving a signal is a method for receiving a signal, comprising an estimation step for estimating a time shift and a frequency shift that are embedded in a received signal, wherein the estimation step refers to a non-commutative time-frequency shift parameter space of co-dimension 2.

To solve the above problem, a receiver apparatus in accordance with an embodiment of the present invention is a receiver apparatus for receiving a signal, comprising an estimation part for estimating a time shift and a frequency shift that are embedded in a received signal, with reference to a non-commutative shift parameter space of co-dimension 2.

To solve the above problem, a method, in accordance with an embodiment of the present invention, for transmitting a signal is a method for transmitting a signal, comprising a shift step for time-frequency shifting the signal to be transmitted, with reference to a noncommutative time-frequency shift parameter space of co-dimension 2.

To solve the above problem, a transmitter apparatus in accordance with an embodiment of the present invention is a transmitter apparatus for transmitting a signal, comprising a time-frequency shift part for time-frequency shifting the signal to be transmitted, with reference to a non-commutative time-frequency shift parameter space of co-dimension 2.

To solve the above problem, a method, in accordance with an embodiment of the present invention, for receiving an image signal is a method for receiving an image signal, comprising an estimation step for estimating a space shift and a spatial frequency shift that are embedded in the received image, with reference to a parameter space, wherein each of the space shift and the spatial frequency shift has dimension $\geq 2$.

To solve the above problem, a method, in accordance with an embodiment of the present invention, for transmitting an image signal is a method for transmitting an image signal, comprising a shift step for space-spatial frequency shifting the image signal to be transmitted, with reference to a parameter space, wherein each of the space shift and the spatial frequency shift has dimension $\geq 2$.

Advantageous Effects of Invention

The present disclosure enables one to realize an efficient receive method, a receiver, a transmission method, a transmitter, and a transmitter-receiver system.

FIGURE DESCRIPTION

FIG. 1 In accordance with an embodiment of the present invention, this Fig. shows three kinds of divisions of the time-frequency plane (TFP): (a) indicates time division, (b) frequency division, and (c) Gabor division [1]. The solid lines in (a) show divisions of data of time duration T; the thin lines subdivisions by Time Domain (TD)-Phase code (PC); The dotted lines in (b) show divisions of data of bandwidth F; the dashed lines subdivisions by Frequency Domain (FD)-PC.

Figure 2:
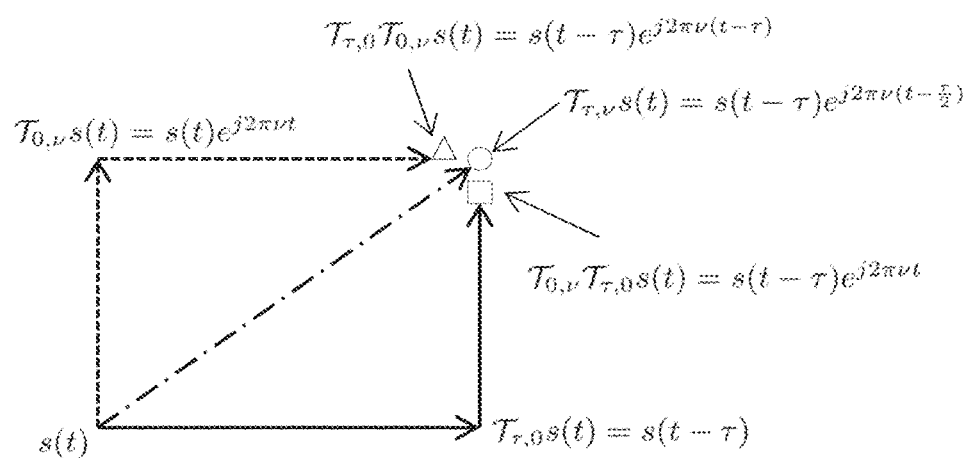

FIG. 2 In accordance with an embodiment of the present invention, this Fig. shows an illustration of the non-commutative property (NCP) of time and frequency shift (TFS)s: The NCP is manifested in the expression of the product of the shift operators $T_{\tau,0} \cdot T_{0,\upsilon} = e^{-i2\pi\tau\upsilon} T_{0,\upsilon} T_{\tau,0}$: Its LHS corresponds to the triangle in the figure; the RHS to the square; the Phase Distortion (PD) $e^{-i2\pi\tau\upsilon}$ appears; the circle in the figure shows the Symmetrical Time-Frequency Shift Operator (TFSO)[26]

[Mathematical Formula (MF)1]

$$T_{\tau,\upsilon} \triangleq e^{i\pi\tau\upsilon} T_{\tau,0} \cdot T_{0,\upsilon}.$$

Figure 3:
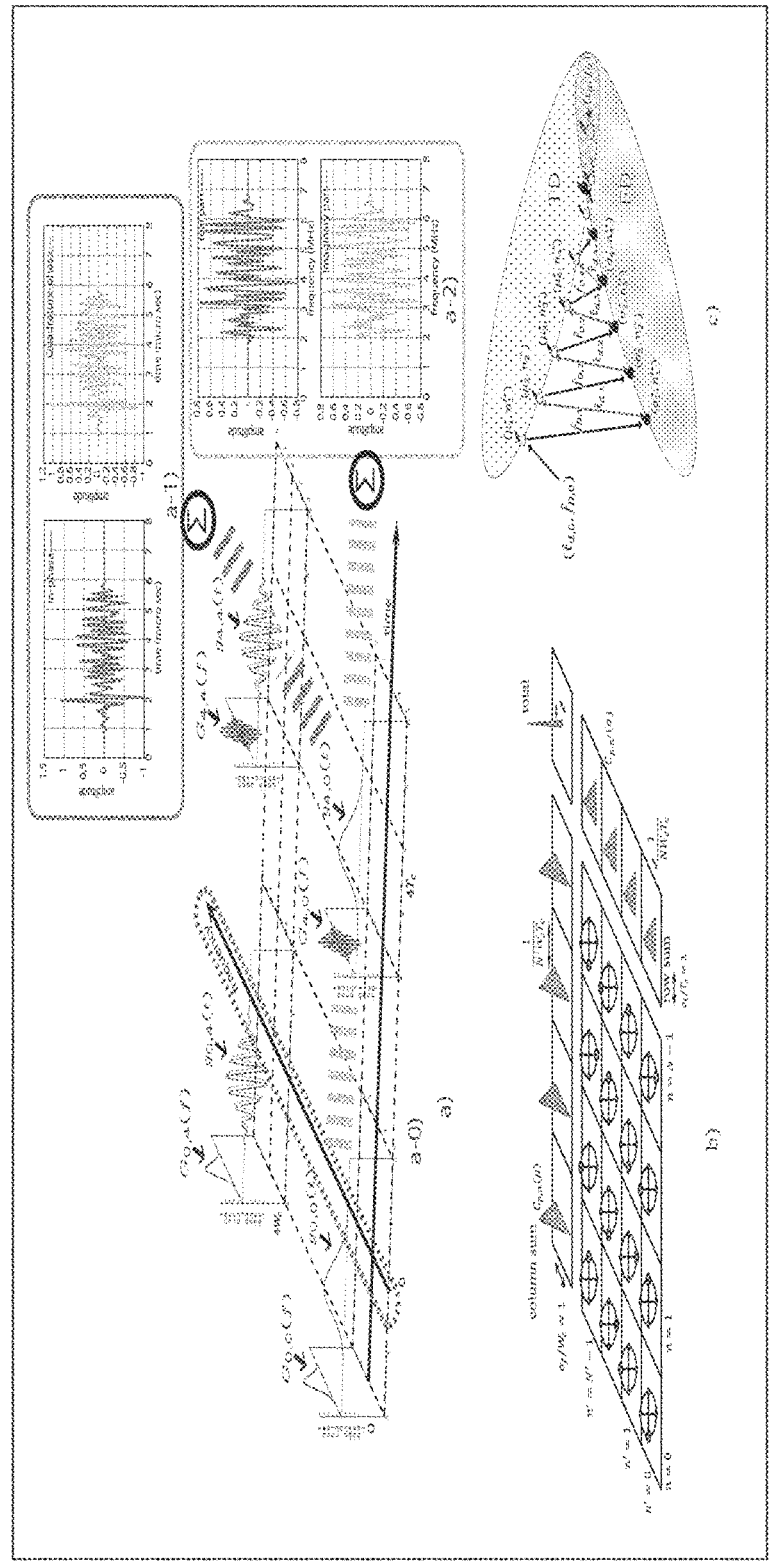

FIG. 3 In accordance with an embodiment of the present invention, a) indicates the Gabor function located on the TFP and its related issues: a0) shows Gaussian chip waveform $g_{mm'}(t)$ located on the TFP and its Fourier Transform (FT) $G_{mm'}(f)$; a1) indicates the real and imaginary parts of the TD-template, the combination of $g_{mm'}(t)$ weighted by the FD PC $X'_{m'}$: a2) indicates the real and imaginary parts of the FD-template, the combination of $G_{mm'}(f)$ weighted by the TD PC $X_m$; b) shows NN' Cross-Correlation Function (CCF) s, N' column-sums of values of the TD-CCFs, and N row-sums of values of the FD-CCFs; c) shows the alternative projection, orthogonal projecting onto the Time-Limited Time Domain (TL-TD) and onto Band-Limited Frequency Domain (BL-FD), based on the Alternative Projection Theorem (APT), the estimated

[MF2]

$$\hat{t}_d, \hat{f}_D,$$

and convergent values $t_d$, $f_D$.

Figure 4:
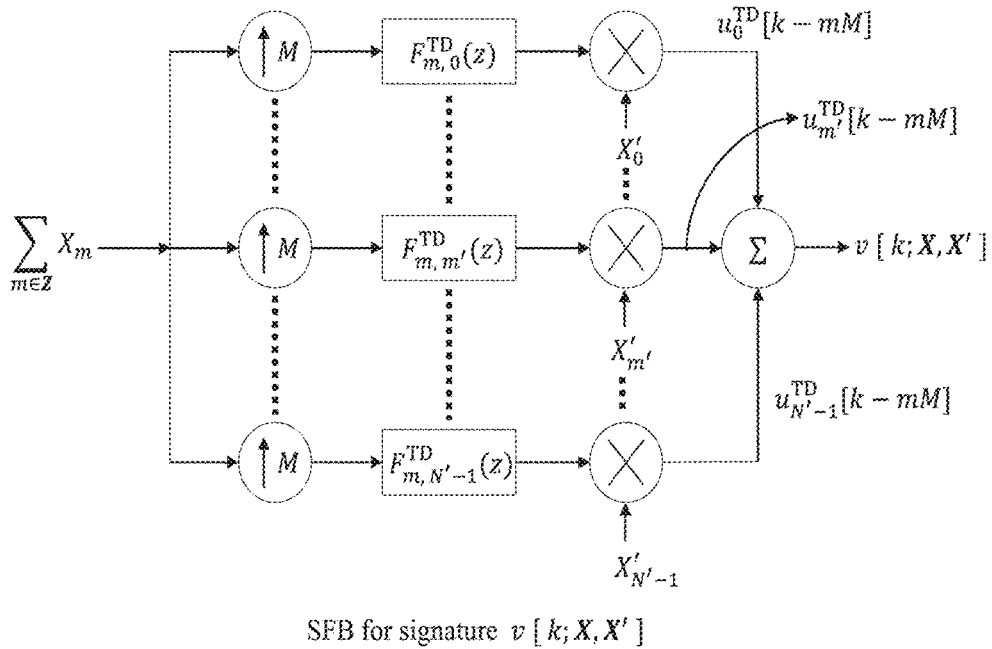

FIG. 4 In accordance with an embodiment of the present invention, this Fig. shows the Synthesis Filter Bank (SFB) that contains TD-, FD-PCs $X_m X'_{m'}$ and the m'-th TD-template

[MF3]

$$u_{m'}^{TD}[k], \; 0 \leq m' \leq N'-1,$$

and generates the TD signature v[k] in (25), (67).

Figure 5:
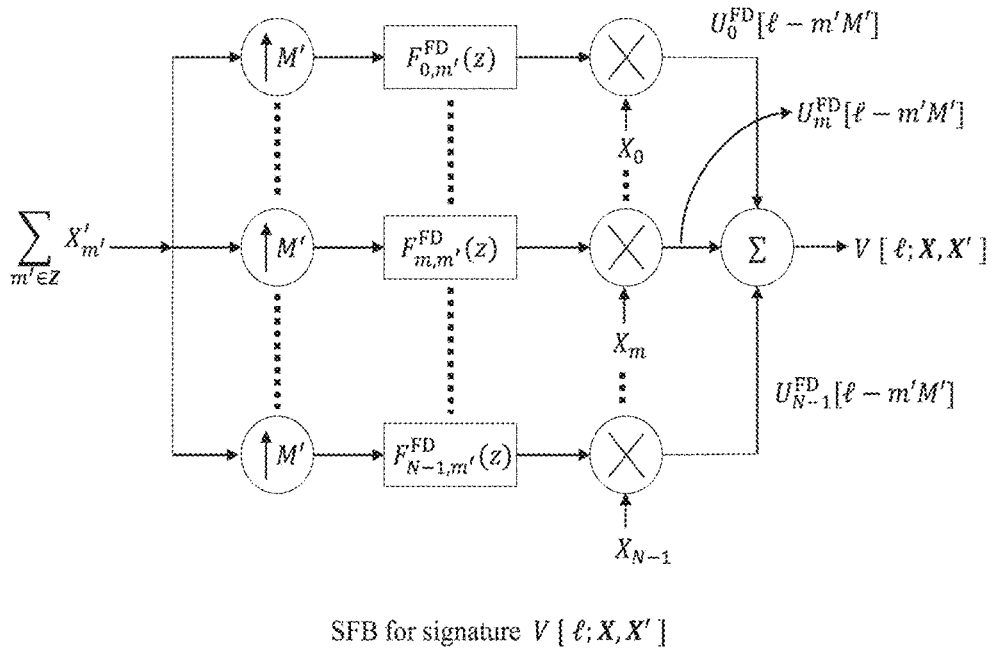

FIG. 5 In accordance with an embodiment of the present invention, this Fig. shows the SFB that contains TD-, FD-PCs $X_m X'_{m'}$ and the m'-th FD-template

[MF4]

$$U_m^{FD}[\ell], \; 0 \leq m \leq N-1.$$

and generates the FD signature in (25), (67)

[MF5]

$$V[\ell].$$

Figure 6:
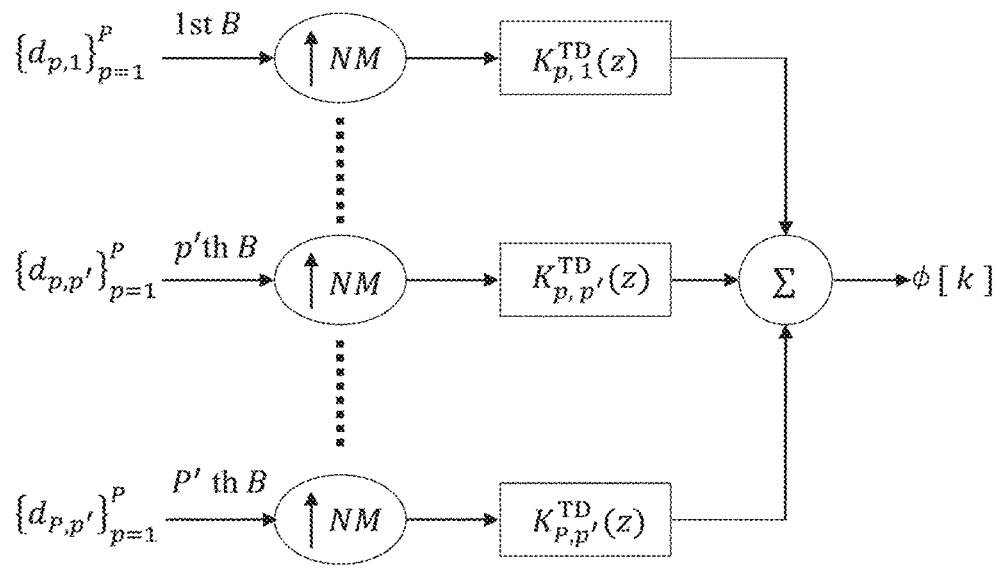

FIG. 6 In accordance with an embodiment of the present invention, this Fig. shows the SFB with input, the complex-valued data with address p,p'

[MF5]

$$\{d_{p,p'}\}_{p,p'=1}^{P,P'}$$

generating the associated output, TD-Complex Envelope (CE) in (27), (71)

[MF7]

$$\psi[k].$$

Figure 7:
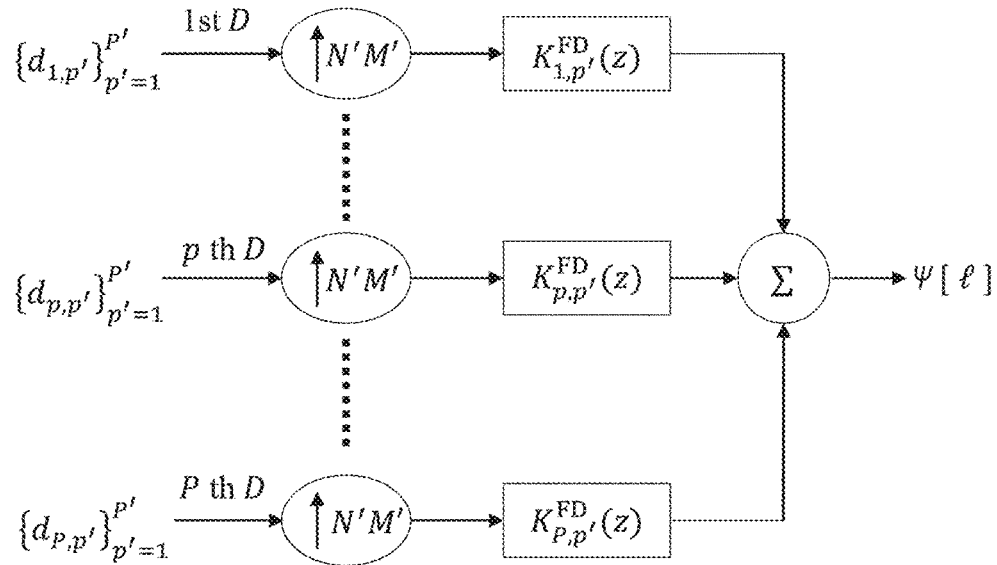

FIG. 7 In accordance with an embodiment of the present invention, this Fig. shows the SFB with input, the complex-valued data

[MF8]

$$\{d_{p,p'}\}_{p,p'=1}^{P,P'}$$

generating the output, FD-CE in (27), (71)

[MF9]

$$\Psi[\ell].$$

Figure 8:
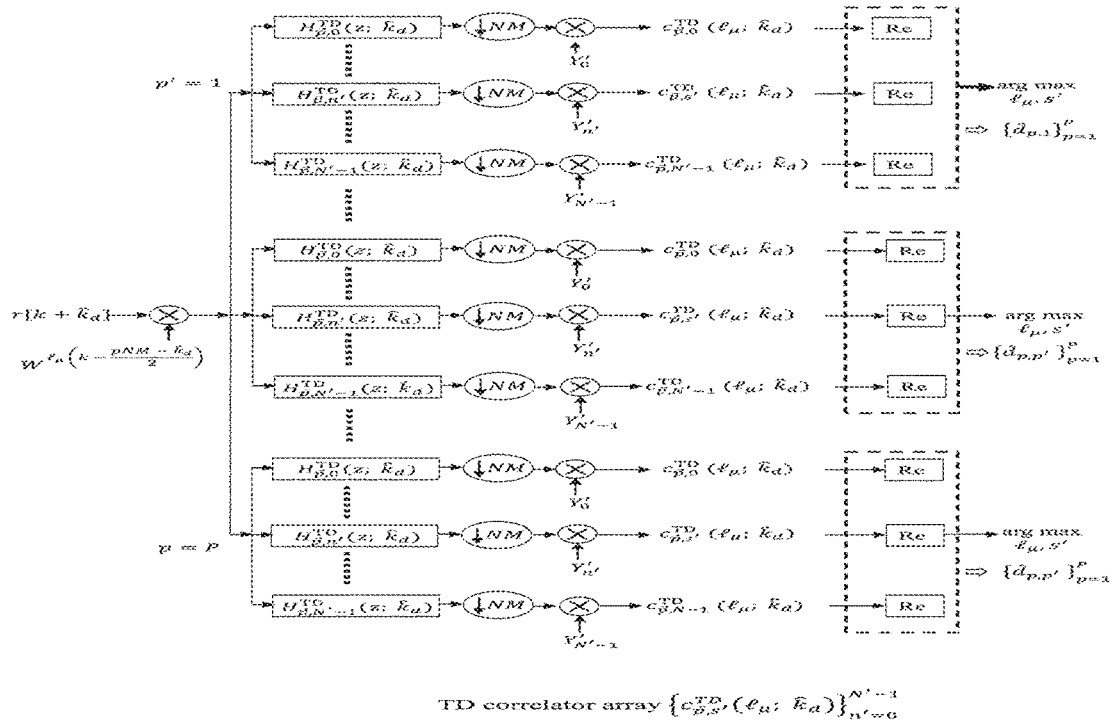

FIG. 8 In accordance with an embodiment of the present invention, this Fig. shows the Analysis Filter Bank (AFB) that is an array of N' TD-cross-correlation (CCR)s for decoding the complex-valued data

[MF10]

$$\{d_{p,p'}\}_{p=1}^{P}, \; 1 \leq p' \leq P'.$$

Figure 9:
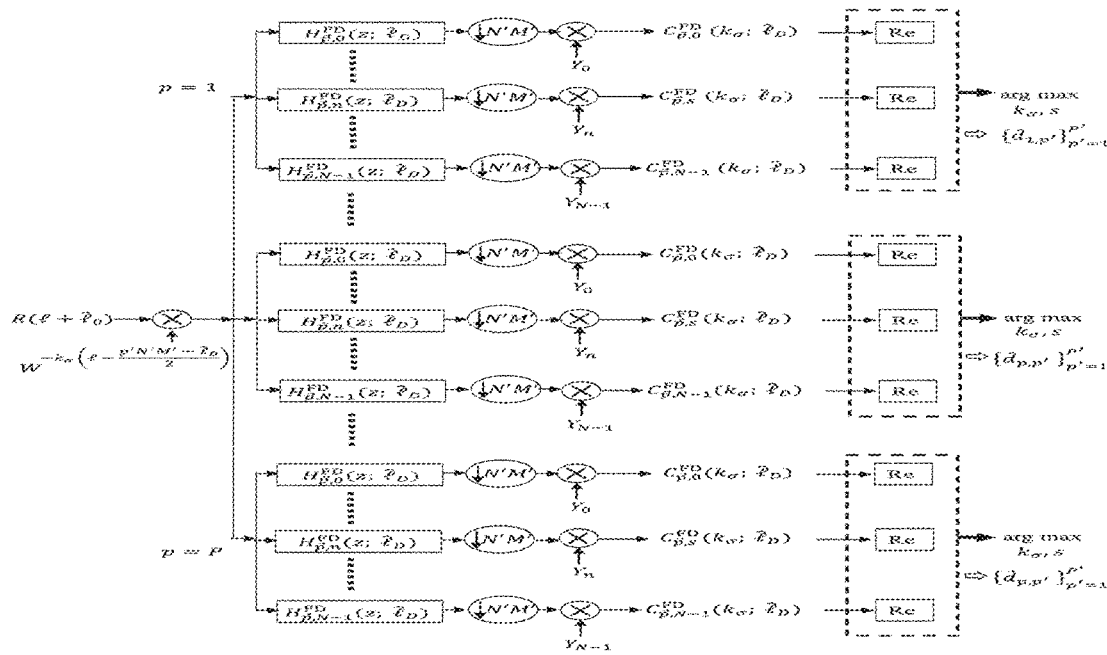

FIG. 9 In accordance with an embodiment of the present invention, this Fig. shows the AFB that is an array of N FD-CCRs for decoding the complex-valued data

[MF11]

$$\{d_{p,p'}\}_{p'=1}^{P'}, \; 1 \leq p \leq P.$$

Figure 10:
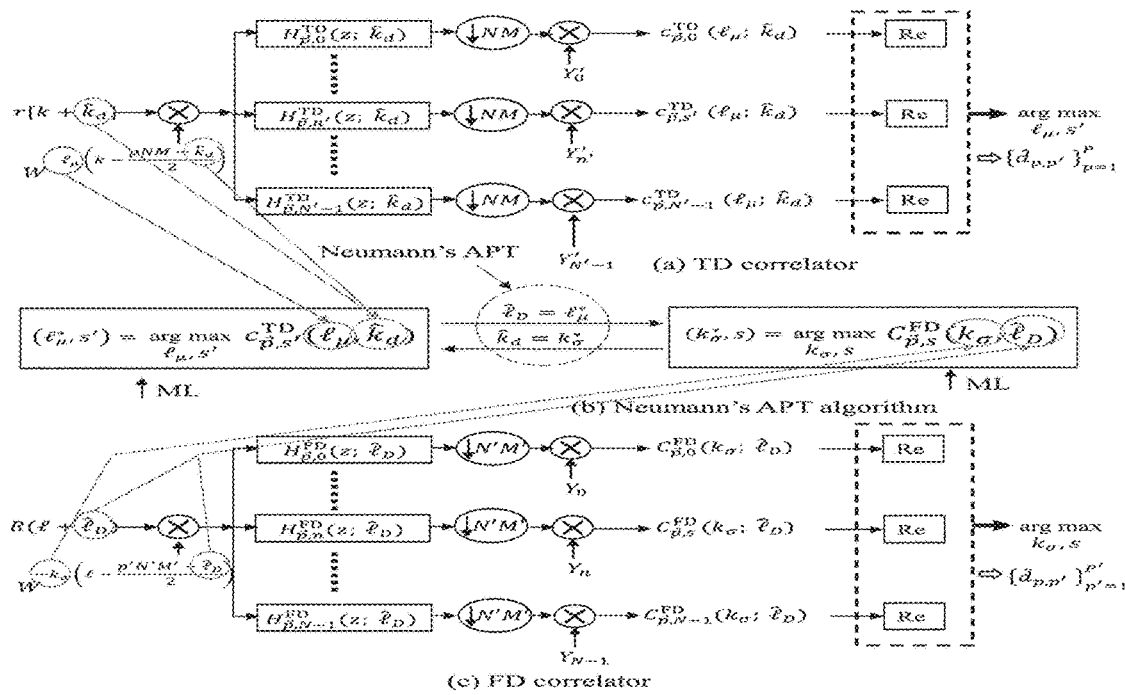

FIG. 10 In accordance with an embodiment of the present invention, a) indicates an array of N' TD-CCRs, c) an array of N FD-CCRs, and b) an illustration that the maximum likelihood estimate (MLE)s are obtained by these two types of arrays of CCRs and are alternatively updated one another by the von Neumann'a Alternative Projection Theorem (APT).

Figure 11:
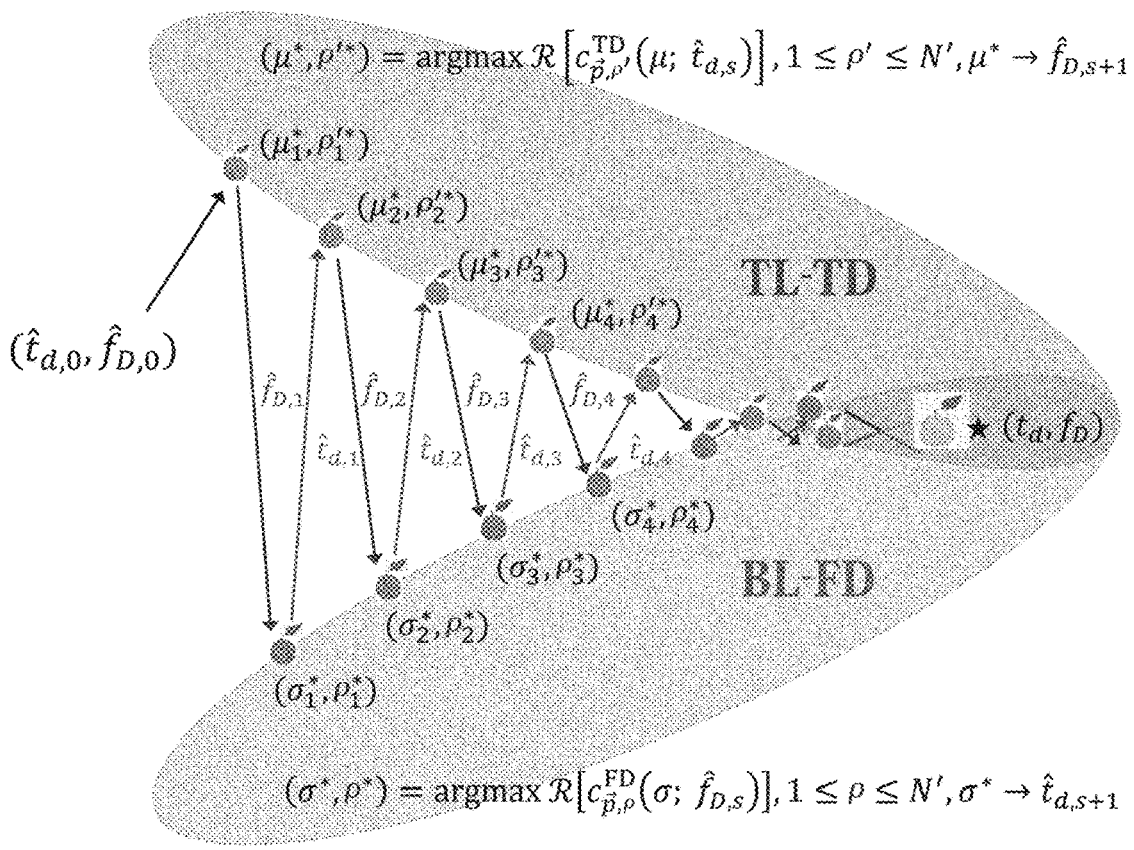

FIG. 11 In accordance with an embodiment of the present invention, this Fig. shows an illustration of the von Neumann's APT, where Time-Limited Time Domain (TL-TD) and Band-Limited Frequency Domain (BL-FD) indicate two subspaces of the Hilbert space; The subspace TL-TD is an L $\Delta t$ (or $T_s$) TL-TD; The subspace BL-FD is an L $\Delta f$ (or $F_s$) BL-FD; the arrow in the figure means the orthogonal projecting onto the associated subspace; This results in getting the MLE and the cardinal numbers of the CCFs.

Figure 12:
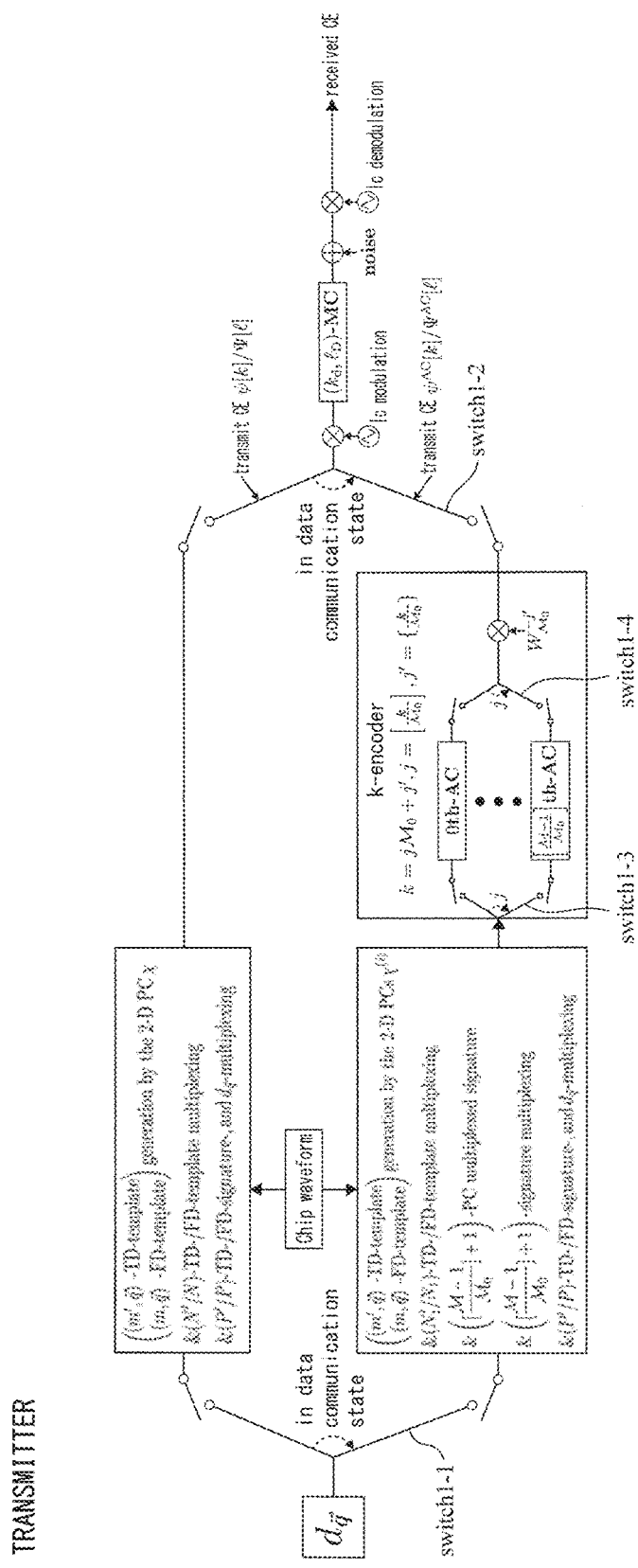

FIG. 12 In accordance with an embodiment of the present invention, this Fig. shows a block-diagram of the system consisted of two alternative transmitters, controlled by switches, that perform efficient and joint estimation of delay and Doppler with high-precision, with (or without) being equipped with

[MF12]

$$\mathcal{M}$$

-ary PSK communication and its transmitter (encoder) capable of jointly estimating delay and Doppler efficiently and precisely.

Figure 13:
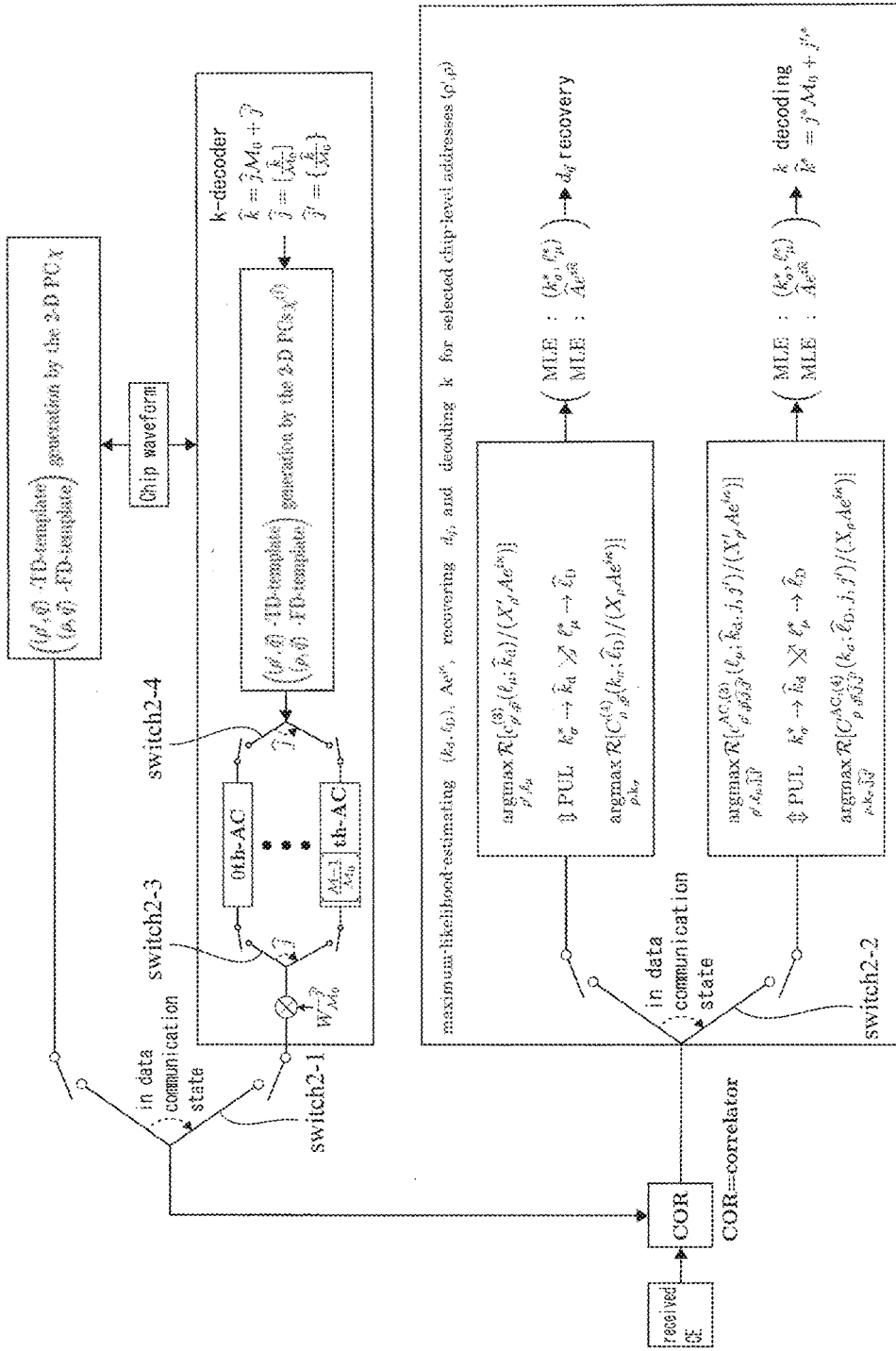

FIG. 13 In accordance with an embodiment of the present invention, this Fig. shows a block-diagram of the system consisted of two alternative receivers, controlled by switches, that perform efficient and joint estimation of delay and Doppler with high-precision, with (or without) being equipped with

[MF13]

$$\mathcal{M}$$

-ary PSK communication and its receiver-synchronizer (decoder) capable of jointly estimating delay and Doppler efficiently and precisely.

Figure 14:
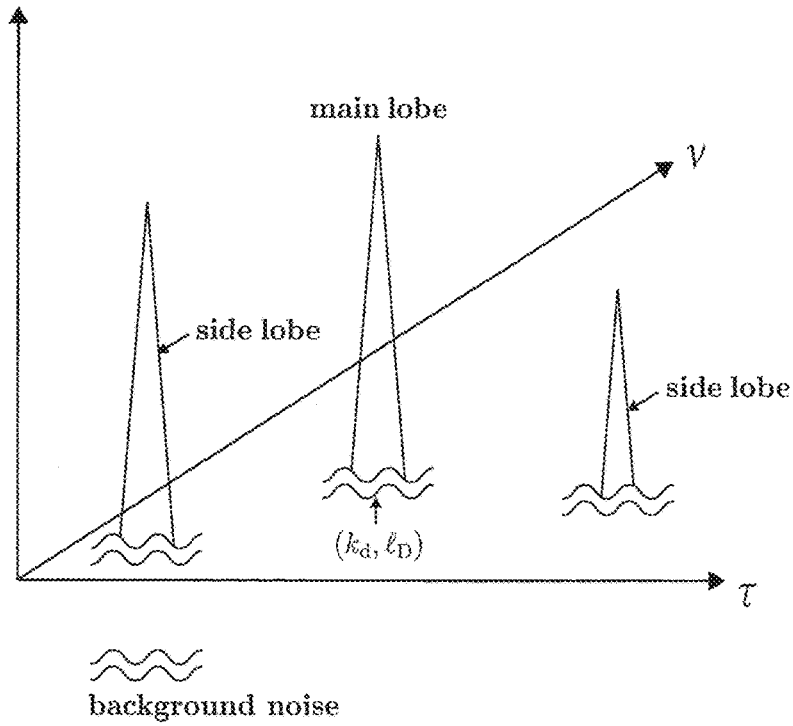

FIG. 14 In accordance with an embodiment of the present invention, this Fig. shows an example of the distribution of values of the real part of the CCF as a function of the delay $\tau$ and Doppler $\upsilon$ of the Main Channel (MC).

Figure 15:
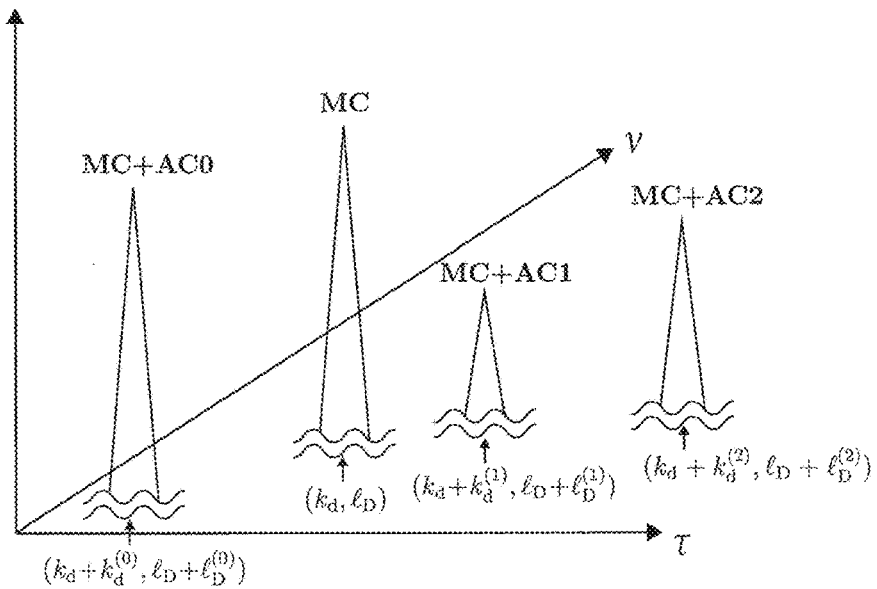

FIG. 15 In accordance with an embodiment of the present invention, this Fig. shows an example of the distribution of values of the real part of the CCF on the delay $\tau$-Doppler $\upsilon$ space when the Artificial Channel (AC) is added to the main channel (MC).

Figure 16:
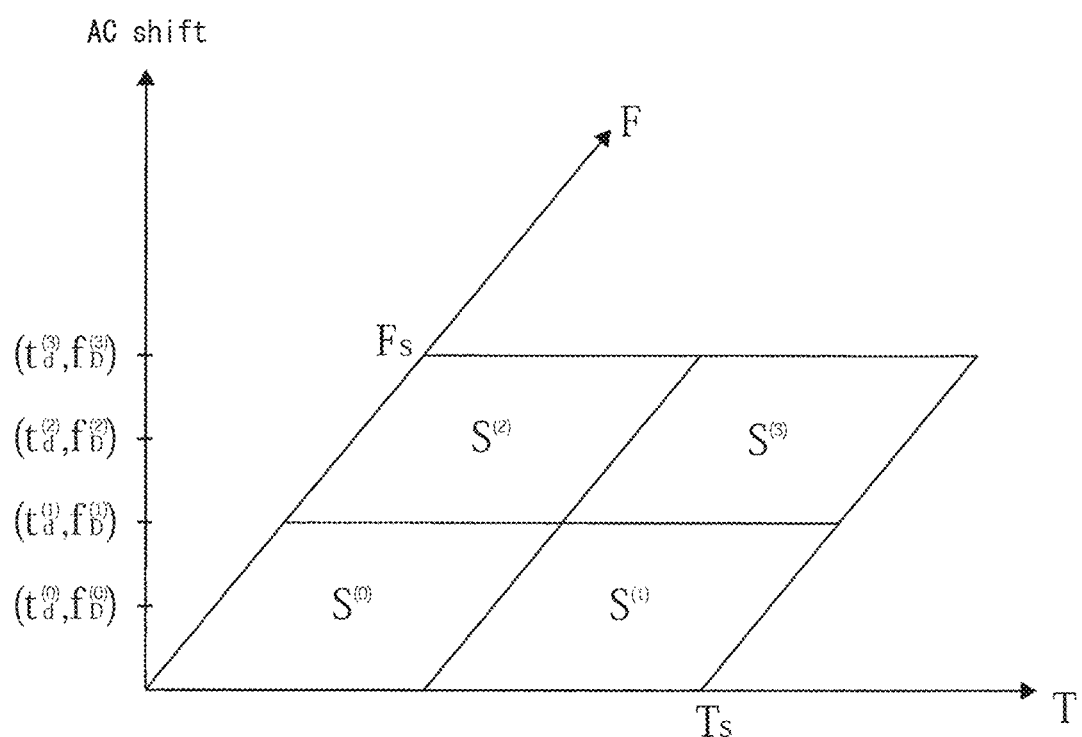

FIG. 16 In accordance with an embodiment of the present invention, this Fig. shows the division of symbol's time-frequency plane (TFP) using a non-commutative AC-shift parameter space of co-dimension 2. The division of the TFP S of time duration $T_s$ and bandwidth $F_s$ (i.e., the Gabor division): $(S^{(0)}, S^{(1)}, S^{(2)}, S^{(3)})$ shows a vertical axis perpendicularly attached to it, with a scale of non-commutative AC shifts

[MF14]

$$(k_d^{(0)}, \ell_D^{(0)}), (k_d^{(1)}, \ell_D^{(1)}), (k_d^{(2)}, \ell_D^{(2)}), (k_d^{(3)}, \ell_D^{(3)})$$

and their associated 2-D PC codes according to the division [MF15]

$$\chi^{(i)}.$$

Figure 17:
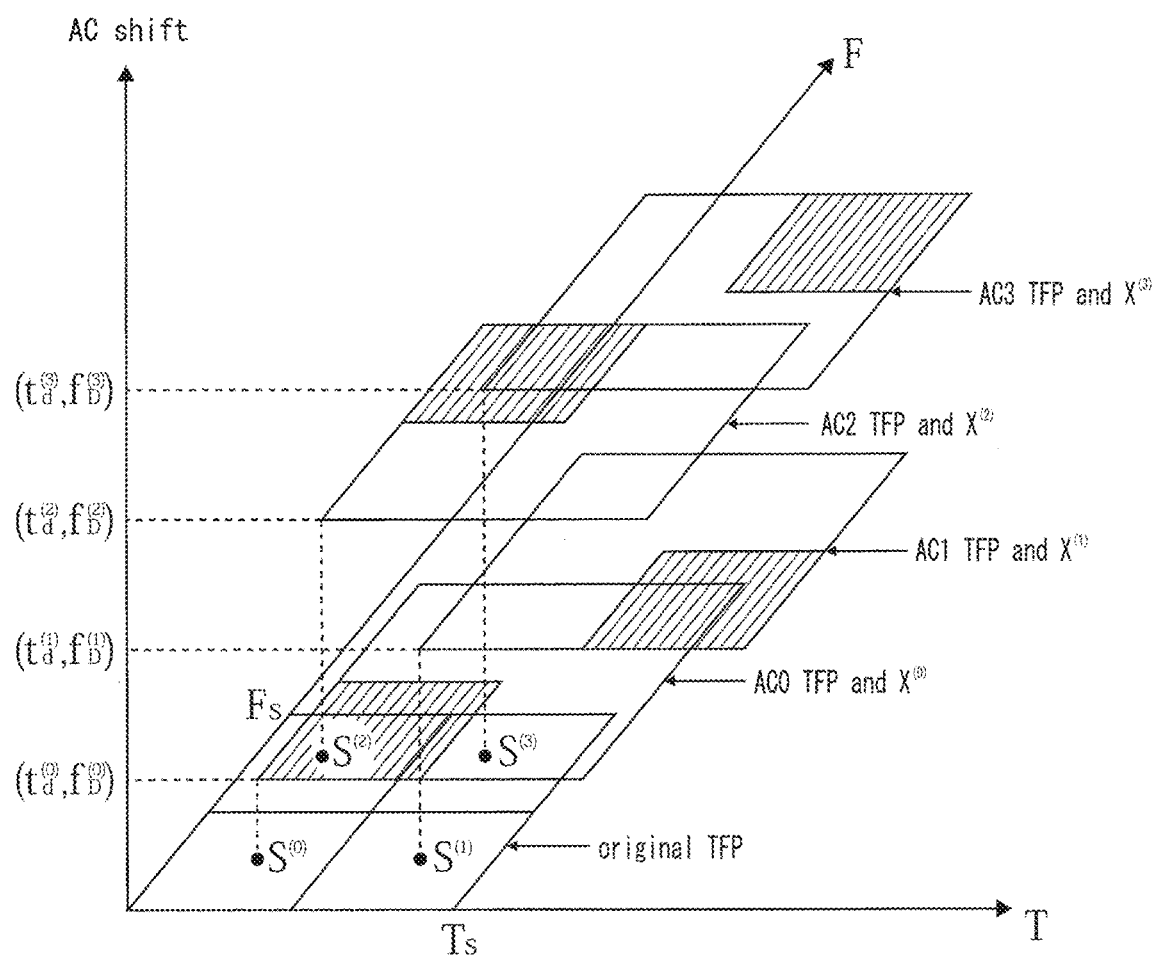

FIG. 17 In accordance with an embodiment of the present invention, this Fig. shows a division of the TFP using a non-commutative shift parameter space, where each of AC0-TFP, AC1-TFP, AC2-TFP, and AC3-TFP is shifted by its associated non-commutative shift.

Figure 18:
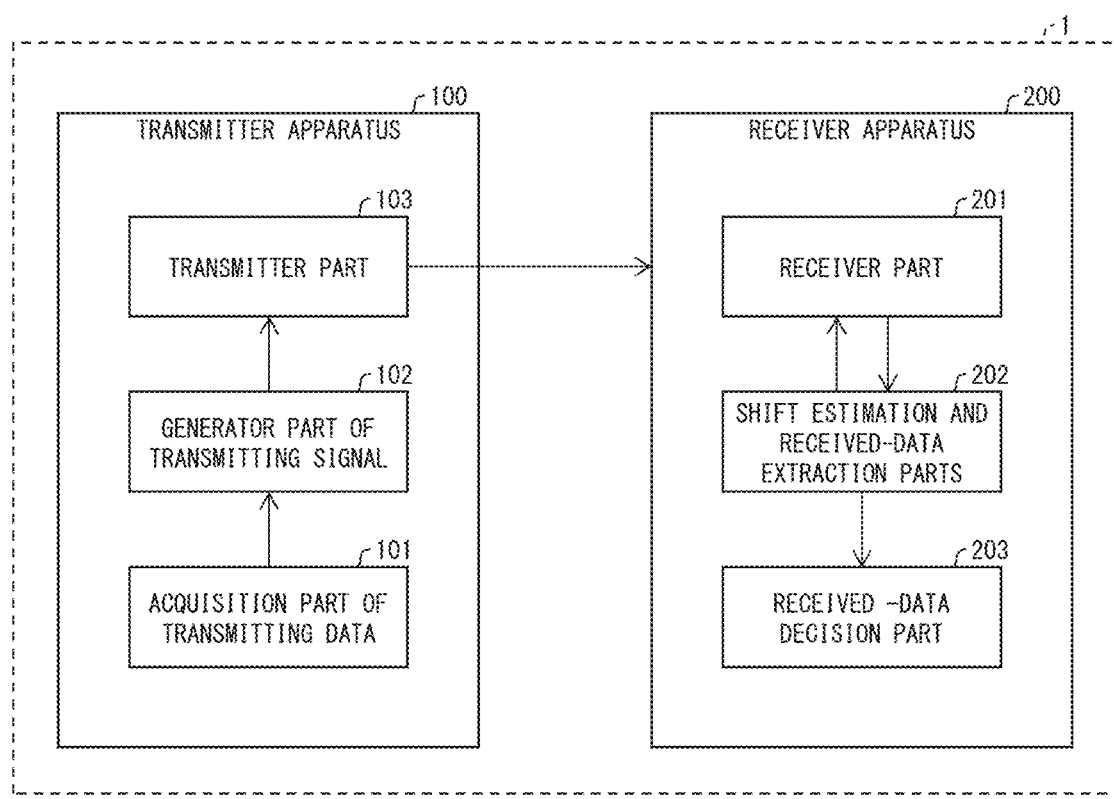

FIG. 18 In accordance with an embodiment of the present invention, this Fig. shows the block-diagram of transmitter and receiver apparatuses.

Figure 19:
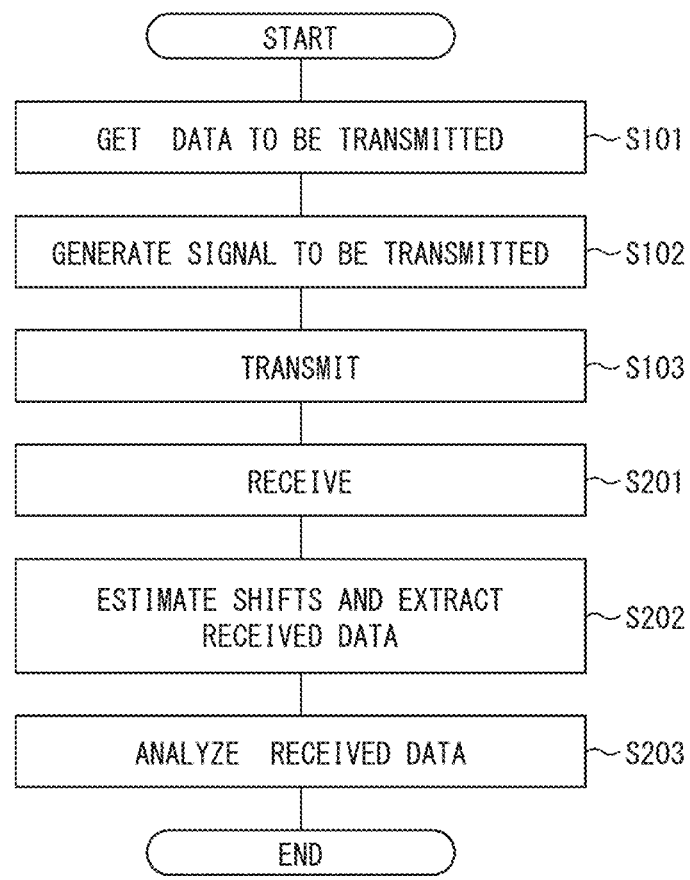

FIG. 19 In accordance with an embodiment of the present invention, this Fig. shows the flow-chart of signal processing in the transmitter and receiver apparatuses.

Figure 20:
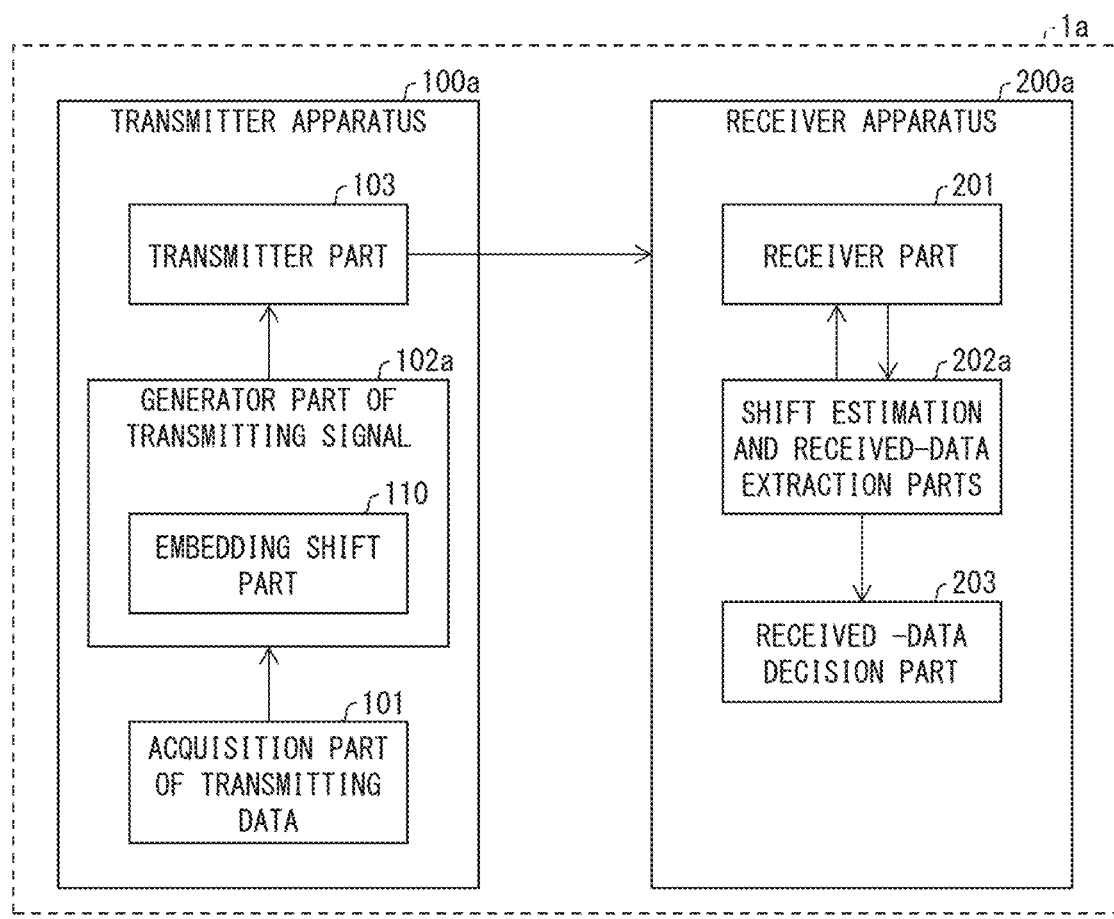

FIG. 20 In accordance with an embodiment of the present invention, this Fig. shows the block-diagram of transmitter and receiver apparatuses.

FIG. 21 In accordance with an embodiment of the present invention, this Fig. shows the flow-chart of signal processing in the transmitter and receiver apparatuses.

DESCRIPTION OF THE PREFERRED EMBODIMENT

Embodiment 1

In one embodiment of the invention, referring to Figures, the inventor explains the transmitter-receiver system. The inventor starts by expressing the theoretical issues behind the proposed method and an example of embodiment. Next, the inventor gives a correspondence between the proposed method and the content of the scope of claims described below.

This disclosure cites several references by referring to patent references and non-patent references and hence the citation is within this disclosure.

These references are listed to cite technical terms and to refer the problems to be solved and the background, relating to this disclosure. Thus the citation does not affect the patentability of the present disclosure.

<<Summary of Theoretical View Points: Communication Exploiting the NCP of TFSOs—Designs of a Transmitter Capable of Jointly Estimating Delay and Doppler and Those of its Receiver->>

It is not easy to perform synchronization of TD- and FD-Division communication systems, that are designed to convey data symbol of duration $T_s$ and bandwidth $F_s$ efficiently. The radar problem of estimating delay $t_d$ and Doppler $f_D$ from a received echo signal remains unsolved. These difficulties come from phase distortion (PD)s
[MF16]

$$e^{j2\pi T_s F_s}$$

and
[MF17]

$$e^{j2\pi t_d f_D}$$

that are generated by TFSOs and are similar as well-known algebraic relations for the position and momentum operators in quantum mechanics[4].

The basic purpose of a radar is to detect the presence of an object of interest, called target detection, and provide information concerning the object's location, motion, and other parameters, referred to as parameter estimation. So, radars are based on the statistical testing of hypotheses for signal detection and estimation. The determination of delay and Doppler is an estimation problem from the PDs containing two unknowns. Neither delay nor Doppler is successfully detected and estimated with high precision from a noisy received signal without the help of the Weyl-Heisenberg group (WHG) theory. The description of the invention is summarized as the following 5 items.

(summary1) When one designs a transmit signal, one should treat a signal in the TD and its Fourier transform (FT), i.e., a signal in the FD symmetrically. In addition, the symmetrical time and frequency shift operator (TFSO) satisfying time-frequency symmetrical property (TFSP) is proven to be an operator such that the address of a multiplexed signal is manifested by the non-commutative property (NCP) of TFSs (cf. (39), (44), (51), (56)).

(summary2) Time-frequency shifted Gaussian pulses, i.e., Gabor functions by 2-D binary phase-shift-keying (BPSK) modulation by TD- and FD-PCs of periods N,N' are shown to be useful for maximum likelihood estimate (MLE)s of parameters $t_d$, $f_D$ among N',N hypotheses in FD- and TD-likelihood functional (LF)s, respectively.

TD- and FD-PCs are usually called "2-D spread spectrum (SS) codes (the adjective "SS" is something of a misnomer) to the contrary, the inventor calls it a 2-D PC for BPSK modulation; Note that BPSK modulation has two functions: merits and demerits. Many researchers have not been really aware of the important roles of BPSK modulation. The present disclosure gives the pros and cons of the BPSK modulation that have not been noticed as follows.

The TD- and FD-CEs (27), wideband signals, called "signatures", contain PDs due to the BPSK modulation. The modulation makes a situation that N TD-template CE of type-3 (29) (or of type-1 (49)) with its support $[0,T_s]\times[0,L\Delta f]$ (or $[0,L\Delta t]\times[0, F_s]$) and N' FD-template CE of type-4 (33) (or of type-2 (54)) with support $[0,L\Delta t]\times[0, F_s]$ (or $[0, T_s]\times[0,L\Delta f]$) are automatically embedded into these TD- and FD-CEs as indications of matching. Hence these PDs play an important role in hypotheses-testing by the use of CCRs (see (30), Proposition 4 and (35), Proposition 5).

(summary3) Phase information of a signal has not been effectively used in ordinary MLEs to the contrary, the inventor defines 4 kinds of TD- and FD-cross-correlation function (CCF)s between a received signal and templates: TD-template CE of type 3 (or of type 1) and FD-template CE of type 4 (or of type 2) as a kind of optimum receivers. These CCFs are proven to have rigorous expressions in the product form of the ambiguity function (AF) and several twiddle factors, defined by a discretized signal of time- and frequency-samplings $\Delta t$, $\Delta f=(L\Delta t)^{-1}$, when co-operatively using BPSK modulation with TD- and FD-PCs, and denoted as
[MF18]

$$W = e^{-\frac{j2\pi}{L}}.$$

The PDs due to the NCP of TFSs can be evaluated in the powers of the twiddle factors, i.e., the summation of the PDs over the chip-address can be rigorously represented in the form of DFT and IDFT; Thus this expression has a product form of three functions (see (41) in Lemma 2, (45) in Lemma 4, and (52), (57)). In accordance with an embodiment of the present invention, an efficient computation by DSP can be guaranteed.

(summary4) Using the Youla's signal reconstruction method[22], the inventor gives a proof of the APT-based Phase Updating Loop (PUL) algorithm, defined and introduced in the patent reference, patent[1].

First, define $T_s$ (or $L\Delta t$)-time limited (TL) TD space, $E_3$ (or $E_1$) and $F_s$ (or $L\Delta f$)-band limited (BL) FD space $E_4$ (or $E_2$), as subspaces of the Hilbert space.

Secondly, according to the arrays of N' TD-CCFs and N FD-CCFs, define 4 projection operator (PO)s orthogonal projecting onto $E_3$ (or $E_1$) and onto $E_4$ (or $E_2$), denoted by $P_3$ (or $P_1$) and $P_4$ (or $P_2$), respectively.

Thirdly, in accordance with an embodiment of the present invention, the inventor defines the alternative projection theorem operator (APTO) based on the alternative projection theorem (APT), defined as

[MF19]

$$\mathcal{P}_3 \mathcal{F}^{-1,d} \mathcal{P}_4 \mathcal{F}^d \text{ (or } \mathcal{P}_4 \mathcal{F}^d \mathcal{P}_3 \mathcal{F}^{-1,d}),$$

where $F^{-1,d}, F^d$ denote the IDFT, DFT. Fourthly, the inventor gives an expression (59) for updating MLEs of a gain factor $Ae^{j\kappa}$ of the channel as a function of estimates

[MF20]

$$\hat{t}_d \hat{f}_D$$

and two expressions (60), (61) for updating MLE of

[MF21]

$$\hat{t}_d \hat{f}_D.$$

Using these three expressions for updating MLEs, the inventor concludes that $(t_d, f_D)$ are estimated within the convergence region of the APT operator, i.e., the rectangle of chip-pulse duration $L\Delta t$ and chip bandwidth $L\Delta f$ with chip and data addresses $((\rho,\rho'), \vec{p})$ and proves that MLEs

[MF22]

$$\hat{t}_d \hat{f}_D$$

are estimated within $L\Delta t \times L\Delta f$ and its computational complexity order is

[MF23]

$$\mathcal{O}(N+N'),$$

in place of

[MF24]

$$\mathcal{O}(N \cdot N').$$

That is, this APT operator singles out some rectangle in the time-frequency plane (TFP) and filters out other regions. Such an operator is referred to as a phase-space (or time-frequency) localization operator[7] and thus plays an important role of filters, in place of conventional sharp filters usually used in DSP.

A Gaussian function is not employed in most of communication systems primarily because it does not satisfy the Nyquist condition. However, several favourable properties of Gaussians in the TFP are shown to be of benefit to our $(t_d, f_D)$-estimation problem and hence Gaussians are shown to be of crucial importance.

The PUL algorithm is an iteration for searching $(t_d, f_D)$ with no restriction of the range of $(t_d, f_D)$ if the resource of time duration $PT_s$ and bandwidth $P'F_s$, for the data-level address

[MF25]

$$\vec{p} = (p, p')$$

can be available. Accordingly, it is shown that the use of a combination of a transmitter of a 2-D PC modulated signal of TD-, FD-Gaussian functions and a receiver in which the PUL is implemented in TD-, FD-CCF arrays makes it possible to provide a communication system which is capable of high-precision and high-speed parameter estimation. In other words, the use of the above-described configuration presents a paradigm shift in communication systems utilizing NCP.

(summary5) the inventor gives an encoding-decoding system for a high

[MF26]

$$\mathcal{M}$$

-PSK communication in cooperation with establishing synchronization.

[MF27]

$$\mathcal{M}$$

-PSK communication is available to an automotive radar capable of both estimating delay-Doppler and communicating to another object with data. It is not easy to transmit an

[MF28]

$$\mathcal{M}$$

-PSK signal

[MF29]

$$\exp\left(\frac{i2\pi k}{\mathcal{M}}\right), (0 \le k \le \mathcal{M} - 1)$$

primarily because the identification of the phase

[MF30]

$$\exp\left(\frac{i2\pi}{\mathcal{M}}\right)$$

is difficult in the midst of phase errors and phase noise; but is an important modulation for the sake of efficient use of radio resources (the number

[MF31]

$$\log_2 \mathcal{M} \text{-bit}$$

is transmitted at once). It is, however, known that the realization of this modulation/demodulation is difficult.

To solve this problem, as shown in the lower part (the intermediate block between the Switches 1-1 and 1-2) in FIG. 12, the transmitter 1) decomposes an integer ("information") k given as

[MF32]

$$k = j\mathcal{M}_0 + j', \ j = \left[\frac{k}{\mathcal{M}_0}\right] \left(= \text{the integer part of } \frac{k}{\mathcal{M}_0}\right)$$

$$j' = \left\{\frac{k}{\mathcal{M}_0}\right\} \left(= \text{the fractional part of } \frac{k}{\mathcal{M}_0}\right);$$

2) divides the delay-Doppler parameter space, called the target space equally into

[MF33]

$$\left(\left[\frac{\mathcal{M}-1}{\mathcal{M}_0}\right]+1\right)$$

sub-parameter spaces and assigns 2-D PC (TD- and FD-PCs) to each sub-space, where

[MF34]

$$(\mathcal{M} \ge \mathcal{M}_0).$$

Furthermore, the transmitter 1) 2-D BPSK modulates a chip pulse by the
[MF35]

$$i\left(, 0 \le i \le \left[\frac{M-1}{M_0}\right]\right)$$

-th 2-D PC; 2) combines it to form a
[MF36]

$$\left(\left[\frac{M-1}{M_0}\right]+1\right)$$

-code-multiplexed signal;
3) time-frequency-shifts the resultant signal (called a signature) about by around the center of the j-th sub-parameter space, i.e., by the time delay
[MF37]

$$k_d^{(j)}$$

and by the frequency delay
[MF38]

$$\ell_D^{(j)}$$

where
[MF39]

$$\text{shift}(k_d^{(j)}, \ell_D^{(j)})$$

is referred to as the shift of the j-th Artificial Channel (AC);
4) $M_0$-PSK modulates the time-frequency shifted signature by the j'-th
[MF40]

$$M_0$$

-ary symbol
[MF41]

$$\exp\left(\frac{i2\pi j'}{M_0}\right)(, 0 \le j' \le M_0 - 1)$$

and transmits the modulated signal. Consequently, the
[MF42]

$$(k_d^{(j)}, \ell_D^{(j)})$$

-shifted signature is again distorted by being passed through the Main Channel (MC) with shifts
[MF43]

$$(k_d, \ell_D).$$

The inventor designs a CCF between an estimated and received template and a received CE as follows. As shown in the middle block, connected to the Switch2-1 in FIG. 13, The receiver
1') decomposes an estimate of k
[MF44]

$$\hat{k}$$

as
[MF45]

$$\hat{k} = \hat{j} M_0 + \hat{j}', \hat{j} = \left[\frac{\hat{k}}{M_0}\right], \hat{j}' = \left\{\frac{\hat{k}}{M_0}\right\};$$

2') 2-D BPSK modulates a chip pulse by the
[MF46]

$$\hat{j}\left(, 0 \le \hat{j} \le \left[\frac{M-1}{M_0}\right]\right)$$

-th 2-D PC;
3') time-frequency-shifts it by the
[MF47]

$$\hat{j}$$

-th AC's
[MF48]

$$\text{shifts}(k_d^{(\hat{j})}, \ell_D^{(\hat{j})});$$

4') and $M_0$-PSK demodulates the resultant signal by the
[MF49]

$$\hat{j}'$$

-th
[MF50]

$$M_0$$

-ary symbol
[MF51]

$$\exp\left(\frac{i2\pi \hat{j}'}{M_0}\right)(, 0 \le \hat{j}' \le M_0 - 1).$$

The resultant signal is an estimated and received template.
Maximization of the real parts of N' TD-CCFs and N FD-CCFs using their associated LFs, in array forms, is performed in terms of the cardinal numbers of the CCFs, as a function of the chip-level address (ρ',ρ) and the data-level address
[MF52]

$$\vec{p} = (p, p'),$$

and a pair of estimated decoding integers of k:
[MF53]

$$(\hat{j}, \hat{j}').$$

The receiver 1) chooses the
[MF54]

$$\hat{j}$$

-th 2-D PC from
[MF55]

$$\left(\left[\frac{M-1}{M_0}\right]+1\right)$$

2-D PCs; 2) cancels-out the phase of the data $d_{\vec{p}}$ with address
[MF56]

$$\vec{p} = (p, p')$$

by the PSK signal
[MF57]

$$\exp\left(\frac{-i2\pi \hat{j}'}{\mathcal{M}_0}\right);$$

3) maximizes the real parts of the 2 CCFs based the PUL algorithm, as shown in the lower block, connected to the Switch2-2, in FIG. 13, in terms of
[MF58]

$$(k_d, \ell_D)$$

and
[MF59]

$$\hat{j}, \hat{j}',$$

and 4) obtains the MLE of k
[MF60]

$$k^* = j^* \mathcal{M}_0 + j^{*'}.$$

This is realized by constructing a low
[MF61]

$$\mathcal{M}_0$$

-ary PSK-modulation-based encoder-decoder system and combining the system, together with exploiting
[MF62]

$$\left(\left[\frac{\mathcal{M}-1}{\mathcal{M}_0}\right]+1\right)$$

ACs with non-commutative time-frequency shifts. This provides a high
[MF63]

$$\mathcal{M}$$

-ary PSK modulation communication system. Namely, this system is capable of being used also for a synchronizer (or radar) for estimating parameters, in cooperation with decoder of k, from the output signal of one AC chosen, according to k, from
[MF64]

$$\left(\left[\frac{\mathcal{M}-1}{\mathcal{M}_0}\right]+1\right)$$

ACs with non-commutative shifts, each of which is connected to the MC with shifts
[MF65]

$$(k_d, \ell_D).$$

Thus, the multiplexed system using non-commutative AC shifts may be a pradigm shift. Note that the computational complexity of
[MF66]

$$\mathcal{M}$$

-ary PSK-demodulation is about
[MF67]

$$\left(\sqrt{\left[\frac{\mathcal{M}-1}{\mathcal{M}_0}\right]+1}+\frac{\mathcal{M}_0}{\sqrt{\left[\frac{\mathcal{M}-1}{\mathcal{M}_0}\right]+1}}\right)$$

times larger than that of synchronizer (or radar), O(N+N'):
<<Detailed Description of Theoretical Issues of the Patent and Examples of Embodiment of Communication Systems>>

In accordance with an embodiment of the present invention, the inventor describes details of theoretical issues of communication systems and specific examples of an embodiment of the communication systems.

<1. Background of the Invention>

One of important problems to be solved in communication is to design a wireless communication system that can accommodate more traffic within a limited amount of radio spectrum[1]. Orthogonal Frequency Division Multiplex (OFDM) has been the dominant technology, as a TD- and FD-division multiplexed system to convey data of time $T_s$ and bandwidth $F_s$ (see FIG. 1); but, it has shortcomings that the orthogonality is destroyed due to time and frequency offsets.

FIG. 1 shows three kinds of divisions of the time-frequency plane (TFP): (a) indicates time division, (b) frequency division, and (c) Gabor division [1]. The solid lines in (a) show divisions of data of time duration T; the thin lines subdivisions by Time Domain (TD)-Phase code (PC); The dotted lines in (b) show divisions of data of bandwidth F; the dashed lines subdivisions by Frequency Domain (FD)-PC.

"Synchronisation" is the first procedure for communication through the channel with $t_d$, $f_D$. However, phase distortion (PD)s due to time and frequency shift operator (TFSO) needed to the TD- and FD-division multiplex
[MF68]

$$e^{j2\pi T_s F_s}$$

are followed by the PD of the channel
[MF69]

$$e^{j2\pi t_d f_D}.$$

Thus it is not easy to establish synchronisation. Moreover, there is no effective solution to the problem of estimating $t_d$, $f_D$ from an echo signal of radars.

The inventor first modulates TD-signal and its FT, i.e., FD-signal satisfying the time and frequency symmetrical property (TFSP) in terms of $t_d$, $f_D$ (see FIG. 2), by TD- and FD-PCs to design TD- and FD-signatures.

FIG. 2 shows an illustration of the NCP of TFSs (see [0014]), shows an illustration of the non-commutative property (NCP) of time and frequency shift (TFS)s: The NCP is manifested in the expression of the product of the shift operators $T_{\tau,0} \cdot T_{0,\upsilon} = e^{-i2\pi\tau\upsilon} T_{0,\upsilon} T_{\tau,0}$: Its LHS corresponds to the triangle in the figure; the RHS to the square; the Phase Distortion (PD) $e^{-i2\pi\tau\upsilon}$ appears; the circle in the figure shows the Symmetrical Time-Frequency Shift Operator (TFSO)[26]
[MF70]

$$\mathcal{T}_{\tau,\upsilon} \overset{\Delta}{=} e^{i\pi\tau\upsilon} \mathcal{M}_{\tau,0} \cdot \mathcal{T}_{0,\upsilon}.$$

Secondly, the inventor defines arrays of TD- and FD-CCFs (see FIG. 3b), in the form of AFs[15] as optimum receivers for detecting templates based on the fact that PDs are embedded into signatures as templates, As shown in [27]-[32], patent[1]-patent[6], the proposed estimation method firstly determines $t_d$, $f_D$ and the cardinal numbers of TD- and FD-CCFs maximizing the real parts of TD- and FD-CCFs; with no advance information about $t_d$, $f_D$ and secondly updates estimates of $t_d$, $f_D$ alternatively. Furthermore, it is shown that this method becomes a good solution to the radar problem. FIG. 3a indicates the Gabor function located on the TFP and its related issues: FIG. 3a0 shows Gaussian chip waveform $g_{mm'}(t)$ located on the TFP and its Fourier Transform (FT) $G_{mm'}(f)$; FIG. 3a1 indicates the real and imaginary parts of the TD-template, the combination of $g_{mm'}(t)$ weighted by the FD PC X'$_m$; FIG. 3a2 indicates the real and imaginary parts of the FD-template, the combination of $G_{mm'}(f)$ weighted by the TD PC $X_m$; FIG. 3b shows NN' Cross-Correlation Function (CCF)s, N' column-sums of values of the TD-CCFs, and N row-sums of values of the FD-CCFs; FIG. 3c shows the alternative projection, orthogonal projecting onto the Time-Limited Time Domain (TL-TD) and onto Band-Limited Frequency Domain (BL-FD), based on the Alternative Projection Theorem (APT), the estimated

[MF71]

$$\hat{t}_d, \hat{f}_D,$$

and convergent values $t_d$, $f_D$.

The problem of estimating $t_d$, $f_D$ from an echo signal is equivalent to that of determing two unknowns from PDs due to the NCP of TFSs. Hence, this belongs to the category of signal detection and estimation based on the Weyl-Heisenberg Group (WHG) theory. However, except Auslander & Tolimieri's remark[17], many radar researchers haven't obtained effective estimation methods with high precision yet because the NCP of TFSs was not taken into care in their estimation methods. On the contrary, the invention described in this disclosure is based on the inventor's belief that the NCP of TFSs only serves to strengthen the efficiency of communication systems including radars. The wavelet transform[8]. using the time and frequency shifted function, i.e., the Gabor elementary functions

[MF72]

$$g_{m,m'}(t) \triangleq g(t-mT_c)e^{i2\pi m'F'_c(t-mT_c)}$$

discusses series representations of the form

[MF73]

$$f(t) = \sum_{m,m'} a_{m,m'} e^{i2\pi m' v_0 t} g(t - m\tau_0)$$

and is primarily concerned with the coefficients $a_{m,m'}$. In wireless communication, the 5G, after 5G candidates: OFDM/OQAM, the filter bank multi-carrier (FBMC), and GFDM [9, 10, 12] have an interest in designing a multiplexed signal f(t) with information $a_{m,m'}$ to be transmitted and the elementary pulse g(t). Namely, the primary concern is the shape of g(t) that makes intersymbol interference (ISI) and interchannel interference (ICI) to zero and the orthogonality of $g_{m,m'}(t)$.

In wireless communication, synchronisation that's resistant to time and frequency offsets is necessary. However, there are a few attempts to estimate $t_d$, $f_D$. Furthermore, most of communication engineers considers that the PD due to TFSs $m\tau_0, m'v_0$

[MF74]

$$e^{i2\pi n r_0 m' v_0}$$

can be negligible. However, the group theoretic property of the WHG tells us that the PD of the channel

[MF75]

$$e^{i2\pi t_d f_D}$$

is followed by the PD due to TFSs

[MF76]

$$e^{i2\pi n s v m' v_0}$$

and the PD due to the multi-carrier technique

[MF77]

$$e^{i2\pi n' v_0 t_d}$$

arises simultaneously. The mechanism of phase errors arising is not simple.

One must start by solving the following three themes behind the radar problem. Note that Linear FM Continuous Wave with a chirp signal, a compressed pulse modulated by pulse of short time, and its multi-carrier version are used as a transmit signal in conventional radars [19].

(theme1) The radar problem in range and velocity is essentially a problem of two unknowns $t_d$, $f_D$; most of receivers is based on searching peaks of the magnitude of complex-valued ambiguity function (AF) of two variables, called the ambiguity surface or using the AF-characteristic of a chirp signal, It's a natural belief that when solving the problem relating to a given function of two unknowns, a way of dealing jointly with (independent) some other functions of the unknowns may be a better solving method.

(theme2) The radar problem is suffering from the PD

[MF78]

$$e^{j2\pi t_d f_D}$$

due to the NCP of the TFSs. Such a similar situation due to the NCP of position and momentum operators in quantum mechanics is observed. A chirp pulse sequence of time interval $T_p$ and frequency shift $F_p$ generates a PD

[MF79]

$$e^{j2\pi T_p F_p},$$

Furthermore, a communication system multiplexed by non-overlapped superposition of a signal on the TFP to covey data-symbols of time duration $T_s$ and bandwidth $F_s$, through the channel with $t_d$, $f_D$ is causing PD

[MF80]

$$e^{j2\pi t_d f_D}$$

followed by PD

[MF81]

$$e^{j2\pi T_s F_s}.$$

(theme3) Closely relating to the theme2, it is not easy to understand a mechanism whereby PD arises. That is, in communication systems and radars, two shift operators are usually defined as

[MF82]

$$S(a)f(t)=f(t+a), M(a)f(t)=e^{i2\pi a t}f(t), t \in \mathbb{R}$$

and give the NCP, represented as $M(v)S(u)=e^{-i2\pi u v}S(u)M(v)$ i.e., the NCP is manifested as the PD $e^{-i2\pi u v}$, in other words, the phase term of the product of two shifts comes from the fact that u, v are exponentiated. This observation is the same as the mathematical basis for the introduction of the Heisenberg group in quantum mechanics, proposed by Weyl. Hence such PD is an important clue to solve the radar or synchronisation problem and is purely symbolic one. Careful consideration should be given to the exponential function, i.e., $e^{-i2\pi uv}$. This leads to the symmetrical TFSO (see FIG. 2 and (4), (24)) that is main concern in the present invention.

<2. Symmetrical Time-Frequency Shift Operators>

Let s(t) denote a real-valued pulse, and let σ(t) denote the Hilbert transform of s(t). Then one gets a complex signal, referred to as an analytic signal, defined as ψ(t)=s(t)+iσ(t) [1]. A typical echo signal can be represented in the form

[MF83]
$$r_e(t;t_d,f_D)=A\,\Re\,\psi(t-t_d)e^{i\Omega(t-t_d)+i\varphi}, \quad (1)$$

where ψ(t) is the Complex Envelope (CE) of a pulse,

[MF84]
$$A,t_d,\Omega,\varphi,\Omega-\Omega_r=2\pi f_D$$

denote its amplitude, time of arrival, carrier frequency, the phase of its carrier, and a change in its carrier frequency, called the Doppler shift of the reference carrier $\Omega_r=2\pi f_r$. For brevity, let us assume $\Omega_r=0$ for a moment. Let

[MF85]
$$\mathcal{F}[\cdot]$$

denote the Fourier Transform (FT) and

[MF86]
$$\Psi(f)=\mathcal{F}[\psi(t)]$$

denote the FT of ψ(t), then the FT of $r_e(t; t_d, f_D)$ is in the form

[MF87]
$$R_e(f;t_d,f_D)=A\,\Re\,\mathcal{F}[\psi(t-t_d)e^{i2\pi f_D(t-t_d)}]e^{i\varphi}=A\,\Re\,\Psi(f-f_D)e^{-i2\pi f t_d+i\varphi}. \quad (2)$$

A pair of $r_e(t; t_d, f_D)$ and $R_e(f; t_d, f_D)$ is not symmetrical in $t_d$ and $f_D$ because the product of unknowns $t_d$ and $f_D$ appears only in the TD function (1).

But it can be represented in a slightly modified form[24, 26]

[MF88]
$$\mathcal{F}\left[\psi(t-t_d)e^{i2\pi f_D\left(t-\frac{t_d}{2}\right)}\right]=\Psi(f-f_D)e^{-i2\pi t_d\left(f-\frac{f_D}{2}\right)}. \quad (3)$$

If a TD function x(t) and its FD function

[MF89]
$$X(f)=\mathcal{F}[x(t)]$$

are symmetrical in terms of $t_d$ and $f_D$, then this property is called the time and frequency symmetrical property (TFSP) (see FIG. 2). Thus one can define a symmetrical time-frequency shift operators (TFSO) satisfying the TFSP, given as

[MF90]
$$\left.\begin{array}{l}\mathcal{T}_{t_d,f_D}x(t)=x(t-t_d))e^{i2\pi f_D\left(t-\frac{t_d}{2}\right)},\\ \mathcal{T}^f_{f_D,-t_d}X(f)=X(f-f_D)e^{-i2\pi t_d\left(f-\frac{f_D}{2}\right)}\end{array}\right\} \quad (4)$$

and get a trivial identity between the two operators (Property 1 of the Symmetrical TFSOs):

[MF91]
$$\mathcal{T}_{f_D,-t_d}^f=\mathcal{F}\,\mathcal{T}_{t_d,f_D}\,\mathcal{F}^{-1}. \quad (5)$$

Usually, the time shift operator $S(-t_d)x(t)=x(t-t_d)$ and the modulation operator

[MF92]
$$M(f_D)x(t)=e^{i2\pi f_D t}x(t)$$

are used. On the contrary, the shifts

[MF93]
$$\frac{t_d}{2}$$

in a TD signal x(t) and

[MF94]
$$\frac{f_D}{2}$$

in its FD signal X(f) in (4), hereafter called "half shifts", seem to be a few slight modifications to usual time-frequency representations of signal:

[MF95]
$$S(-t_d)M(f_D)x(t)=x(t-t_d)e^{i2\pi f_D(t-t_d)}$$

or

[MF96]
$$M(f_D)S(-t_d)x(t)=x(t-t_d)e^{i2\pi f_D t}.$$

But such half shifts are our intention to get effective representations of a radar signal and its received one so that their phase factors are fully traced in both the TD and FD as shown below.

Proposition 1: The TFSO (4) is identical to von Neumann's canonical commutative relations(usually abbreviated to CCRs) in quantum mechanics [4, 6] as referred to as the Stone-von Neumann theorem [5, 4, 25], defined as a two-parameter family of unitary operators S(a, b)= $e^{-1/2\,iab}U(a)V(b)$ with its group-theoretic property, where U(a), V(b) are defined below. $\mathcal{T}_{\tau,\nu}$ and $\mathcal{T}^f_{\nu,-\tau}$ are referred to as von Neumann's TFSO s hereafter.

The Heisenberg commutation relation, referred to as the Heisenberg's uncertainty principle, is given as [4, 5]

[MF97]
$$[Q,P]=QP-PQ=ih. \quad (6)$$

Proposition 2: Let us assume that Q and P can be exponentiated to one-parameter unitary groups U(a)=exp(iaQ), V(b)=exp(ibP), respectively (a, b real) and let us associate Q, P with TFSOs $\mathcal{T}_{\tau,0}$, $\mathcal{T}_{0,\nu}$, respectively, then

[MF98]
$$[\mathcal{T}_{\tau,0},\mathcal{T}_{0,\nu}]=-2i\,\sin\left(\pi\left|\begin{array}{cc}\tau & 0\\ 0 & \nu\end{array}\right|\right)\mathcal{T}_{\tau,\nu}. \quad (7)$$

Thus, the classical limit, i.e.,

[MF99]
$$h\to 0$$

limit[20] corresponds to

[MF100]
$$[\mathcal{T}_{\tau,0},\mathcal{T}_{0,\nu}]=0, \text{ PD-free, i.e., } \tau\nu\in\mathbb{N}, \quad (8)$$

where

[MF101]
$$h_s[\cdot,\cdot]$$

denote the reduced Planck's constant
[MF102]

$$\frac{h}{2\pi}$$

and the quantum mechanics commutator.
The composition of TFSOs
[MF103]

$$\mathcal{T}_{t_1,f_1}\mathcal{T}_{t_2,f_2} = e^{i\pi(t_1 f_1 + t_2 f_2)}\mathcal{T}_{t_1,0}\mathcal{T}_{0,f_1}\mathcal{T}_{t_2,0}\mathcal{T}_{0,f_2} =$$
$$e^{i\pi(t_1 f_1 + t_2 f_2 + 2t_2 f_1)}\mathcal{T}_{t_1,0}\mathcal{T}_{t_2,0}\mathcal{T}_{0,f_1}\mathcal{T}_{0,f_2} =$$
$$e^{i\pi(t_1 f_1 + t_2 f_2 + 2t_2 f_1 - (t_1+t_2)(f_1+f_2))}\mathcal{T}_{t_1+t_2,f_1+f_2}$$

gives
(Property 2 of the Symmetrical TFSOs):
[MF104]

$$\left.\begin{array}{c}\mathcal{T}_{t_1,f_1}\mathcal{T}_{t_2,f_2} = e^{-i\pi\left|\begin{array}{cc}t_1 & f_1\\t_2 & f_2\end{array}\right|}\mathcal{T}_{t_1+t_2,f_1+f_2},\\ \mathcal{T}^f_{f_1,-t_1}\mathcal{T}^f_{f_2,-t_2} = e^{-i\pi\left|\begin{array}{cc}t_1 & f_1\\t_2 & f_2\end{array}\right|}\mathcal{T}^f_{f_1+f_2,-t_1-t_2},\end{array}\right\} \quad (9)$$

Eq. (7) is an example of the first equation in eq. (9).

The fact that the product of unknowns $t_d$ and $f_D$ appear symmetrically in the exponent of PDs of TD- and FD-functions from their symmetry property is the more important property of the symmetrical TFSOs. Chip- and data-level addresses of the multiplexed signal appeared in the the exponent of PDs as well. The product of such exponents enables us to easily estimate parameters as discussed below. For example, in wireless communication[9, 10] an orthogonal frequency division multiplex (OFDM) signal
[MF105]

$$f(t) = \sum_{m,n} a_{m,n} e^{i2\pi m v_0 t} x(t - n\tau_0), \text{ with } v_0\tau_0 = 1 \quad (10)$$

is the main subject, where the coefficients $a_{m,n}$ take complex values representing an encoded transmit data, and x(t) is a prototype function. The OFDM signal is rewritten as
[MF106]

$$f(t) = \sum_{m,n} a_{m,n} e^{i\pi n\tau_0 m v_0} \mathcal{T}_{n\tau_0, m v_0} x(t). \quad (11)$$

Hence the PD $e^{i\pi n\tau_0 m v_0}$ does not alter the $a_{m,n}$ except its sign as far as the condition $\tau_0 v_0 = 1$ holds (cf. (8)). But if there are offsets such as $\tau' = \tau_0 + \varepsilon_\tau$ and $v' = v_0 + \varepsilon_v$, then the PD
[MF107]

$$e^{-i\pi\left|\begin{array}{cc}\tau_0+\varepsilon_\tau & 0\\ 0 & v_0+\varepsilon_v\end{array}\right|} = (-1)^{\tau_0 v_0} e^{-i\pi(\varepsilon\cdot v_0 + \varepsilon_v\cdot\tau_0 + \varepsilon_\tau\varepsilon_v)}$$

inevitably arises followed by the PD
[MF108]

$$e^{-i\pi t_d f_D}$$

through a doubly dispersive channel with $t_d$ and $f_D$. That is, we have to confront a phase-distorted signal
[MF109]

$$\mathcal{T}_{t_d, f_D} f(t) = \sum_{m,n} a_{m,n} e^{-i\pi(t_d f_D + 2t_d m v_0)} x(t - n\tau_0 - t_d) e^{i2\pi(m v_0 + f_D)t}. \quad (12)$$

The conventional non-overlapping superposition of a signal in the TFP [1, 2, 9, 10, 12], defined as in (10) is causing an accumulation of the PD
[MF110]

$$e^{i\pi 2 t_d m v_0}$$

because of its group-theoretic property like (12). Hence the PDs directly weaken the output of the receiver and give a serious deterioration in "synchronisation" needed in digital communication systems[3]. On the contrary, the main concern is the design of the prototype function x(t) to reduce inter-symbol interference (ISI) and inter-channel interference (ICI). Such simple observation provides a starting point for this study.

<3. Likelihood Functionals and Cross-Correlation Functions>

To begin with, we have to study a brief review of Woodward's[15] statistical approach to the analysis and design of optimum radar systems, and Helstrom's[18] comprehensive study on theory and practice of signal detection and estimation.

It is an important observation that these approaches used only Abelian harmonic analysis as Auslander and Tolimieri's remark on Wilcox's study[16].

However, the fundamentals of radar theory reside in the following signal detection and parameter estimation theory.

<3.1 Signal Detection>

When a radar signal appears in a receiver, its detection is made uncertain by the simultaneous presence of noise.

Consider the simplest signal-detection problem, that of deciding whether a signal s(t) of specified form has arrived at a definite time in the midst of Gaussian noise n(t). An input w(t) to the receiver is measured during an observation interval
[MF111]

$$0 \leq t \leq T.$$

On the basis of this input an observer must choose one of two hypotheses, $H_0$, "there is no signal," i.e., w(t)=n(t), and $H_1$, "the signal is present," i.e., w(t)=s(t)+n(t). When $w_k$=w($t_k$) is measured at time t=$t_k$ during the observation interval, the n samples $w_k$ are random variables having a joint probability density function (p.d.f.) $p_i(w)$ under hypotheses $H_i$, i=0, 1, and the observer's decision is best made on the basis of the likelihood ratio $\Lambda(w)=p_1(w)/p_0(w)$, w=($w_1, \ldots, w_n$).

For a fixed decision level $\Lambda_0$ the observer chooses hypothesis $H_0$ if $\Lambda(w)<\Lambda_0$; $H_1$ if $\Lambda(w)>\Lambda_0$.

A radar signal can be written simply as [15, 18]
[MF112]

$$s(t) = \Re\, \psi(t) e^{i\Omega t},$$

where $\psi(t)$ is its CE and $\Omega=2\pi f_c$ the carrier frequency. If the spectrum of the signal s(t)
[MF113]

$$S(f) = \mathcal{F}[s(t)] = \tfrac{1}{2}[\Psi(f-f_c) + \Psi^*(-f-f_c)],\ \Psi(f) = \mathcal{F}[\psi(t)]$$

exhibits two narrow peaks, one near the frequency $f_c$ and the other near $-f_c$, and if the widths of the bands are much smaller than $\Omega$, the signal is termed narrowband (NB) or quasi-harmonic.

Assume that the input to the receiver
[MF114]

$$w(t) = \Re \, \psi_w(t) e^{i\Omega t}$$

is NB and the CE
[MF115]

$$\psi_w(t)$$

can be measured by a mixer.

In the presence of stationary NB white Gaussian noise with the auto-covariance function
[MF116]

$$\phi(\tau) = \Re \, \tilde{\phi}(\tau) e^{i\Omega \tau}, \tilde{\phi}(\tau) = N_0 \delta(\tau),$$

an optimum detector of the NB signal
[MF117]

$$s(t) = \Re \, \psi(t) e^{i(\Omega t + \varphi)}$$

has the logarithm of its LF (LLF)[18, p. 106]
[MF118]

$$\ln \Lambda[\psi_w(t)] = g - \frac{d^2}{2}, \; g = \Re \frac{e^{-i\varphi}}{N_0} \int_0^T \psi^*(t) \psi_w(t) dt, \quad (13)$$

$$d^2 = \frac{1}{N_0} \int_0^T |\psi(t)|^2 dt,$$

in which $N_0$ is the unilateral spectral density of the white noise, g, being generated by passing the input $\psi_w(t)$ through a filter[19] matched to the signal $\psi(t)$ to be detected, and $d^2$ are referred to as the statistic and the signal-to-noise ratio (SNR) of the LF $\Lambda[\psi_w(t)]$.

<3.2 Estimation of Signal Parameters>

The principle in hypothesis testing can be applied to choices among multiple hypotheses as follows. Suppose that a transmitter is sending a signal using one of M signals. The receiver is to decide which of these M signals is present during the observation interval (0,T). Namely, under hypothesis $H_k$, "a signal $s_k(t)$ was sent", an input to the receiver is
[MF119]

$$w(t) = s_k(t) + n(t), s_k(t) = \Re \, \psi_k(t) e^{i(2\pi f_k t + \varphi_k)}, \; 1 \le k \le M, \quad (14)$$

where $\psi_k(t)$ is the NB CE, $f_k$ the carrier,
[MF120]

$$\varphi_k$$

denotes the phase of $s_k(t)$, and n(t) random noise.

The receiver chooses one of the M hypotheses on the basis of measurements of its input w(t). Suppose that the receiver makes n measurements $w_1, \ldots, w_n$ of its input w(t). Let $p_k(w)$ be the joint p.d.f. of these data under hypothesis $H_k$ and let $\zeta_k$ be the prior probability of that hypothesis. The likelihood ratio for detecting the k th signal in the presence of n(t) is defined by $\Lambda_k(w) = p_k(w)/p_0(w)$, where $p_0(w)$ denotes the p.d.f. under a dummy hypothesis. For simplicity, assume that $\zeta_k = M^{-1}$, under the orthogonality of the signals $s_k(t)$
[MF121]

$$\int_0^T s_i^*(t) s_j(t) dt = E_i \delta_{ij},$$

($E_i$ is the energy of the i th signal) then the receiver simply decides $H_k$ if $\Lambda_k(w) > \Lambda_j(w)$, for all $k \ne j$.

Denote the unknown parameters of the signal by $\theta_1, \ldots, \theta_m$ and represent them by a vector $\theta = (\theta_1, \ldots, \theta_m)$ in an m-dimensional parameter space, designated by $\Theta$.

A radar echo can be represented in the form
[MF122]

$$s_{echo}(t; A, \kappa, t_d, f_D) = A \Re \, e^{i\kappa} \psi(t - t_d) e^{i2\pi f_c(t - t_d)}, \; f_c = f_r + f_D, \quad (15)$$

where $Ae^{i\kappa}$ denotes the attenuation factor, A its amplitude, $t_d$ its time of arrival, $f_c$ its carrier frequency, $\kappa$ the phase of its carrier, and $f_D$ the Doppler shift of its reference carrier $f_r$. Unknown parameters in the echo signal (15) are given as $\theta = (A, \kappa, t_d, f_D)$. When
[MF123]

$$w(t) = \Re \, \psi_w(t) e^{i2\pi f_r t}$$

and the noise is white with unilateral spectral density $N_0$, the LLF[18, p. 251] is
[MF124]

$$\ln \Lambda[w(t); \theta] =$$

$$\Re \left[ \frac{Ae^{-i\kappa}}{N_0} \int_0^T \psi^*(t - t_d) e^{-i2\pi f_D(t - t_d)} \psi_w(t) dt \right] - \frac{A^2}{2N_0} \int_0^T |\psi(t - t_d)|^2 dt.$$

Using a change of variables such as
[MF125]

$$Ae^{i\kappa} = u + iv, \; u = \Re \, Ae^{i\kappa}, \; v = \Im Ae^{i\kappa}.$$

Here
[MF126]

$$\Im$$

denotes the imaginary part of the complex number following it. Thus one gets the maximum likelihood estimate (MLE) of A, $\kappa$ containing $\theta' = (t_d, f_D)$, given by [18, p. 251].
[MF127]

$$\hat{A}(\theta') e^{i\hat{\kappa}(\theta')} = \hat{u} + i\hat{v} = \frac{z(\theta')}{d^2(\theta')}, \; \hat{u} = \Re \hat{A}(\theta')^{i\hat{\kappa}(\theta')}, \; \hat{v} = \Im \hat{A}(\theta')^{i\hat{\kappa}(\theta')}, \quad (16)$$

$$z(\theta') = \frac{1}{N_0} \int_0^T \psi^*(t - t_d) e^{-i2\pi f_D(t - t_d)} \psi_w(t) dt,$$

$$d^2(\theta') = \frac{1}{N_0} \int_0^T |\psi(t - t_d)|^2 dt.$$

The MLEs of the remaining parameters $\theta'$ are those that maximize[18, p. 251]
[MF128]

$$\max_{u,v} \ln \Lambda[w(t)|u, v, \theta'] = \frac{|z(\theta')|^2}{2d^2(\theta')}.$$

Hence one can concentrate one's efforts on estimating the $\theta'$. For one of a closely spaced set of values of the Doppler shift
[MF129]

$$f_D \in \left( -\frac{W_D}{2}, \frac{W_D}{2} \right),$$

the MLE $\theta'$ could be obtained by building a bank of parallel filters, each matched to a signal of the form
[MF130]

$$\Re \, \psi(t) e^{i2\pi(f_r + f_D)t},$$

where $W_D$ is the maximum range of the expected Doppler shift. It is, however, not easy to examine statistics by constructing a bank of NB filters in parallel. This fact leads one to decompose the 2-unknown-parameter problem into 2 single-unknown-parameter problems.

Let us rewrite (15) and its FT in the form
[MF131]

$$s_{echo}(t;A,\kappa,t_d,f_D) = A\,\Re\, e^{i\kappa}\mathcal{T}_{t_d,f_D}\mathcal{T}_{0,f_r}\psi(t)e^{i\varphi_0},$$

$$S_{echo}(f;A,\kappa,t_d,f_D) = A\,\Re\, e^{i\kappa}\mathcal{T}_{f_D,-t_d}\mathcal{T}_{f_r,0}\Psi(f)e^{i\varphi_0}, \Psi(f)=$$
$$\mathcal{F}[\psi(t)],$$

where
[MF132]

$$\mathcal{T}_{t_d,f_D}$$

is a von Neumann's TFSO with $t_d$ and $f_D$ where
[MF133]

$$\psi(t),\varphi_0$$

denote the CE to be designed and its phase (its detail is omitted here), and
[MF134]

$$\mathcal{T}_{0,f_r}\varphi(t)$$

a passband signal shifted from the baseband CE by the reference frequency $f_r$.

Using pulse code techniques with the TD-PC of period N and the FD-PC of period N', one can want to make clear the exact location of $(t_d, f_D)$ in a 2-dimensional lattice
[MF135]

$$T_c\mathbb{Z} \times F_c\mathbb{Z}$$

in the TFP, where $T_c=T_s/N$, $F_c=F_s/N'$, $T_s$, and $F_s$ denote a chip-pulse spacing, chip (sub-) carrier-spacing, signal (or data)-duration, and carrier-spacing, Divide the $(t_d, f_D)$-parameter space $\Theta'$ into a large number NN' of small rectangular regions $\Delta^{\vec{q}}_{m,m'}$ with the data address
[MF136]

$$\vec{q}=(q,q'),$$

defined as
[MF137]

$$\Delta^{\vec{q}}_{m,m'} = \{(t_d, f_D) \in \mathbb{R}^2 | mT_c \le t_d - qT_s < (m+1)T_c, \quad (17)$$
$$m'F_c \le f_D - q'F_s < (m'+1)F_c\},$$
$$0 \le m \le N-1, 0 \le m' \le N'-1$$

and denote by $H_{m,m'}$ the proposition "The parameter set $\theta'$ lies in region
[MF138]

$$\Delta_{m,m'}^{\vec{q}}."$$

However, NN' such hypotheses $H_{m,m'}$ can be decomposed into N' hypotheses for estimating $f_D$ in the TD signal $s_{echo}(t; A, \kappa, t_d, f_D)$ and N hypotheses for estimating $t_d$ in the FD signal $S_{echo}(f; A, \kappa, t_d, f_D)$ as discussed below.

Provided that the signals $s_k(t;\theta')$ are orthogonal, in hypothesis $H_k$ associated with (14), for the CE $\psi_k(t)$ and phase
[MF139]

$$\varphi_k,$$

consider the kth NB echo signal
[MF140]

$$s_k(t;\theta') = A\,\Re\, e^{i\kappa}\psi_k(t-t_d)e^{i2\pi(f_k+f_D)(t-t_d)+i\varphi_k}.$$

If the noise is white and Gaussian with unilateral spectral density $N_0$, then its TD-LLF [18, p. 129, p. 251] is
[MF141]

$$\ln\Lambda_k[w(t); A, \kappa, \theta'] = g_k(\theta') - \frac{d_k^2(\theta')}{2}, \quad (18)$$

$$d_k^2(\theta') = \frac{A^2}{N_0}\int_0^T |\psi_k(t-t_d)|^2 dt,$$

$$g_k(\theta') = \Re\frac{Ae^{-i(\kappa+\varphi_k)}}{N_0}\int_0^T \psi_k^*(t-t_d)e^{-i2\pi(f_k+f_D-f_w)(t-t_d)}\psi_w(t)dt.$$

Let $k=k_0$ be an integer satisfying
[MF142]

$$\max_{1 \le k \le M} \frac{|g_k(\theta')|}{d_k(\theta')} > r_0$$

for a given decision level $r_0$; Then the receiver decides the kth signal has been arrived; If all statistics $g_k$ lie below $r_0$, the receiver decides that no signal was transmitted. This is referred to as an ML receiver. Hence a construction of orthogonal signals $s_k(t)$ is of crucial importance. Equation (18) suggests two ways of maximizing $|g_k(\theta')|$: one is maximizing the integrand and the other is canceling out the phase factors $e^{i\kappa}$ of the carrier and
[MF143]

$$e^{i\varphi_k}$$

of the signal $s_k(t)$. The phase factor, however, is usually absorbed into
[MF144]

$$\psi_k(t)$$

by re-definition; moreover not $g_k(\theta')$ but $|g_k(\theta')|$ is simply evaluated. These strategies annihilate the phase information. Woodward[15] used a two-dimensional CCF, called the ambiguity function (AF), early defined by Ville[14], that plays a central role in the radar signal design. It is given by the definition
[MF145]

$$\theta_{xy}(\tau, \nu) = \int_{-\infty}^{\infty} x\left(t+\frac{\tau}{2}\right)y^*\left(t-\frac{\tau}{2}\right)e^{-i2\pi\nu t}dt,$$

$$\Theta_{XY}(\nu, -\tau) = \int_{-\infty}^{\infty} X\left(f+\frac{\nu}{2}\right)Y^*\left(f-\frac{\nu}{2}\right)e^{i2\pi f\tau}df,$$

$$X(f) = \mathcal{F}[x(t)], Y(f) = \mathcal{F}[y(t)].$$

Non-commutative and group-theoretic properties of WHG-based time-frequency-shifted waveforms are manifested in the cisoidal factors in (9).

In addition, one can get:
Proposition 3 [Property3 of symmetric TFSOs]: For a TD signal $z(t)$ and its FT
[MF146]

$$Z(f) = \mathcal{F}[z(t)],$$

the inner product (IP)s between the TD and FD time-frequency-shifted signals can be expressed as

[MF147]

$$\left. \begin{array}{l} \langle \mathcal{T}_{t_1,f_1} z(t), \mathcal{T}_{t_2,f_2} z(t) \rangle_t = e^{-i\pi \left| \begin{array}{cc} t_1 & f_1 \\ t_2 & f_2 \end{array} \right|} \Theta_{z,z}(t_2 - t_1, f_2 - f_1), \\ \langle \mathcal{T}_{f_1,-t_1}^f Z(f), \mathcal{T}_{f_2,-t_2}^f Z(f) \rangle_f = e^{-i\pi \left| \begin{array}{cc} t_1 & f_1 \\ t_2 & f_2 \end{array} \right|} \Theta_{Z,Z}(f_2 - f_1, -t_2 + t_1), \end{array} \right\} \quad (19)$$

where
[MF148]

$$\langle r(t), s(t) \rangle_t = \int_{-\infty}^{\infty} r(t) s^*(t) dt$$

denotes the TD IP of r(t) and s(t), and the FD IP
[MF149]

$$\langle R(f), S(f) \rangle_f = \int_{-\infty}^{\infty} R(f) S^*(f) df = \langle r(t), s(t) \rangle_t$$

of
[MF150]

$$R(f) = \mathcal{F}[r(t)]$$

and
[MF151]

$$S(f) = \mathcal{F}[s(t)].$$

Equation (19) shows that: i) both the real parts of the TD and FD IPs are maximized when $t_2=t_1$ and $f_2=f_1$, for which the maxima of the AF are attained; ii) if the left and right terms of the IP are thought of as the input signal $\psi_w(t)$ and a signal $\psi(t)$ to be detected, respectively of the statistic g in LLF (13), then $\psi(t)$ may cancel-out the input signal's PD to enhance the statistic g. Proposition 3 emphasizes the importance of "phase" of a modulated signal like the "phasors" used in analysing alternating currents and voltages in electrical engineering[18, xv, p. 91], and tells us that two quantities $t_d$ and $f_D$ always appear in a phase term. This is a major step toward $(t_d, f_D)$-estimations in the TD and FD, based on the WHG theory, in distinct contrast to the conventional methods using matched filters[18], performed only in the TD. If one can design a signal so that its phase terms have been endowed with easy-traceability, one may utilize the both the PDs of $\psi_w(t)$, $\psi(t)$ of the statistic in the TD- and FD-LLFs.

Gabor[1] stressed the importance of analysis in the TFP and the utility of the Gaussian wave $2^{1/4} e^{-\pi t^2}$ attaining the lower bound of the uncertainty relation of time and frequency.

He gave the time-frequency representation of a function f:
[MF152]

$$\left. \begin{array}{l} f(t) = \sum_{n,m \in \mathbb{Z}} a_{m,n} g_{m,n}(t), \, a_{m,n} = \langle g_{m,n}, f \rangle_t, \, m,n \in \mathbb{Z}, \\ g_{m,n}(t) = g(t - n\tau_0) e^{2\pi i m \nu_0 t}, \, \tau_0 \nu_0 = 1, \, m,n \in \mathbb{Z}. \end{array} \right\} \quad (20)$$

It is well known [9, p. 985] that the set of Gaussian functions $g_{m,n}(t)$ forms a basis of $L^2(R)$ having good properties regarding time and frequency localization but this basis is not orthonormal and the set of the functions is not even a frame[7]. See [7, 9] for a review on the double series representation (20). Most of communication engineers does not employ a Gaussian function primarily because it does not satisfy the Nyquist condition. In our $(t_d, f_D)$-estimation problem, however, several favourable properties of Gaussians in the TFP play an important role.

<4. Signature Waveforms and Templates in TD and FD>

TD-PC techniques, i.e., spreading spectrum (SS) techniques[3] can provide the simultaneous use of a wide frequency band, via code-division multiple access (CDMA) techniques, in which a signal to be transmitted s(t) is modulated by an independent pulse code c(t) so that its bandwidth is much greater than that of the message signal m(t), e.g., s(t)=m(t)c(t) and each user is assigned a pulse code such that the signals are orthogonal.

In order for the CE
[MF153]

$$\psi(t)$$

to satisfy the time and frequency symmetrical property (TFSP), its FT $\Psi(f)$ should also be phase coded.

In place of continuous-time signals in
[MF154]

$$\mathcal{L}_2(\mathbb{R}),$$

consider discrete-time signals in
[MF155]

$$\ell_2(\mathbb{Z}_s)$$

and assume that a TD signal s(t) is sampled with a sampling interval $\Delta t$, while a discrete-frequency signal is obtained by the L-point discrete Fourier transform (DFT). Hence the frequency gap between two adjacent frequency bins in the FD is $\Delta f = 1/(L\Delta t)$.

Let
[MF156]

$$k = \left\lfloor \frac{t}{\Delta t} \right\rfloor$$

(the truncation of fraction
[MF157]

$$\frac{t}{\Delta t})$$

and
[MF158]

$$\ell = \left\lfloor \frac{f}{\Delta f} \right\rfloor$$

(the truncation of fraction
[MF159]

$$\frac{f}{\Delta f})$$

be discrete variables of time t and frequency f. For the orthogonality of a chip pulse, let assume
[MF160]

$$F_c = \frac{1}{T_c}$$

and let
[MF161]

$$T_c = M\Delta t, F_c = M'\Delta f.$$

Thus one can define the L-point twiddle factor
[MF162]

$$W = e^{-\frac{i2\pi}{L}}, L = MM'.$$

Define the following 7 different kinds of discrete-time and discrete-frequency signals:
[MF163]
TD, FD pulse waveforms: $g[k]$, $G[\ell]$,
TD, FD templates: $u_{m'}^{(3)}[k; X]$, $U_m^{(4)}[\ell; X']$,
TD, FD signatures: $v[k; \chi]$, $V[\ell; \chi]$,
TD, FD transmit signals: $s[k; \chi]$, $S[\ell; \chi]$,
CE of $s[k; \chi]$, FT of $\psi[k; \chi]$:$\psi[k; \chi]$, $\Psi[\ell; \chi]$,
TD, FD received signals: $r[k; \chi]$, $R[\ell; \chi]$,
CE of $r[k; \chi]$, FT of $\psi_r[k; \chi]$:$\psi_r[k; \chi]$, $\Psi_R[\ell; \chi]$,
where $X = (X_0, \ldots, X_{N-1}) \in \{-1,1\}^N$ is a TD-PC of period N, $X' = (X'_0, \ldots, X'_{N'-1}) \in \{-1,1\}^{N'}$ an FD-PC of period N', and $\chi = (X, X')$.

For a continuous chip-pulse $g(t)$ having support $[-L\Delta t/2, L\Delta t/2]$, i.e., duration $L\Delta t$, one can obtain its causal discrete-time $L\Delta t$-time-limited (TL) chip-pulse $g[k]$ with delay[10] $(D/2)\Delta t, D=L-1, L=(\Delta t \Delta f)^{-1} = MM'$
[MF164]

$$g[k] = \sqrt{\Delta t}\, g\left(\left(k - \frac{D}{2}\right)\Delta t\right), |k| \le L/2 \quad (21)$$

and define its discrete-frequency $L\Delta f$-band-limited (BL) chip-pulse $G[\simeq]$ having support $[-L\Delta f/2, L\Delta f/2]$, i.e., bandwidth $L\Delta f$, by the DFT of $g[k]$
[MF165]

$$G[\ell] = \mathcal{F}^d[g[k]] = \frac{1}{\sqrt{L}} \sum_{k=0}^{L-1} g[k] W^{k\ell}, 0 \le \ell \le L-1.$$

Introduce now a discrete-time TD-signature $v[k; \chi]$ and an FD-signature $V[\ell; \chi]$ defined as
[MF166]

$$v[k; X] = \frac{1}{\sqrt{N'}} \sum_{m'=0}^{N'-1} X'_{m'} \mathcal{T}_{0,m'M}^d u_{m'}^{(3)}[k; X],$$

$$V[\ell; X] = \frac{1}{\sqrt{N}} \sum_{m=0}^{N-1} X_m \mathcal{T}_{0,-mM}^{f,d} U_m^{(4)}[\ell; X'], \quad (22)$$

in terms of a TD-template of type-3
[MF167]

$$u_{m'}^{(3)}[k; X]$$

and an FD-template of type-4
[MF168]

$$U_m^{(4)}[\ell; X'],$$

respectively defined by $$u_{m'}^{(3)}[k; X] = \frac{1}{\sqrt{N}} \sum_{m=0}^{N-1} X_m e^{-i\pi mm' MM' \Delta t \Delta t} \mathcal{T}_{mM,0}^d g[k], \quad (23)$$

$$0 \le m' \le N'-1,$$

$$U_m^{(4)}[\ell; X'] = \frac{1}{\sqrt{N'}} \sum_{m'=0}^{N'-1} X'_{m'} e^{i\pi mm' MM' \Delta t \Delta t} \mathcal{T}_{m'M',0}^{f,d} G[\ell],$$

$$0 \le m \le N-1,$$

where
[MF169]

$$\mathcal{T}_{a,b}^d g[k]$$

and
[MF170]

$$\mathcal{T}_{b,-a}^{f,d} G[\ell], a,b,k, \ell \in \mathbb{Z},$$

denote discrete analogues of von Neumann's TFSOs in the TD and FD in (4), respectively defined by
[MF171]

$$\mathcal{T}_{a,b}^d z[k] = z[k-a] W^{-b\left(k-\frac{a}{2}\right)}, a, b, k, \in \mathbb{Z},$$

$$\mathcal{T}_{b,-a}^{1,d} Z[\ell] = Z[\ell-b] W^{a\left(\ell-\frac{b}{2}\right)}, a, b, \ell, \in \mathbb{Z}. \quad (24)$$

The TD-signature $v[k; \chi]$ contains N' TD-templates of type-3
[MF172]

$$u_{m'}^{(3)}[k; X], 1 \le m' \le N',$$

while the FD-signature
[MF173]

$$V[\ell; \chi]$$

does N FD-templates of type-4
[MF174]

$$U_m^{(4)}[\ell; X'], 1 \le m \le N$$

so that the CCF between such a signature and its embedded template may have a large value via the phase coding. Note that the TD-template
[MF175]

$$u_{m'}^{(3)}[k; X]$$

has a rectangular support $NM\Delta t \times L\Delta f$ in the TFP, while the FD-template
[MF176]

$$U_m^{(4)}[\ell; X']$$

has a support $L\Delta t \times N'M'\Delta f$. Substituting the compositions of TFSOs
[MF177]

$$\mathcal{T}_{0,m'M'}^d, \mathcal{T}_{mM,0}^d g[k]$$

(resp.
[MF178]

$$\mathcal{T}_{0,-mM}^{f,d} \mathcal{T}_{m'M',0}^{f,d} G[\ell]$$

) into (22) shows that the TD-signature and FD-signature
[MF179]

$$v[k; \mathcal{X}] = \frac{1}{\sqrt{NN'}} \sum_{m=0}^{N-1} \sum_{m'=0}^{N'-1} X_m X'_{m'} \mathcal{T}^d_{mM,m'M'} g[k], \quad (25)$$

$$V[\ell; \mathcal{X}] = \frac{1}{\sqrt{NN'}} \sum_{m=0}^{N-1} \sum_{m'=0}^{N'-1} X_m X'_{m'} \mathcal{T}^{f,d}_{m'M',-mM} G[\ell]$$

are perfectly symmetrical. Suppose that a radar TD-signal s[k;χ] with its CE
[MF180]

$$\psi[k;\mathcal{X}]$$

and the carrier
[MF181]

$$\ell_c = \left\lfloor \frac{\Omega}{2\pi \Delta f} \right\rfloor$$

and its FT, FD-signal S[l;χ] have the form
[MF182]

$$s[k; \mathcal{X}] = \Re \psi[k; \mathcal{X}] W^{-\ell_c k}, \quad (26)$$
$$S[\ell; \mathcal{X}] = \frac{1}{2}(\Psi[\ell - \ell_c; \mathcal{X}] + \Psi^*[-\ell - \ell_c; \mathcal{X}]), \Psi[\ell; \mathcal{X}] = \mathcal{F}^d[\psi[k; \mathcal{X}]].$$

Writing the CE and its DFT in the form
[MF183]

$$\psi[k; \mathcal{X}] = \frac{1}{\sqrt{PP'}} \sum_{q,q'=0}^{P-1,P'-1} d_{\vec{q}} \cdot \mathcal{T}^d_{qNM,q'N'M'} v[k; \mathcal{X}], \quad (27)$$

$$\Psi[\ell; \mathcal{X}] = \frac{1}{\sqrt{PP'}} \sum_{q,q'=0}^{P-1,P'-1} d_{\vec{q}} \cdot \mathcal{T}^{f,d}_{q'N'M',-qNM} V[\ell; \mathcal{X}],$$

one can design the radar TD- and FD-signals
[MF184]

$$s[k;\chi], S[\ell;\chi].$$

This is a 2-dimensional train of PP' non-overlapped signatures
[MF185]

$$v[k;\chi]$$

(resp.
[MF186]

$$V[\ell;\chi])$$

of duration $T_s = NM\Delta t$ and carrier-spacing $F_s = N'M'\Delta f$, where
[MF187]

$$d_{\vec{q}} \in \mathbb{C}$$

is a data symbol on the lattice
[MF188]

$$T_s \mathbb{Z}_s \times F_s \mathbb{Z}_s$$

of the TFP, with address
[MF189]

$$\vec{q} = (q, q').$$

Namely, a radar system needs $PT_s \times P'F_s$ time-duration-bandwidth to search for targets whose delay $t_d \in (0, PT_s)$ and Doppler shift.
[MF190]

$$f_D \in \left(-\frac{W_D}{2}, \frac{W_D}{2}\right), W_D = P'F_s$$

are not known in advance (simply set $d_{\vec{q}} = 1$), while a data communication system sends P·P'
[MF191]

$$\mathcal{M}\text{-ary data}$$

(e.g.,
[MF192]

$$d_{\vec{q}} \in \left\{ e^{i\frac{2\pi}{\mathcal{M}}k} \right\}_{k=0}^{\mathcal{M}-1}, 1 \leq q \leq P, 1 \leq q' \leq P').$$

Suppose now that such a signal s[k;χ] is transmitted through the channel with
[MF193]

$$\theta'^{,d} = (k_d, \ell_D), k_d = \left\lfloor \frac{t_d}{\Delta t} \right\rfloor, \ell_D = \left\lfloor \frac{f_D}{\Delta f} \right\rfloor.$$

Using
[MF194]

modulation $\mathcal{T}^d_{0,\ell_c}$, demodulation $\mathcal{T}^d_{0,-\ell_c}$, one can obtain its received TD signal, being demodulated at a mixer or a homodyne receiver
[MF195]

$$r[k; \mathcal{X}, A, \kappa, \theta'^{,d}] = A \Re e^{i\kappa} \psi_r[k] + \xi[k], \quad (28)$$
$$\psi_r[k] = \mathcal{T}^d_{0,-\ell_c} \mathcal{T}^d_{k_d,\ell_D} \mathcal{T}^d_{0,\ell_c} \psi[k; \mathcal{X}] =$$
$$W^{k_d \ell_c} \mathcal{T}^d_{k_d,\ell_D} \psi[k; \mathcal{X}],$$

where
[MF196]

$$\psi_r[k]$$

is the signal component CE in the received signal, η[k] interference, and ξ[k] Gaussian noise. The FD expression, its DFT
[MF197]

$$R[\ell; \chi, A, \kappa, \theta'^{,d}] = \mathcal{F}^d[r[k; \chi, A, \kappa, \theta'^{,d}]].$$

is omitted here. Its PD
[MF198]

$$W^{k_d \ell_c}$$

may be absorbed into $e^{i\kappa}$ by re-definition, but should be canceled-out at the correlation receiver as discussed below. Such received TD and FD signals provide the data w and its DFT W, observed in the mixer.

Independent and identically distributed (i.i.d.) TD- and FD-PCs give independent N' TD-templates
[MF199]

$$u_m^{(3)}[k;X], 1 \leq m' \leq N'$$

and N FD-templates
[MF200]

$$U_m^{(4)}[\ell;X], 1\leq m\leq N$$

in the M-ary detection. Note that PCs have two functions: to randomise a signal and to generate several PDs caused by the NCP of TFSs; Fortunately, such a PD itself provides a good indication for parameter estimation in the sense that the transmitted signal is endowed with easy-traceability. This indicates the pros and cons of the use of PCs. In fact, the bandwidth of phase coded systems needs to be much greater than that of a classic radar system; The multi-carrier technique, i.e., the FD-PC multiples this bandwidth by the number of sub-carriers and so requires a super-wide-band signal.

<5. M-Ary Detection and Estimation of TD and FD Signals>
Let us employ the M-ary detection strategy
using the TD-CE in (27)
[MF201]

$$\psi[k;\chi]$$

(resp. FD-CE
[MF202]

$$\Psi[\ell;\chi])$$

to detect the radar signal in (26)
[MF203]

$$s[k;\chi]$$

(resp.
[MF204]

$$S[\ell;\chi]).$$

Consider a strategy whereby the receiver chooses among the NN' hypotheses $H_{m,m'}$ associated with (17). It suffices to find those values of the parameters $\theta'^{,d}$ for which the LLF (or the real part of its associated CCF) in the TD (resp. the FD) is maximum. Consider first the problem of detecting the received TD-template CE
[MF205]

$$Ae^{ik}W^{\hat{k}_d\ell_c}\mathcal{T}^d_{\hat{k}_d,\ell_\mu}\psi^{(3)}_{\rho',\vec{p}}[k]$$

with its address
[MF206]

$$(\rho',\vec{p}),\vec{p}=(p,p')$$

of the lattice in the TFP
[MF207]

$$T_c\mathbb{Z}_{\mathcal{L}_\mu}\times F_c\mathbb{Z}_{\mathcal{L}_c},$$

where
[MF208]

$$\psi_{\rho',\vec{p}}^{(3)}[k]=d_{\vec{p}}\mathcal{T}_{pNM_pp'N'M'}{}^d\mathcal{T}_{0,\rho'M'}{}^dX'_{\rho'}u_{\rho'}^{(3)}[k;X],$$
$$0\leq\rho'\leq N'-1, \qquad (29)$$

is the TD-template CE of type 3 (cf. (22), (27)) with ρ'-th TD-template
[MF209]

$$X'_{\rho'}u_{\rho'}^{(3)}[k;X]$$

[MF210]

$$\hat{k}_d$$

denotes an integer-valued estimate of $k_d$,
[MF211]

$$\hat{\ell}_\mu$$

an integer-valued parameter for estimating
[MF212]

$$\ell_D.$$

This CE is embedded in the estimated and received CE
[MF213]

$$Ae^{ik}W^{\hat{k}_d\ell_c}\mathcal{T}_{\hat{k}_d,\hat{\ell}_\mu}{}^d\psi[k;\chi]$$

of
[MF214]

$$\psi[k;\chi]$$

in (27) (cf. $\psi_r[k]$ in (28)), in which the relation
[MF215]

$$\mathcal{T}^d_{0,-\ell_c}\mathcal{T}^d_{\hat{k}_d,\ell_\mu}\mathcal{T}^d_{0,\ell_c}=W^{\hat{k}_d\ell_c}\mathcal{T}^d_{\hat{k}_d,\ell_\mu}$$

is used. Equation (29) shows that the CE contains a consequential phase, caused by several PDs as given below. Such a phase should be canceled-out in a CCF. Denote the CE complementary to
[MF216]

$$\psi_{\rho',\vec{p}}^{(3)}[k]$$

by
[MF217]

$$\psi_{\eta,\rho',\vec{p}}^{(3)}[k], 0\leq\rho'\leq N'-1,$$

defined as
[MF218]

$$\psi_{\eta,\rho',\vec{p}}^{(3)}[k]=\Sigma_{m'=0,m'\neq\rho'}^{N'-1}\psi_{m',\vec{p}}^{(3)}[k],$$

$$\psi_{m',\vec{p}}^{(3)}[k]=d_{\vec{p}}\mathcal{T}_{pNM_pp'N'M'}{}^d\mathcal{T}_{0,m'M'}{}^dX'_m u_{m'}^{(3)}[k;X],$$
$$0\leq m'\leq N'-1.$$

Equations (22) and (27) indicate that N' TD-templates of type 3
[MF219]

$$u_{\rho'}^{(3)}[k;X], 0\leq\rho'\leq N'-1$$

are available and the receiver is to use N' TD-template CEs of type 3
[MF220]

$$\psi_{\rho',\vec{p}}^{(3)}[k], 0\leq\rho'\leq N'-1$$

and decide which of the N' TD-LLFs is largest.
  i) Discrete-time signal detection and Doppler-ML estimation problem in the TD: On the basis of measured values of the $N_T$ random variables $w=(w[0], \ldots, w[N_T-1])$, the receiver must choose between two hypotheses,
[MF221]

$$H_0: \quad \psi_w[k]=\psi_n[k], \qquad (30)$$
$$H_1: \quad \psi_w[k]=Ae^{ik}W^{\hat{k}_d\ell_c}\mathcal{T}^d_{\hat{k}_d,\ell_\mu}\frac{1}{\sqrt{PP'}}\sum_{p=0,p'=0}^{P-1,P'-1}\left(\psi_{\rho',\vec{p}}^{(3)}[k]+\psi_{\eta,\rho',\vec{p}}^{(3)}[k]\right)+\psi_n[k],$$
$$0\leq k\leq N_T-1, 0\leq \rho'\leq N'-1,$$

where
[MF222]

$$\psi_w[k]$$

is the NB CE of the observation data [MF223]

$$w[k] = \Re \psi_w[k]W^{-\ell_r k}, \ell_r = \left\lfloor \frac{\Omega_r}{2\pi\Delta f} \right\rfloor$$

at time k,
[MF224]

$$\psi_n[k]$$

the NB CE of white Gaussian noise
[MF225]

$$n[k] = \Re \psi_D[k] W^{-\ell_r k}$$

[MF226]

$$N_T = \lfloor T/\Delta t \rfloor \gg 1$$

the number of samples during the observation duration (0,T). Note that the signal component in hypothesis $H_1$ is equal to
[MF227]

$$(N')^{1/2} A e^{i\kappa} W^{\hat{k}_d \ell_c} \mathcal{T}^d_{\hat{k}_d,\ell_\mu} \psi[k;\chi].$$

Suppose that N' TD-template CEs of type 3
[MF228]

$$\psi^{(3)}_{m',\vec{p}}[k], \ 0 \le m' \le N'-1$$

of equal energies are quasi-orthogonal in the sense that
[MF229]

$$\sum_{k=0}^{N_T-1} \psi^{(3)}_{m'_1,\vec{p}}[k] \psi^{(3)}_{m'_2,\vec{p}}[k] \ll 1, m'_1 \ne m'_2.$$

Then one can obtain:
Proposition 4: ii) Signal detection and Doppler-ML estimation problem in the TD:
On the basis of observed data $w=(w[0], \ldots, w[N_T-1])$ in the presence of white Gaussian noise with unilateral spectral density $N_0$, the logarithm of the
[MF230]

$$(\rho', \vec{p})$$

-th TD-LF for detecting and estimating the TD-template CE of type 3
[MF231]

$$Ae^{i\kappa} W^{\hat{k}_d \ell_c} \mathcal{T}^d_{\hat{k}_d,\ell_\mu} \psi^{(3)}_{\rho',\vec{p}}[k]$$

is given as [21]
[MF232]

$$\begin{aligned}
\ln \Lambda_{\rho',\vec{p}}[w[k]; A, \kappa, \hat{k}_d; \ell_\mu] &= g_{\rho',\vec{p}}(A, \kappa, \hat{k}_d; \ell_\mu) - \frac{d^2_{\rho',\vec{p}}}{2}, \\
g_{\rho',\vec{p}}(A, \kappa, \hat{k}_d; \ell_\mu) &= \\
\Re \frac{Ae^{-i\kappa} W^{-\hat{k}_d \ell_c}}{N_0\sqrt{PP'}} &\sum_{p,p'=0}^{P-1,P'-1} \Delta t \sum_{k=0}^{N_T-1} \left(\mathcal{T}^d_{\hat{k}_d,\ell_\mu} \psi^{(3)}_{\rho',\vec{p}}[k]\right)^* W^{\alpha(k;\hat{k}_d,\ell_\mu)} \psi_w[k], \\
d^2_{\rho',\vec{p}} &= \frac{A^2}{N_0 PP'} \left|\sum_{p,p'=0}^{P-1,P'-1} \Delta t \sum_{k=0}^{N_T-1} \mathcal{T}^d_{\hat{k}_d,\ell_\mu} \psi^{(3)}_{\rho',\vec{p}}[k]\right|^2,
\end{aligned} \quad (31)$$

where
[MF233]

$$\alpha(k; \hat{k}_d, \ell_\mu) = -\ell_\mu\left(k - \frac{\hat{k}_d}{2}\right) + \ell_D(k - \hat{k}_d).$$

Let
[MF234]

$$\rho' = \rho'_0 \text{ and } \ell_\mu = \ell^*_\mu$$

be integers for a given decision level $r_0$ satisfying
[MF235]

$$\max_{\rho',\ell_\mu} \frac{|g'_{\rho',\vec{p}}(\hat{A}, \hat{\kappa}, \hat{k}_d; \ell_\mu)|}{d_{\rho',\vec{p}}} > r_0, 1 \le \rho' \le N', \quad (32)$$

$$g'_{\rho',\vec{p}}(\hat{A}, \hat{\kappa}, \hat{k}_d; \ell_\mu) = \Re \frac{Ae^{-i\kappa} W^{-\hat{k}_d \ell_c}}{\hat{A}e^{-i\hat{\kappa}} N_0 \sqrt{PP'}}$$

$$\sum_{p,p'=0}^{P-1,P'-1} \Delta t \sum_{k=0}^{N_T-1} \left(\mathcal{T}^d_{\hat{k}_d,\ell_\mu} \psi^{(3)}_{\rho',\vec{p}}[k]\right)^* W^{\alpha(k;\hat{k}_d,\ell_\mu)} \psi_w[k],$$

where
[MF236]

$$g'_{\rho',\vec{p}}(\hat{A},\hat{\kappa},\hat{k}_d;\ell_\mu)$$

is a compensated variant of the statistic in (31)
[MF237]

$$g_{\rho',\vec{p}}(A,\kappa,\hat{k}_d;\ell_\mu)$$

by the MLE in (16)
[MF238]

$$\hat{A}e^{-i\hat{\kappa}}$$

of $Ae^{-i\kappa}$. Then the receiver decides the
[MF239]

$$(\rho',\vec{p})$$

-th CE has been arrived at the address $(p',\vec{p})$ of the lattice
[MF240]

$$T_c \vec{\mathbb{Z}}_d \times F_c \vec{\mathbb{Z}}_d$$

in the TFP and if all statistics
[MF241]

$$|g'_{\rho',\vec{p}}(\hat{k}_d,A,\kappa;\ell_\mu)|/d_{\rho',\vec{p}}$$

lie below $r_0$, the receiver decides that no signal was transmitted. Thus
[MF242]

$$\ell^*_\mu$$

is an ML estimate of
[MF243]

$$\ell_\mu$$

for a given
[MF244]

$$\hat{k}_d,$$

in which the use of the operator
[MF245]

$$\mathcal{T}^d_{\hat{k}_d,\ell_\mu}$$

needs the phase function
[MF246]

$$W^{\alpha(k;\hat{k}_d,\ell_\mu)}$$

Next one moves on the detection and delay-estimation problem in the FD using the DFT of the measured w,

[MF247]
$$W[\ell] = \mathcal{F}^d[w[k]] = \frac{1}{\sqrt{N_T}} \sum_{k=0}^{N_T-1} w[k] W^{k\ell}, 0 \le \ell \le N_T - 1.$$

Let us consider the problem of detecting the received FD-template CE
[MF248]
$$Ae^{jk_\sigma \ell_c} W^{k_\sigma \ell_c} \mathcal{T}_{\ell_D,-k_\sigma}^{f,d} \Psi_{\rho,\vec{p}}^{(4)} \ell$$

with its address
[MF249]
$$(\rho, \vec{p})$$

of the lattice
[MF250]
$$T_c \mathbb{Z} \times F_c \mathbb{Z},$$

where
[MF251]
$$\Psi_{\rho,\vec{p}}^{(4)}[\ell] = d_{\vec{p}} \mathcal{T}_{p'N'M',-pNM}^{f,d} \mathcal{T}_{0,-\rho M}^{f,d} X_\rho U_\rho^{(4)}[\ell; X'], 0 \le \rho \le N-1 \quad (33)$$

is the FD-template CE of type 4 (cd. (22), (27)) with ρ-th FD-template of type 4
[MF252]
$$X_\rho U_\rho^{(4)}[\ell; X']$$

This CE is embedded in the estimated and received FD-CE
[MF253]
$$Ae^{jk_\sigma \ell_c} W^{k_\sigma \ell_c} \mathcal{T}_{\ell_D,-k_\sigma}^{f,d} \Psi[\ell; \chi]$$

of the FD-CE, i.e., the DFT in (27)
[MF254]
$$\Psi[\ell; \chi],$$

where
[MF255]
$$\hat{\ell}_D$$

is an integer-valued estimate of
[MF256]
$$\ell_D,$$

$k_\sigma$ an integer-valued parameter for estimating $k_d$, and the relation
[MF257]
$$\mathcal{T}_{-\ell_c,0}^{f,d} \mathcal{T}_{\ell_D,-k_\sigma}^{f,d} \mathcal{T}_{\ell_c,0}^{f,d} = W^{k_\sigma \ell_c} \mathcal{T}_{\ell_D,-k_\sigma}^{f,d}$$

is used. Denote the CE complementary to
[MF258]
$$\Psi_{\rho,\vec{p}}^{(4)}[\ell]$$

by
[MF259]
$$\Psi_{\eta,\rho,\vec{p}}^{(4)}[\ell], 0 \le \rho \le N-1,$$

[MF260]
$$\left.\begin{array}{l}\Psi_{\eta,\rho,\vec{p}}^{(4)}[\ell] = \sum_{m=0,m\ne\rho}^{N-1} \Psi_{m,\vec{p}}^{(4)}[\ell], \\ \Psi_{m,\vec{p}}^{(4)}[\ell] = d_{\vec{p}} \mathcal{T}_{p'N'M',-pNM}^{f,d} \mathcal{T}_{0,-mM}^{f,d} X_m U_m^{(4)}[\ell; X'], 0 \le m \le N-1.\end{array}\right\} \quad (34)$$

Equations (22) and (27) suggest that N FD-templates of type 4
[MF261]
$$U_\rho^{(4)}[\ell; X'], 0 \le \rho \le N-1$$

are available and the receiver is to use N FD-template CEs of type 4
[MF262]
$$\Psi_{\rho,\vec{p}}^{(4)}[\ell], 0 \le \rho \le N-1$$

and decide which of the N LLFs is largest (FIG. 3b).
ii) Signal detection and delay-ML estimation problem in the FD:
On the basis of observed W=(W[0], . . . , W[$N_T$−1]), the receiver must choose between two hypotheses in the FD,
[MF263]
$$\left.\begin{array}{ll}H_0': & W[\ell] = N[\ell], \\ H_1': & W[\ell] = \frac{Ae^{jk_\sigma \ell_c} W^{k_\sigma \ell_c}}{\sqrt{PP'}} \mathcal{T}_{\ell_D,-k_\sigma}^{f,d} \sum_{p=0,p'=0}^{P-1,P'-1} \left(S_{\rho,\vec{p}}^{(4)}[\ell] + E_{\rho,\vec{p}}^{(4)}[\ell]\right) + N[\ell],\end{array}\right\} \quad (35)$$

$$0 \le \ell \le N_B - 1, 0 \le \rho \le N - 1,$$

where
[MF264]
$$W[\ell] \stackrel{\mathcal{F}^d}{=} [\Re \psi_w[k] W^{-\hat{\ell}_c k}]$$

is the DFT of the observed data w[k] with the NB CE
[MF265]
$$\psi_w[k].$$

[MF266]
$$N[\ell] \stackrel{\mathcal{F}^d}{=} [\Re \psi_D[k] W^{-\hat{\ell}_c k}]$$

the DFT of the noise n[k] with the NB CE
[MF267]
$$\psi_n[k].$$

[MF268]
$$N_B = \lfloor B/\Delta f \rfloor$$

the sample number of the bandwidth B, for simplicity $N_B = N_T$;
[MF269]
$$S_{\rho,\vec{p}}^{(4)}[\ell] = \mathcal{F}^d[\Re \mathcal{F}^{-1,d}[\Psi_{\rho,\vec{p}}^{(4)}[\ell]] W^{-\hat{\ell}_c k}]$$

the
[MF270]
$$(\rho, \vec{p})$$

-th template signal spectrum with its FD-template CE of type 4 in (33)
[MF271]
$$\Psi_{\rho,\vec{p}}^{(4)}[\ell],$$

and
[MF272]
$$E_{\rho,\vec{p}}^{(4)}[\ell] = \mathcal{F}^d[\Re \mathcal{F}^{-1,d}[\Psi_{\eta,\rho,\vec{p}}^{(4)}[\ell]] W^{-\hat{\ell}_c k}]$$

its complement spectrum with CE in (34)
[MF273]
$$\Psi_{\eta,\rho,\vec{p}}^{(4)}[\ell].$$

Note that the signal component in hypothesis H′$_1$ is equal to
[MF274]
$$(N)^{1/2} Ae^{jk_\sigma \ell_c} W^{k_\sigma \ell_c} \mathcal{T}_{\ell_D,-k_\sigma}^{f,d} \Psi[\ell; \chi].$$

Suppose that N FD-template CEs of type 4 (cf. (22), (27))
[MF275]
$$\Psi_{m,\vec{p}}^{(4)}[\ell], 0 \le m \le N-1$$

of equal energies are quasi-orthogonal in the sense that
[MF276]

$$\sum_{\ell=0}^{N_B-1} \Psi^{(4)}_{m_1,\vec{p}}[\ell]\Psi^{(4)}_{m_2,\vec{p}}[\ell] \ll 1, m_1 \neq m_2.$$

Then one can obtain:
Proposition 5: On the basis of data
[MF277]

$$W=(W[0], \ldots, W[N_T-1]), W[\ell] = \mathcal{F}^d[w[k]]$$

in the presence of white Gaussian noise with unilateral spectral density $N_0$, the logarithm of the
[MF278]

$$(\rho, \vec{p})$$

-th FD-LF for detecting and estimating
[MF279]

$$S_{\rho,\vec{p}}^{(4)}[\hat{\ell}]$$

is given as
[MF280]

$$\ln \Lambda'_{\rho,\vec{p}}[W[\ell]; A, \kappa, \hat{\ell}_D; k_\sigma] = G_{\rho,\vec{p}}(A, \kappa, \hat{\ell}_D; k_\sigma) - \frac{D^2_{\rho,\vec{p}}}{2}, \quad (36)$$

$$D^2_{\rho,\vec{p}} = \frac{A^2}{N_0\sqrt{PP'}} \left| \sum_{p,p'=0}^{P-1,P'-1} \Delta f \sum_{\ell=0}^{N_B-1} \mathcal{T}^{f,d}_{\hat{\ell}_D,-k_\sigma} S^{(4)}_{\rho,\vec{p}}[\ell] \right|^2,$$

$$G_{\rho,\vec{p}}(A, \kappa, \hat{\ell}_D; k_\sigma) = \Re \frac{Ae^{-ik}W^{-k_\sigma \ell_c}}{N_0\sqrt{PP'}}$$

$$\sum_{p,p'=0}^{P-1,P'-1} \times \Delta f \sum_{\ell=0}^{N_B-1} \left(\mathcal{T}^{f,d}_{\hat{\ell}_D,-k_\sigma} S^{(4)}_{\rho,\vec{p}}[\ell]\right)^* W^{\beta(\ell;\hat{\ell}_D,k_\sigma)} W[\ell],$$

where
[MF281]

$$\beta(\ell; \hat{\ell}_D, k_\sigma) = k_\sigma\left(\ell - \frac{\hat{\ell}_D}{2}\right) - k_d(\ell - \hat{\ell}_D).$$

Let
[MF282]

$$\rho = \rho_0 \text{ and } k_\sigma = k^*_\sigma$$

be integers satisfying
[MF283]

$$\max_{\rho,k_\sigma} \frac{|G'_{\rho,\vec{p}}(A, \kappa, \hat{\ell}_D; k_\sigma)|}{D_{\rho,\vec{p}}} > r'_0, 1 \leq \rho \leq N, \quad (37)$$

$$G'_{\rho,\vec{p}}(A, \hat{\kappa}, \hat{\ell}_D; k_\sigma) =$$

$$\Re \frac{Ae^{-ik}W^{-k_\sigma \ell_c}}{\hat{A}e^{-ik}N_0\sqrt{PP'}} \Delta f \sum_{\ell=0}^{N_B-1} \left(\mathcal{T}^{f,d}_{\hat{\ell}_D,-k_\sigma} S^{(4)}_{\rho,\vec{p}}[\ell]\right)^* W^{\beta(\ell;\hat{\ell}_D,k_\sigma)} W[\ell]$$

for a given decision level $r'_0$. Then the receiver decides the $(\rho, \vec{p})$-th signal has been arrived at the address

[MF284]

$$(\rho, \vec{p})$$

of the lattice in the TFP
[MF285]

$$T_c \mathbb{Z}_d \times F_c \mathbb{Z}_d$$

and if all statistics
[MF286]

$$|G'_{\rho,\vec{p}}(k_\sigma; \hat{\ell}_D, \hat{A}, \hat{\kappa})|/D_{\rho,\vec{p}}$$

lie below $r'_0$, the receiver decides that no signal was transmitted. Thus
[MF287]

$$k^*_\sigma$$

is a ML estimate of $k_d$ for a given
[MF288]

$$\hat{\ell}_D,$$

in which the use of the operator
[MF289]

$$\mathcal{T}^{f,d}_{\hat{\ell}_D, \in k_\sigma}$$

needs the phase function
[MF290]

$$W^{\beta(\ell;\hat{\ell}_D,k_\sigma)},$$

an FD analogue of the
[MF291]

$$W^{\alpha(k;\hat{k}_d,\ell_\sigma)},$$

so one can get (36) and (37).

<6. TD and FD Cross-Correlations for Parameter Estimation>
<6.1 TD and FD Cross-Correlations>
Suppose that the observed input
[MF292]

$$w(t) = \Re \psi_w(t) e^{i\Omega t}$$

is NB and both the real and imaginary parts of the CE
[MF293]

$$\psi_w(t)$$

can be measured separately[18, 3].
In order to cancel out the phase factors of
[MF294]

$$Ae^{ik}W^{\hat{k}_d \ell_c} \mathcal{T}^d_{\hat{k}_d,\ell_r} \psi^{(3)}_{\rho',\vec{p}}[k])$$

(resp.
[MF295]

$$Ae^w W^{\hat{k}_d \ell_c} \mathcal{T}^{\ell,d}_{\hat{\ell}_D,-k_\sigma} \Psi^{(4)}_{\rho',\vec{p}}[\hat{\ell}])$$

and get a time and frequency symmetrical statistic,
instead of the statistic in (31)
[MF296]

$$g_{\rho',\vec{q}}(\hat{k}_d, \hat{\ell}_u)$$

having
[MF297]

$$W^{\alpha(h;\hat{k}_d,\ell_u)}$$

(resp. the statistic in (36)
[MF298]

$$G_{\rho,\vec{p}}(k_\sigma, \hat{\ell}_D)$$

having
[MF299]

$$W^{\beta(\ell;k_\sigma,\hat{\ell}_D)},$$

one can use its associated CCF to be defined below (see FIG. 3b):

Lemma 1: Suppose that in two hypotheses $H_0$ and $H_1$ in (30) the CE
[MF300]

$$\psi_n[k]$$

is Gaussian. Then
[MF301]

$$<\psi_0, \psi_{\rho', \vec{p}}^{(3)}>_{d,k} \ll 1,$$

where $<\bullet,\bullet>_{d,k}$ denotes the IP in the space
[MF302]

$$\ell_2(\mathbb{Z})$$

of discrete-time TD functions. Thus one can define a CCF, called a type-3 correlator, between the received CE
[MF303]

$$\mathcal{T}_{\hat{k}_d, \ell_D}^d \psi[k; \chi]$$

(namely, the signal component of the received CE in (28)
[MF304]

$$\psi_r[k; \chi]$$

with factor
[MF305]

$$Ae^{ik} W^{k_d \ell_c}),$$

instead of the input CE
[MF306]

$$\psi_w[k; \chi]$$

to the receiver, and the complex impulse response of a NB filter matched to the estimated template CE with address
[MF307]

$$(\rho', \vec{p})$$

[MF308]

$$W^{\hat{k}_d \ell_c} \mathcal{T}_{\hat{k}_d, \ell_c}^d \psi_{\rho', \vec{p}}^{(3)}[k]|_{d\vec{p}=1}$$

given as
[MF309]

$$c_{\rho', \vec{p}}^{(3)}(\ell_\mu; \hat{k}_d) = Ae^{ik} W^{k_d \ell_c} \times \quad (38)$$

$$\sum_{k \in \mathbb{Z}} \mathcal{T}_{\hat{k}_d, \ell_D}^d \psi[k, \chi] \left( W^{\hat{k}_a \ell_c} \mathcal{T}_{\hat{k}_d, \ell_\mu}^d \mathcal{T}_{pNM, p'N'M'}^d \mathcal{T}_{0, \rho', M'}^d Y'_{\rho'} u_{\vec{p}}^{(3)}[k:Y] \right)^*$$

in which the TD-template CE of type 3 in (29)
[MF310]

$$\psi_{\rho', \vec{p}}^{(3)}[k]$$

and the codes $X'_{\rho'}, X$ are replaced by $Y'_{\rho'}, Y$.

One can find after some labor that this CCF of type 3 is given as
[MF311]

$$c_{\rho', \vec{p}}^{(3)}(\ell_\mu; \hat{k}_d) = \frac{Ae^{ik} W^{(k_d - \hat{k}_d) \ell_c}}{\sqrt{PP'}} \sum_{\vec{q}} d_{\vec{q}} \frac{Y'^*_{\rho'}}{N \sqrt{N'}} \sum_{m=0, m'=0, n=0}^{N-1, N'-1, N-1} X_m \quad (39)$$

$$X'_m Y^*_n \times \theta_{gg}[(\hat{k}_d - k_d) + (p-q)MN + (n-m)M,$$

$$(\ell_\mu - \ell_D) + (p' - q')M'N' + (\rho' - m')M'] \times$$

$$W^{\frac{1}{2}(k_d \ell_\mu - \hat{k}_d \ell_D + 2MNq\upsilon_0[\ell_\mu] - 2M'N'q' \tau_0[\hat{k}_d])} \times$$

$$W^{\frac{1}{2}((m\rho' - m'n)MM' - (m'+\rho')M' \tau_0[\hat{k}_d] + (m+n)M\upsilon_0[\ell_\mu])}$$

Unfortunately, the AFs $\theta_{gg}(\tau, \upsilon)$ and $\Theta_{GG}(\upsilon, -\tau)$ have many sidelobes in general. A Gaussian chip-pulse $g(t)$, however, gives a radical solution to the estimation problems because it has its separable and exponentially decayed AF in terms of of $\tau$ and $\upsilon$
[MF312]

$$\theta_{gg}(\tau, \upsilon) = \Theta_{GG}(\upsilon, -\tau) = \exp\left(-\frac{\tau^2}{2s_t^2}\right) \cdot \exp\left(-\frac{\upsilon^2}{2s_f^2}\right),$$

$$\text{with } s_t s_f = \frac{1}{2\pi},$$

where
[MF313]

$$s_t^2 = \sum_k k^2 g[k], \quad s_f^2 = \sum_\xi \ell^2 G[\ell].$$

For $N, N' \gg 1$, both the first and second arguments of $\theta_{gg}[\bullet, \bullet]$ should be relatively small, i.e., $\vec{q} = \vec{p}$ so that
[MF314]

$$\ell_{c_{\rho', \vec{p}}^{(3)}}(\ell_\mu; \hat{k}_d)$$

has a large value; All of the terms with
[MF315]

$$\vec{q} \neq \vec{p}$$

in (39) can be negligible. This property of Gaussian plays a central role in determining $\ell_\mu$ for maximizing
[MF316]

$$\Re_{c_{\rho', \vec{p}}^{(3)}}(\ell_\mu; \hat{k}_d).$$

Evaluating threefold summation of PCs with the cisoidal factor leads us to define a summation of IDFT-type
[MF317]

$$\mathcal{F}_{m', N'}^{-1, d}[X[m']]_{m'}(a)_{m'} = \frac{1}{\sqrt{N'}} \sum_{m'=0}^{N'-1} X[m'] e^{i 2\pi \frac{a m'}{L}}.$$

symbolically denoted by a pair of the square bracket
[MF318]

$$\mathcal{F}_{m', N'}^{-1, d}[\bullet]_{m'}$$

and the round bracket $(a)_{m'}$ with its convenient notation $(a)_m = W^{-am'}$, and that of DFT-type
[MF319]

$$\mathcal{F}_{m, N}^d[x[m']]_m(b')_m = \frac{1}{\sqrt{N}} \sum_{m=0}^{N-1} x[m] e^{-i 2\pi \frac{mb'}{L}},$$

symbolically denoted by a pair of convenient notations
[MF320]

$$\mathcal{F}_{m, N}^d[\bullet]_m(b')_m = W^{mb'}.$$

Using the notations:
[MF321]

$$\upsilon_0[\ell_\mu] = \ell_\mu - \ell_D, \quad \tau_0[\hat{k}_d] = \hat{k}_d - k_d,$$

one can obtain

Lemma 2: If the receiver of type-3 has its address
[MF322]

$$\vec{p} = \vec{q}$$

and Y=X, Y'=X', then its CCF becomes
[MF323]

$$c^{(3)}_{\rho',\vec{p}}(\ell_\mu; \hat{k}_d) \simeq \frac{Ae^{jK}W^{-r_0[\hat{k}_a]\ell_n}}{\sqrt{PP'}} d_{\vec{p}} X'^*_{\rho'} \qquad (41)$$

$$W\left(MNpv_0[\ell_\mu] - \left(N'p' + \frac{\rho'}{2}\right)M'\tau_0[\hat{k}_d] + \frac{k_d\ell_\mu - \hat{k}_d\ell_D}{2}\right) \times$$

$$\mathcal{F}^{-1,d}_{m',N'}\left[X'_m \exp\left(-\frac{(v_0[\ell_\mu] + (\rho' - m')M')^2}{2s_f^2}\right)\right.$$

$$\mathcal{F}^{d}_{m,N}\left[X_m \mathcal{F}^{d}_{n,N}\left[\left(-\frac{(\tau_0[\hat{k}_d] + (n-m)M)^2}{2s_t^2}\right)\right] \times (x_3(-m'))_n\right]_m (x_3(\rho'))_m\right]_{m'}$$

$$\left.\left(\frac{M'r_0[\hat{k}_d]}{2}\right)_{m'},\right.$$

$$x_3(\rho') = \frac{M(v_0[\ell_\mu] + \rho'M')}{2}$$

Thus one can know necessary conditions for
[MF324]

$$\Re c^{(3)}_{\rho,\vec{p}}(\ell_\mu; \hat{k}_d)$$

to have a large value are
[MF325]

$$|v_0[\ell_\mu]| < 3s_f \text{ and } |\tau_0[\hat{k}_d]| < 3s_t.$$

Proof. Using the round bracket symbols in summations of IDFT-type and DFT-type, one can rearrange 5 components among 6 components in the second twiddle factor in (39)
[MF326]

$$\left. \begin{array}{l} W^{\frac{1}{2}nMv_0[\ell_\mu]} \cdot W^{-\frac{1}{2}m'nMM'} = W^{\frac{1}{2}nM(v_0[\ell_\mu] - m'M')} = (x_3(-m'))_n, \\ W^{\frac{1}{2}mMv_0[\ell_\mu]} \cdot W^{\frac{1}{2}m\rho'MM'} = W^{\frac{1}{2}mM(v_0[\ell_\mu] + \rho'M')} = (x_3(\rho'))_m, \\ W^{-\frac{1}{2}m'M'r_0[\hat{k}_d]} = \left(\frac{M'r_0[\hat{k}_d]}{2}\right)_{m'}, \end{array} \right\} \qquad (42)$$

and move its residue term $W^{-1/2\,\rho'M'\tau 0[k[<]\text{BEGINITALmd}]}$ of the 6 components to the
first twiddle factor in (39). The use of the separability of the AF of the Gaussian proves (41).

Lemma 3: Suppose that in two hypotheses H'$_0$ and H'$_1$ in (35)
[MF327]

$$N[\ell]$$

is Gaussian. Then the CCF
[MF328]

$$\langle N, S^{(4)}_{\rho,\vec{p}} \rangle_{d,\ell} \ll 1,$$

where the angular brackets $\langle \cdot, \cdot \rangle_{d,\ell}$ denotes the IP in the space

[MF329]

$$\ell_2(\mathcal{Z}_s)$$

of discrete-frequency FD functions.

Then one can define a CCF, called a type-4 correlator, between the received FD-CE
[MF330]

$$Ae^{jK}W^{k_d\ell_c} \mathcal{T}^{f,d}_{\ell_v,-k_d} \Psi[\ell;\chi],$$

i.e., the DFT of the signal component of the received CE in (28)
[MF331]

$$\Psi_r[k]$$

with factor
[MF332]

$$Ae^{jK}W^{k_d\ell_c},$$

instead of the input CE
[MF333]

$$\Psi_W[\ell;\chi]$$

to the receiver, and the FD complex impulse response of a NB filter matched to the FD estimated template CE in (33) with address
[MF334]

$$(\rho, \vec{p})$$

[MF335]

$$W^{k_\sigma\ell_c} \mathcal{T}^{f,d}_{\ell_v,-k_\sigma} \Psi^{(4)}_{\rho,\vec{p}}[\ell]|_{d_{\vec{p}}=1, X' \to Y', X_\rho \to Y_\rho},$$

given as
[MF336]

$$C^{(4)}_{\rho,\vec{p}}(k_\sigma; \hat{\ell}_D) = Ae^{jK}W^{k_d\ell_c} \times \sum_{\ell \in \mathbb{Z}} \mathcal{T}^{f,d}_{\ell,D:-k_3} \Psi[\ell;\chi] \qquad (43)$$

$$\left(W^{k_\sigma\ell_c} \mathcal{T}^{f,d}_{\ell_D;\ldots,k_\sigma} \mathcal{T}^{f,d}_{p'N'M';\ldots pNM} \mathcal{T}^{f,d}_{0,\ldots,\rho M} Y_\rho U^{(4)}_{\vec{p}}[\ell:Y']\right)^*$$

This CCF has the form
[MF337]

$$C^{(4)}_{\rho,\vec{p}}(k_\sigma : \hat{\ell}_D) = \qquad (44)$$

$$\frac{Ae^{jK}W^{-r_0[\hat{k}_a]\ell_c}}{\sqrt{PP'}} \sum_q d_{\vec{q}} \frac{Y^*_{\vec{\rho}}}{N'\sqrt{N}} \sum_{m=0,m'=0,n'=0}^{N-1,N'-1,N'-1} X_m X'_{m'} Y'^*_{n'} \times$$

$$\Theta_{GG}\left[(\hat{\ell}_D - \ell_D) + (p' - q')M'N' + (n' - m')M',\right.$$

$$\left. -(k_\sigma - k_d) - (p-q)MN(\rho - m)M\right] \times$$

$$W^{\frac{1}{2}(k_d\hat{\ell}_D - k_\sigma\ell_D + 2MNqv_0[\hat{\ell}_D] - 2M'N'q'\tau_0[k_\sigma])} \times$$

$$W^{\frac{1}{2}((mn'-m'\rho)MM' - (m'+n')M'\tau_0[k_\sigma] + (m+\rho)Mv_0[\hat{\ell}_D])}$$

Similarly, for N,N'$\gg$1, one can set
[MF338]

$$\vec{q} = \vec{p}$$

so as to make
[MF339]

$$\Re C^{(4)}_{\rho,\vec{p}}(k_\sigma; \hat{\ell}_D)$$

large; All of the terms in (44) with
[MF340]

$$\vec{q} \neq \vec{p}$$

can be negligible. Then one can get the sum of the three exponents in the twiddle factor as above. Evaluating the threefold summation of PCs together with the cisoidal factor, one can have Lemma 4: If the receiver of type-4 has its address
[MF341]
$$\vec{p} = \vec{q}$$
and Y=X, Y'=X', then its CCF becomes
[MF342]

$$C_{\rho,\vec{p}}^{(4)}(k_\sigma; \hat{\ell}_D) \simeq \frac{Ae^{iK}W^{-r_0[k_a]\ell_c}}{\sqrt{PP'}} d_{\vec{p}} X_p^* \quad (45)$$

$$W^{\begin{pmatrix}(Np+\frac{\rho}{2})Mv_0[\hat{\ell}_D]-\\M'N'p'\tau_0[k_\sigma]+\\ \frac{k_d\hat{\ell}_D - k_\sigma\ell_D}{2}\end{pmatrix}} \times \mathcal{F}_{m,N}^d\left[X_m \exp\left(-\frac{\left(\tau_0[k_d]+\atop(\rho-m)M\right)^2}{2s_t^2}\right)\right]$$

$$\mathcal{F}_{m',N'}^{-1,d}\left[X'_{m'}\mathcal{F}_{n,N}^{-1,d}\left[X'^{*}_n\times\exp\left(-\frac{\left(v_0[\hat{\ell}_D]+\atop(n'-m')M'\right)^2}{2s_f^2}\right)\right]_{n'}\right]_m \times (x_4(-m))_{n'}$$

$$(x_4(\rho))_{m'}\left(\frac{Mv_0[\hat{\ell}_D]}{2}\right)_m,$$

$$x_4(\rho) = \frac{M'(\tau_0[k_\sigma]+\rho M)}{2}.$$

Thus we know necessary conditions for
[MF343]
$$\Re\, C_{\rho,\vec{p}}^{(4)}(k_\sigma; \hat{\ell}_D)$$
to have a large value are
[MF344]
$$|v_0[\hat{\ell}_D]|<3S_f \text{ and } |\tau_0[k_\sigma]|<3s_t.$$

Proof. Similarly using the round bracket symbols in summations of IDFT-type and DFT-type, one can rearrange 5 components among 6 components in the second twiddle factor in (44)
[MF345]

$$\left.\begin{aligned} W^{-\frac{1}{2}n'M'\tau_0[k_\sigma]} \cdot W^{\frac{1}{2}n'mMM'} &= W^{-\frac{1}{2}n'M'(\tau_0[k_\sigma]-mM)} = (x_4(-m))_{n'}, \\ W^{-\frac{1}{2}m'M'\tau_0[k_\sigma]} \cdot W^{-\frac{1}{2}m'\rho MM'} &= W^{-\frac{1}{2}m'M'(\tau_0[k_\sigma]+\rho M)} = (x_4(\rho))_{m'}, \\ W^{\frac{1}{2}mMv_0[\hat{\ell}_D]} &= \left(\frac{Mv_0[\hat{\ell}_D]}{2}\right)_m, \end{aligned}\right\} \quad (46)$$

and move its residue term $W^{1/2\, \rho Mv0[l[<]\text{BEGINITAL}mD]}$ of the 6 components to the first twiddle factor in (44). The use of the separability of the AF of the Gaussian proves (45).

Equations (41) and (45) show that correlator of type 3
[MF346]
$$c_{\rho',\vec{p}}^{(3)}(\ell_\mu; \hat{k}_d)$$
and the one of type 4
[MF347]
$$C_{\rho,\vec{p}}^{(4)}(k_\sigma; \hat{\ell}_D)$$
are perfectly symmetrical in terms of
[MF348]
$$k_d \text{ and } \ell_D.$$

Interchanging the TD-PC and FD-PC in the pair of type 3
[MF349]
$$c_{\rho',\vec{p}}^{(3)}(\ell_\mu; \hat{k}_d)$$
and of type 4
[MF350]
$$C_{\rho,\vec{p}}^{(4)}(k_\sigma; \hat{\ell}_D),$$
called a complementary pair (CP)[27] gives other pair of type 1
[MF351]
$$c_{\rho,\vec{p}}^{(1)}(\ell_\mu; \hat{k}_d)$$
and of type 2
[MF352]
$$C_{\rho',\vec{p}}^{(2)}(k_\sigma; \ell_D),$$
called an original pair (OP)[24, 30], defined as follows.

[Original pair (OP) of TD and FD correlators]

Observe another decomposition of v[k;χ] and
[MF353]
$$C[\ell; \chi]$$
given as
[MF354]

$$\left.\begin{aligned} v[k; \chi] &= \frac{1}{\sqrt{N}}\sum_{m=0}^{N-1} X_m \mathcal{T}_{mM,0}^d u_m^{(1)}[k; X'], \\ V[\ell; \chi] &= \frac{1}{\sqrt{N'}}\sum_{m'=0}^{N'-1} X'_{m'}\mathcal{T}_{m'M',0}^{f,d} U_{m'}^{(2)}[\ell; X], \end{aligned}\right\} \quad (47)$$

whose TD-template of type-1
[MF355]
$$u_m^{(1)}[k;X']$$
and FD-template of type-2
[MF356]
$$U_m^{(2)}[\ell;X]$$
are respectively defined by
[MF357]

$$\left.\begin{aligned} u_m^{(1)}[k; X'] &= \frac{1}{\sqrt{N'}}\sum_{m'=0}^{N'-1} X'_{m'}e^{i\pi mn'MM'\Delta t\Delta f}\mathcal{T}_{0,m'M'}^d g[k], 0 \le m \le N-1, \\ U_m^{(2)}[\ell; X] &= \frac{1}{\sqrt{N}}\sum_{m=0}^{N-1} X_{m'}e^{-i\pi mn'MM'\Delta t\Delta f}\mathcal{T}_{0,-mM}^{f,d} G[\ell], 0 \le m' \le N'-1. \end{aligned}\right\} \quad (48)$$

First let
[MF358]
$$\Psi_{\rho,\vec{p}}^{(1)}[k]$$
be the $(\rho,\vec{p})$-th estimated and received CE having the TD-template
[MF359]
$$X_\rho u_\rho^{(1)}[k,X]$$
with address
[MF360]
$$(\rho,\vec{p})$$
of the lattice
[MF361]
$$T_c \mathbb{Z}_{\ell_d} \times F_c \mathbb{Z}_{\ell_d}$$
defined by the TD-template CE of type 1
[MF362]
$$\Psi_{\rho,\vec{p}}^{(1)}[k] = d_{\vec{p}} \mathcal{T}_{\rho NM,\vec{p}'N'M'}{}^d \mathcal{T}_{\rho M,N}^d X_\rho u_\rho^{(1)}[k,X]. \quad (49)$$

Then one can get its associated CCF, called a type-1 correlator
[MF363]
$$c_{\rho,\vec{p}}^{(1)}(\ell_\mu : \hat{k}_d) = \langle A e^{i\kappa} W^{\hat{k}_d \ell_c} \mathcal{T}_{\hat{k}_d,\ell_D}^d \psi[k;\chi], \quad (50)$$
$$W^{\hat{k}_d \ell_c} \times \mathcal{T}_{\hat{k}_d,\ell_\mu}^d \Psi_{\rho,\vec{p}}^{(1)}[k:\hat{k}_d,\ell_\mu]|_{d_p=1,X'\to Y',X_\rho \to Y_\rho} \rangle_{d,k}$$

and one can have
[MF364]

$$c_{\rho,\vec{p}}^{(1)}(\ell_\mu:\hat{k}_d) = A e^{i\kappa} W^{\hat{k}_d \ell_c} \sum_{k \in \mathbb{Z}} \mathcal{T}_{\hat{k}_d,\ell_D}^d \psi[k;\chi] \quad (51)$$
$$Y_\rho^*\left(W^{\hat{k}_d \ell_c} \mathcal{T}_{\hat{k}_d,\ell_\mu}^d \mathcal{T}_{\rho NM,p'N'M'}^d \mathcal{T}_{\rho M,0}^d u_\rho^{(1)}[k:Y']\right)^* =$$
$$A e^{j\kappa} W^{(\hat{k}_d - \hat{k}_d)\ell_c} \sum_{ij} d_q \frac{Y_\rho^*}{N'\sqrt{N}} \sum_{m,m',n'}^{N-1,N'-1,N'-1} X_m X_{m'}' Y_{n'}'^* \times$$
$$W^{\frac{1}{2}(\hat{k}_d \ell_\mu - \hat{k}_d \ell_D + 2MNpv_0[\ell_\mu] - 2M'N'p'\tau_0[\hat{k}_d])} \times$$
$$W^{\frac{1}{2}((mn'-m'\rho)MM'-(m'+n')M'\tau_0[\hat{k}_d]+(m+\rho)Mv_0[\ell_\mu])} \times$$
$$\theta_{ZZ}[(p-q)MN + \hat{k}_d - k_d + (\rho-m)M,$$
$$(p'-q')M'N' + \ell_\mu - \ell_D + (n'-m')M'].$$

Let $Y=X$, $Y'=X'$ and discard all the terms
[MF365]
$$d_{\vec{q}}$$
except the term satisfying
[MF366]
$$\vec{q}=\vec{p}.$$
Then one can have
[MF367]
$$|c_{\rho,\vec{p}}^{(1)}(\ell_\mu:\hat{k}_d)| \simeq \frac{A e^{j\kappa} W^{-\tau_0[\hat{k}_d]\ell_c} d_{\vec{p}}}{\sqrt{PP'}} X_\rho^* \quad (52)$$

$$W\left((Np + \frac{\rho}{2})Mv_0[\ell_\mu] - M'N'p'\tau_0[\hat{k}_d] + \frac{k_d \ell_\mu - \hat{k}_d \ell_D}{2}\right) \times$$

$$\mathcal{F}_{m,N}^d \begin{bmatrix} X_m \exp\left(-\frac{(\tau_0[\hat{k}_d]+(\rho-m)M)^2}{2s_f^2}\right) \mathcal{F}_{m',N'}^{-1,d} \\ \left[X_{m'}' \mathcal{F}_{n',N'}^{-1,d} \\ \left[X_{n'}'^* \times \exp\left(-\frac{(v_0[\ell_\mu]+(n'-m')M')^2}{2s_f^2}\right)\right]_{n'} (x_1(-m))_{n'}\right]_{m'} \\ (x_1(\rho))_{m'} \end{bmatrix}_m \times$$

$$\left(\frac{Mv_0[\ell_\mu]}{2}\right)_m, x_1(\rho) = \frac{M'(\tau_0[\hat{k}_d]+\rho M)}{2},$$

in which using the round bracket symbols in summations of IDFT-type and DFT-type, one can rearrange 5 components among 6 components in the second twiddle factor in (51)
[MF368]

$$\begin{aligned} W^{-\frac{1}{2}n'M'\tau_0[\hat{k}_d]} \cdot W^{\frac{1}{2}n'mMM'} &= W^{-\frac{1}{2}n'M'(\tau_0[\hat{k}_d]-mM)} = (x_1(-m))_{n'}, \\ W^{-\frac{1}{2}m'M'\tau_0[\hat{k}_d]} \cdot W^{-\frac{1}{2}m'M'\rho M} &= W^{-\frac{1}{2}m'M'(\tau_0[\hat{k}_d]+\rho M)} = (x_1(\rho))_{m'}, \\ W^{\frac{1}{2}mM\tau_0[\hat{k}_d]} &= \left(\frac{M\tau_0[\hat{k}_d]}{2}\right)_m, \end{aligned} \quad (53)$$

and move its residue term $W^{1/2 \, \rho M \tau_0[\hat{k}_d]}$ of the 6 components to the first twiddle factor in (51). The use of the separability of the AF of the Gaussian gives (52).

Secondly let
[MF369]
$$\Psi_{\rho,\vec{p}}^{(2)}[\ell]$$
be the $(\rho,\vec{p})$th estimated and received CE having the FD-template
[MF370]
$$X_\rho' U_{\rho'}^{(2)}[\ell,X]$$
with address
[MF371]
$$(\rho,\vec{p})$$
of the lattice
[MF372]
$$T_c \mathbb{Z}_{\ell_d} \times F_c \mathbb{Z}_{\ell_d},$$
defined by the FD-template CD of type 2
[MF373]
$$\Psi_{\rho,\vec{p}}^{(2)}[\ell] = d_{\vec{p}} \mathcal{T}_{p'N'M',-pNM}^{f,d} \mathcal{T}_{0,-\rho M}^{f,d} X_{\rho'}' U_{\rho'}^{(2)}[\ell,X]. \quad (54)$$

Then one can get its associated FD correlator, called a type-2 correlator
[MF374]

$$c_{\rho',\vec{p}}^{(2)}(k_\sigma; \hat{\ell}_D) = \left\langle \begin{array}{l} A e^{j\kappa} W^{\hat{k}_d \ell_c} \mathcal{T}_{\hat{\ell}_D,-k_d}^{f,d} \Psi[\ell;\chi], \\ W^{k_\sigma \ell_c} \times \mathcal{T}_{\hat{\ell}_D,-k_\sigma}^{f,d} \Psi_{\rho',\vec{p}}^{(2)}[\ell]|_{d_p=1,X\to Y,X_{\rho'}'\to Y_{\rho'}'} \end{array} \right\rangle_{\ell,d} \quad (55)$$

and have
[MF375]

$$C^{(2)}_{\rho',\vec{p}}(k_\sigma;\hat{\ell}_D) = Ae^{jk}W^{(k_d-k_\sigma)\ell_c}\sum_{\ell\in\mathbb{Z}}\mathcal{T}^{f,d}_{\ell_D,-k_d}\Psi[\ell;\chi] \quad (56)$$

$$Y'^*_\rho\left(\mathcal{T}^{f,d}_{\ell_D,-k_\sigma}\mathcal{T}^{f,d}_{p'N'M',-pNM}\mathcal{T}^{f,d}_{-\rho'M',0}U^{(2)}_{\rho'}[\ell:Y]\right)^* \cdot =$$

$$Ae^{jk}W^{(k_d-k_\sigma)\ell_c}\sum_{\vec{q}}d_{\vec{q}}\frac{Y'^*_\rho}{N\sqrt{N'}}\sum_{m,m',n=0}^{N-1,N'-1,N-1}X_m X'_{m'}Y^*_n\times$$

$$\Theta_{ZZ}[(p'-q')MN+\hat{\ell}_D-\ell_D+(n'-m')M',$$
$$-(p-q)MN-(k_\sigma-k_d)-(n-m)M]\times$$

$$W^{\frac{1}{2}(k_d\hat{\ell}_D-k_\sigma\ell_D+2MNqv_0[\hat{\ell}_D]-2M'N'q'\tau_0[k_\sigma])}\times$$

$$W^{\frac{1}{2}((m\rho'-m'n)MM'-(m'+\rho')M'\tau_0[k_\sigma]+(m+n)Mv_0[\hat{\ell}_D])}.$$

Let Y=X, Y'=X' and discard all the terms
[MF376]

$$d_{\vec{q}}$$

except the term satisfying
[MF377]

$$\vec{q}=\vec{p}.$$

Then one can have
[MF378]

$$C^{(2)}_{\rho',\vec{p}}(k_\sigma;\hat{\ell}_D) \simeq \frac{Ae^{jk}W^{-\tau_0[k_\sigma]\ell_c}}{\sqrt{PP'}}d_{\vec{p}}X'^*_{\rho'} \quad (57)$$

$$W\left(MNpv_0[\hat{\ell}_D]-\left(N'p'+\frac{\rho'}{2}\right)M'\tau_0[k_\sigma]+\frac{k_d\hat{\ell}_D-k_\sigma\ell_D}{2}\right)\times$$

$$\mathcal{F}^{-1,d}_{m',N'}\left[\mathcal{F}^d_{m,N}\left[X_m\mathcal{F}^d_{n,N}\left[X^*_n\times\exp\left(-\frac{(\tau_0[k_\sigma]+(n-m)M)^2}{2s_t^2}\right)\right]_n\right]_m\right]_{m'}\begin{matrix}X'_{m'}\exp\left(-\frac{(v_0[\hat{\ell}_D]+(\rho'-m')M')^2}{2s_t^2}\right)\\ \times\\ (x_2(-m'))_N\\ (x_2(\rho'))_m\end{matrix}$$

$$\left(\frac{M'\tau_0[k_\sigma]}{2}\right)_{m'}, x_2(\rho')=\frac{M(v_0[\hat{\ell}_D]+\rho'M')}{2},$$

in which using the round bracket symbols in summations of IDFT-type and DFT-type, one can rearrange 5 components among 6 components in the second twiddle factor in (56)
[MF379]

$$W^{\frac{1}{2}nMv_0[\hat{\ell}_D]}\cdot W^{-\frac{1}{2}nm'MM'} = W^{\frac{1}{2}nM(v_0[\hat{\ell}_D]-m'M')} = (x_2(-m'))_n,$$
$$W^{\frac{1}{2}mMv_0[\hat{\ell}_D]}\cdot W^{\frac{1}{2}mP\rho'M'} = W^{\frac{1}{2}nM(v_0[\hat{\ell}_D]+\rho'M')} = (x_2(\rho'))_m, \quad (58)$$
$$W^{-\frac{1}{2}m'M'\tau_0[k_\sigma]} = \left(\frac{M'\tau_0[k_\sigma]}{2}\right)_{m'},$$

and move its residue term $W^{-1/2\ \rho'M'\tau_0[k\wedge d]}$ of the 6 components to the
first twiddle factor in (56). The use of the separability of the AF of the Gaussian gives (57).

<6.2 Phase-Updating Loop and Von Neumann's Alternative Projection Theorem>
If one can get precise estimates
[MF380]

$$\hat{k}_d \text{ and } \hat{\ell}_D$$

that make all
[MF381]

$$|v_0[\hat{\ell}_\mu]|, |\tau_0[\hat{k}_d]|$$

in Lemma 2 and
[MF382]

$$|v_0[\hat{\ell}_D]|, |\tau_0[k_\sigma]|$$

in Lemma 4 are within chip-pulse bandwidth and duration, then the two CCFs
[MF383]

$$c^{(3)}_{\rho',\vec{p}}(\hat{\ell}_\mu,\hat{k}_d) \text{ and } C^{(4)}_{\rho,\vec{p}}(k_\sigma;\hat{\ell}_D)$$

will filter out the interference
[MF384]

$$<\Psi_{\eta,\rho',\vec{p}}^{(3)}[k], \Psi_{\rho',\vec{p}}^{(3)}[k]>_{d,k} \text{ and } <\Psi_{\eta,\rho,\vec{p}}^{(4)}[\ell],\Psi_{\rho,\vec{p}}^{(4)}[\ell]>_{d,l},$$

respectively contained in
[MF385]

$$c^{(3)}_{\rho',\vec{p}}(\hat{\ell}_\mu,\hat{k}_d) \text{ and } C^{(4)}_{\rho,\vec{p}}(k_\sigma;\hat{\ell}_D)$$

and recover
[MF386]

$$d_{\vec{p}},$$

in place of using conventional sharp filters. This is a radical solution to the digital signal processing for communication. The simple way to update estimates
[MF387]

$$\hat{k}_d \text{ and } \hat{\ell}_D$$

in both pairs of correlators is the following algorithm, called a Phase-Updating Loop (PUL), different from a conventional "Phase-Locked Loop" for synchronisation in communication systems:

[PUL Algorithm with Updating Rule for Attenuation Factor-MLE]:
Let
[MF388]

$$\{c^{(3)}_{\rho',\vec{p}}(\hat{\ell}_\mu,\hat{k}_{d,s})\}_{\rho'=0}^{N'-1}$$

and
[MF389]

$$\{C^{(4)}_{\rho,\vec{p}}(k_\sigma,\hat{\ell}_{D,s})\}_{\rho=0}^{N-1}$$

be the CP of the type-3 and type-4 correlator arrays, and let
[MF390]

$$\{c^{(1)}_{\rho,\vec{p}}(\hat{\ell}_\mu,\hat{k}_{d,s})\}_{\rho=0}^{N-1}$$

and
[MF391]

$$\{C^{(2)}_{\rho',\vec{p}}(k_\sigma,\hat{\ell}_{D,s})\}_{\rho'=0}^{N'-1}$$

be the OP of the type-1 and type-2 correlator arrays. For simplicity set
[MF392]

$$d_{\vec{p}}=1$$

until the PUL algorithm is terminated. Let
[MF393]

$$A(\hat{\theta}_s^{\prime,d})e^{i\kappa(\hat{\theta}_s^{\prime,d})}$$

be the s-th MLE of the attenuation factor
[MF394]

$$A(\theta^{\prime,d})e^{i\kappa(\theta^{\prime,d})}$$

with the s-th digitized estimate
[MF395]

$$\hat{\theta}_s^{\prime,d}=(\hat{k}_{d,s},\hat{\ell}_{D,s+1}) \text{ or } (\hat{k}_{d,s+1},\hat{\ell}_{D,s})$$

of the parameter $\theta'=(t_d, f_D)$ that is defined in (16), where
[MF396]

$$\psi^*(t-t_d)e^{-i2\pi f_D(t-t_d)},\psi_w(t)$$

are replaced by
[MF397]

$$(\mathcal{T}^d_{\hat{k}_{d,s},\hat{\ell}_{D,s}}\psi^{(3)}_{\rho',\vec{p}}[k])^*, \mathcal{T}^d_{\hat{k}_{d,s},\hat{\ell}_{D,s}}\psi[k],$$

respectively, given as
[MF398]

$$\hat{A}(\theta_s^{\prime,d})e^{i\kappa(\theta_s^{\prime,d})} = \frac{\sum_{k=0}^{N_T-1}\left(\mathcal{T}^d_{\hat{k}_{d,s},\hat{\ell}_{D,s}}\psi^{(3)}_{\rho',\vec{p}}[k]\right)^*\mathcal{T}^d_{\hat{k}_{d,s},\hat{\ell}_{D,s}}\psi[k]}{\sum_{k=0}^{N_T-1}\left|\mathcal{T}^d_{\hat{k}_{d,s},\hat{\ell}_{D,s}}\psi^{(3)}_{\rho',\vec{p}}[k]\right|^2}. \quad (59)$$

Then one can update an integer pair
[MF399]

$$(\hat{k}_{d,s},\hat{\ell}_{D,s+1}) (\text{resp. } (\hat{k}_{d,s+1},\hat{\ell}_{D,s}))$$

as $\hat{\ell}_{D,s+1}=\ell^*_\mu$, if s is even (resp. odd), and $\hat{k}_{d,s+1}=k^*_\sigma$, if s is odd (resp. even),
where
[MF400]

$$(\rho^{\prime,*},\ell^*_\mu) = \text{argmax}_{\rho',\ell_\mu}\mathfrak{R}\frac{\sqrt{PP'}\,c^{(3)}_{\rho',\vec{p}}(\ell_\mu,\hat{k}_{d,s})}{X'_{\rho'}\hat{A}(\theta_s^{\prime,d})e^{i\kappa(\theta_s^{\prime,d})}}, \quad (60)$$

$$(\rho^*,k^*_\sigma) = \text{argmax}_{\rho,k_\sigma}\mathfrak{R}\frac{\sqrt{PP'}\,c^{(4)}_{\rho',\vec{p}}(k_\mu,\hat{\ell}_{D,s})}{X_\rho\hat{A}(\theta_s^{\prime,d})e^{i\kappa(\theta_s^{\prime,d})}},$$

for the CP, $$(\rho^*,\ell^*_\mu) = \text{argmax}_{\rho,\ell_\mu}\mathfrak{R}\frac{\sqrt{PP'}\,c^{(1)}_{\rho',\vec{p}}(\ell_\mu,\hat{k}_{d,s})}{X_\rho\hat{A}(\theta_s^{\prime,d})e^{i\kappa(\theta_s^{\prime,d})}}, \quad (61)$$

$$(\rho^*,k^*_\sigma) = \text{argmax}_{\rho',k_\sigma}\mathfrak{R}\frac{\sqrt{PP'}\,c^{(2)}_{\rho',\vec{p}}(k_\sigma,\hat{\ell}_{D,s})}{X'_{\rho'}A(\theta_s^{\prime,d})e^{i\kappa(\theta_s^{\prime,d})}},$$

for the OP, and the initial value
[MF401]

$$\theta_0^{\prime,d}=(\hat{k}_{d,0},\hat{\ell}_{D,1}) \text{ or } (\hat{k}_{d,1},\hat{\ell}_{D,0})$$

is chosen arbitrarily, e.g.,
[MF402]

$$\theta_0^{\prime,d}=(0,0).$$

Select
[MF403]

$$\ell^*_\mu \text{ and } k^*_\sigma$$

to be candidates of
[MF404]

$$\hat{\ell}_{D,s+1} \text{ and } \hat{k}_{d,s+1}.$$

The (s+1)-th step estimation procedure is terminated if, for the chip pulse g[k] (or G[l]) duration L$\Delta$t and bandwidth L$\Delta$f,
[MF405]

$$|\hat{k}_{d,s+2} - \hat{k}_{d,s}| \leq \frac{L}{2} \text{ and } |\hat{\ell}_{D,s+2} - \hat{\ell}_{D,s}| \leq \frac{L}{2}.$$

Then such estimates are ML estimates and both of the two correlators become ML receivers. This algorithm can be written in the form of Youla's restoration[22] of a signal as given in Theorem below.

The recovery or restoration of a signal that has been distorted is one of the most important problems in signal processing. Youla[22] gave the answers to the restoration problems. Adroit use[23] of some of the mathematical machinery, introduced by Youla[22] will lead us to show that the convergence of the PUL algorithm hinges on how well the von Neumann's APT[21] does work.

Consider the Hilbert space
[MF406]

$$\mathcal{H},$$

consisting of all $\ell^2(\mathbb{Z})$ space of square-summable continuous and discrete-time (or discrete-frequency) functions with an IP, defined by
[MF407]

$$\langle f,g\rangle_{d,k} = \sum_{k=-\infty}^{\infty}f[k]g^*[k]$$

(or
[MF408]

$$\langle F,G\rangle_{d,\ell} = \sum_{\ell=-\infty}^{\infty}F[\ell]G^*[\ell], F[\ell]=\mathcal{F}[f[k]], G[\ell]=\mathcal{F}[g[k]])$$

and the norm
[MF409]

$$\|f\|=\sqrt{\langle f,f\rangle_{d,k}}$$

or
[MF410]

$$\|F\|=\sqrt{\langle F,F\rangle_{d,\ell}}.$$

Let $\varepsilon$ be any closed linear manifold (CLM) in the Hilbert space
[MF411]

$$\mathcal{H}.$$

The projection theorem[22] tells us that if $\varepsilon'$ and $\varepsilon''$ are orthogonal sub-spaces of
[MF412]

$$\mathcal{H},$$

then every f∈ε possesses a unique decomposition f=g+h, g∈ε', h∈ε", where g, h are projections of f onto ε' and ε", respectively, denoted by g=Pf, h=Qf; P denotes the associated projection operator (PO) projecting onto ε', Q=I−P its associated PO projecting onto ε", and I the identity operator.

Let $\varepsilon_1$ (resp. $\varepsilon_3$) be the set of all

[MF413]

$$f \in \ell_2(\mathbb{Z})$$

that are LΔt-TL (resp. $T_s$-TL) signals. On the contrary, denote the set of all

[MF414]

$$f \in \ell_2(\mathbb{Z})$$

that are LΔf-BL signals by $\varepsilon_2$ and that of $F_s$-BL signals by $\varepsilon_4$. Each of

[MF415]

$$\varepsilon_i, 1 \leq i \leq 4$$

is a CLM[22].

Let $P_i$ be a PO projecting onto

[MF416]

$$\varepsilon_i, 1 \leq i \leq 4.$$

and $Q_i = I - P_i$ the PO projecting onto the orthogonal complement of $\varepsilon_i$, written as

[MF417]

$$\perp \varepsilon_i, 1 \leq i \leq 4,$$

each of which is defined below. The CCF plays a role of a PO in the sense that given any two signals r and s, the signal r∈ε has a unique decomposition of the form

[MF418]

$$R = \frac{\langle r, s \rangle_t}{\|s\|^2} s + s^\perp, s \in \mathcal{E}',$$

where

[MF419]

$$s^\perp$$

is orthogonal to s. The coefficient

[MF420]

$$\frac{\langle r, s \rangle_t}{\|s\|^2}$$

is regarded as a PO projecting onto ε'.

The CP of type-3, type-4 correlators and the OP of type-1, type-2 correlators provide also POs written as:

[MF421]

$$\left.\begin{array}{l} \psi = P_{\psi^{(3)}_{\rho',\vec{p}}} \psi \psi^{(3)}_{\rho',\vec{p}} + \psi^{(3)\perp}_{\rho',\vec{p}}, \psi^{(3)}_{\rho',\vec{p}} \in \mathcal{E}_3, \\ P_{\psi^{(3)}_{\rho',\vec{p}}} \psi = \frac{\langle \psi, \psi^{(3)}_{\rho',\vec{p}}(\ell_\mu;\hat{k}_d) \rangle_{d,k}}{\|\psi^{(3)}_{\rho',\vec{p}}\|^2}, \\ \Psi = P_{\Psi^{(4)}_{\rho',\vec{p}}} \Psi \Psi^{(4)}_{\rho',\vec{p}} + \Psi^{(4)\perp}_{\rho',\vec{p}}, \Psi^{(4)}_{\rho',\vec{p}} \in \mathcal{E}_4, \\ P_{\Psi^{(4)}_{\rho',\vec{p}}} \Psi = \frac{\langle \Psi, \Psi^{(4)}_{\rho',\vec{p}}(k_\sigma;\hat{\ell}_D) \rangle_{d,\ell}}{\|\Psi^{(4)}_{\rho',\vec{p}}\|^2}, \end{array}\right\} \text{ for the } CP, \quad (62)$$

-continued $$\left.\begin{array}{l} \psi = P_{\psi^{(1)}_{\rho',\vec{p}}} \psi \psi^{(1)}_{\rho',\vec{p}} + \psi^{(1)\perp}_{\rho',\vec{p}}, \psi^{(1)}_{\rho',\vec{p}} \in \mathcal{E}_1, \\ P_{\psi^{(1)}_{\rho',\vec{p}}} \psi = \frac{\langle \psi, \psi^{(1)}_{\rho',\vec{p}}(\ell_\mu;\hat{k}_d) \rangle_{d,k}}{\|\psi^{(3)}_{\rho',\vec{p}}\|^2}, \\ \Psi = P_{\Psi^{(2)}_{\rho',\vec{p}}} \Psi \Psi^{(2)}_{\rho',\vec{p}} + \Psi^{(2)\perp}_{\rho',\vec{p}}, \Psi^{(2)}_{\rho',\vec{p}} \in \mathcal{E}_2, \\ P_{\Psi^{(2)}_{\rho',\vec{p}}} \Psi = \frac{\langle \Psi, \Psi^{(2)}_{\rho',\vec{p}}(k_\sigma;\hat{\ell}_D) \rangle_{d,\ell}}{\|\Psi^{(2)}_{\rho',\vec{p}}\|^2}, \end{array}\right\} \text{ for the } OP, \quad (63)$$

where

[MF422]

$$\psi^{(1)\perp}_{\rho,\vec{p}}, \Psi^{(2)\perp}_{\rho',\vec{p}}, \psi^{(3)\perp}_{\rho',\vec{p}}, \Psi^{(4)\perp}_{\rho,\vec{p}}$$

are orthogonal complements of

[MF423]

$$\psi^{(1)}_{\rho,\vec{p}}, \Psi^{(2)}_{\rho',\vec{p}}, \psi^{(3)}_{\rho',\vec{p}}, \Psi^{(4)}_{\rho,\vec{p}}.$$

The Alternative Projection Theorem (APT) [21, p. 55, theorem 13.7] (FIG. 11) tells us that:

If E and F are projections on CLMs

[MF424]

$$\varepsilon, \mathcal{F}$$

in a Hilbert space, respectively, then the sequence of operators E, FE, EFE, FEFE, . . . has a limit G, the sequence F, EF, FEF, . . . has the same limit G, and G is a projection on

[MF425]

$$\varepsilon \mathcal{F}.$$

(The condition EF=FE need not hold.)

With use of APT, the following result is obtained:

Theorem: Convergence of Phase Updating Loop (PUL) (see FIG. 3c):

Let us consider the 4 POs in the TD and FD that contain (s+1)-step estimates

[MF426]

$$(\rho'^*, \ell^*_\mu)(\text{resp.}(\rho^*, \ell^*_\mu)),$$

determined by the argmax-operations in terms of $(\rho', \ell_\mu)$ (resp. $(\rho, \ell_\mu)$) with the s-step estimate

[MF427]

$$\hat{k}_{ds}$$

in (60) (resp. (61)), and $(\rho^*, k^*_o)$ (resp. $(\rho''^*, k^*_o)$), determined by the argmax-operations in terms of $(\rho, k_o)$ (resp. $(\rho', k_o)$) with the s-step estimate

[MF428]

$$\hat{\ell}_{Ds}$$

in (60) (resp. (61)). Write these POs symbolically as

[MF429]

$$\left.\begin{array}{l} P_3 = P_{\psi^{(3)}_{\rho',\vec{p}}}(\rho', \ell_\mu; \hat{k}_{ds}), P_4 = P_{\Psi^{(4)}_{\rho,\vec{p}}}(\rho, k_\sigma; \hat{\ell}_{Ds}) \text{ for the } CP, \\ P_1 = P_{\psi^{(1)}_{\rho,\vec{p}}}(\rho, \ell_\mu; \hat{k}_{ds}), P_2 = P_{\Psi^{(2)}_{\rho',\vec{p}}}(\rho', k_\sigma; \hat{\ell}_{Ds}) \text{ for the } OP, \end{array}\right\} \quad (64)$$

and

[MF430]

$$Q_k = I - P_k, 1 \leq k \leq 4.$$

Then the PUL algorithm converges.

[Proof]: Consider the recursion formula for the CP only because that for the OP is exactly the same except an exchange between the TD-PC X and FD-PC X', i.e., between suffixes (3, 4) and (1, 2). Two different orderings of the time-truncation operator $P_3$ and the band-limited operator $P_4$ provide two different iteration equations;

First consider an algorithm for the recovery of
[MF431]

$$\psi$$

as follows: If
[MF432]

$$\psi \in \varepsilon_4,$$

then
[MF433]

$$\psi = \mathcal{F}^{-1,d} P_4 \mathcal{F}^d \psi$$

and
[MF434]

$$g_1 = P_3 \psi = P_3 \mathcal{F}^{-1,d} P_4 \mathcal{F}^d \psi = \psi - Q_3 \mathcal{F}^{-1,d} P_4 \mathcal{F}^d \psi,$$

Thus
[MF435]

$$\psi$$

satisfies the operator equation
[MF436]

$$A_1 \psi = g_1, \quad A_1 = I - Q_3 \mathcal{F}^{-1,d} P_4 \mathcal{F}^d.$$

The recursion, defined by
[MF437]

$$\psi = g_1 + Q_3 \mathcal{F}^{-1,d} P_4 \mathcal{F}^d \psi$$

enables us to have the iterative equation in the TD[22, 23]
[MF438]

$$\psi_i = (I - Q_3 \mathcal{F}^{-1,d} P_4 \mathcal{F}^d) \psi + Q_3 \mathcal{F}^{-1,d} P_4 \mathcal{F}^d \psi_{i-1},$$

$$\text{or } \psi_i - \psi = (Q_3 \mathcal{F}^{-1,d} P_4 \mathcal{F}^d)^i (\psi_0 - \psi), \text{ if } (\psi_0 - \psi) \in \varepsilon_4. \quad (65)$$

By the APT,
[MF439]

$$\lim_{i \to \infty} (Q_3 \mathcal{F}^{-1,d} P_4 \mathcal{F}^d)^i (\psi_0 - \psi)$$

becomes the projection of
[MF440]

$$(\psi_0 - \psi)$$

onto a CLM $\varepsilon_c = \perp \varepsilon_3 \cap \varepsilon_4$. The $\varepsilon_c$ contains only the trivial function[22, p. 699], [23, p. 637]; i.e.,
[MF441]

$$\lim_{i \to \infty} \psi_i = \psi.$$

This is one of Youla's[22] main results. Hence the operator
[MF442]

$$P_3 \mathcal{F}^{-1,d} P_4 \mathcal{F}^d$$

singles out the rectangle of chip-pulse duration $L\Delta t$ and chip bandwidth $L\Delta f$ with chip-level and data-level addresses
[MF443]

$$((\rho, \rho'), \vec{p}),$$

i.e., the intersection of the rectangular support of its associated CE
[MF444]

$$\psi_{\rho', \vec{p}}^{(3)}$$

and that of the CE
[MF445]

$$\psi_{\rho, \vec{p}}^{(4)},$$

i.e.,
[MF446]

$$[((p-1)N + \rho - \Delta a')T_c, ((p-1)N + \rho + \Delta b')T_c] \times [((p'-1)N' + \rho' - \Delta a)F_c, ((p'-1)N' + \rho' + \Delta b)F_c]$$

of the lattice
[MF447]

$$T_c \mathbb{Z} \times F_c \mathbb{Z}$$

and filters out the rest in the TFP, where $\Delta a'$, $\Delta b'$, $\Delta a$, and $\Delta b$ are integers satisfying $\Delta a' + \Delta b' = M'$ and $\Delta a + \Delta b = M$. Such an operator is referred to as a phase-space (or time-frequency) localization operator[7]. Thus the CE $\psi[k]$ is restored so that the parameters
[MF448]

$$k_d \text{ and } \ell_D$$

are estimated within $L\Delta t$ and $L\Delta f$. It should be noted that unlike usual rectangles of strictly TL (resp. BL) operator [23], the time-truncation operator $P_3$ (resp. the band-limited operator $P_4$) is defined by using a template, i.e., a non-overlapped superposition of N coded TD Gaussian chip-pulses g[k] (resp. N' coded FD Gaussian chip-pulses
[MF449]

$$G(\ell)$$

with no guard interval.

Conversely, in the FD, if $\psi \in \varepsilon_3$, then
[MF450]

$$\Psi = \mathcal{F}^d P_3 \mathcal{F}^{-1,d} \Psi$$

and
[MF451]

$$g_2 = P_4 \Psi = P_4 \mathcal{F}^d P_3 \mathcal{F}^{-1,d} \Psi = \Psi - Q_4 \mathcal{F}^d P_3 \mathcal{F}^{-1,d} \Psi.$$

That is, $\psi$ satisfies the operator equation [23]
[MF452]

$$A_2 \Psi = g_2, \quad A_2 = I - Q_4 \mathcal{F}^d P_3 \mathcal{F}^{-1,d}.$$

This gives the iterative equation
[MF453]

$$\Psi_i = (I - Q_4 \mathcal{F}^d P_3 \mathcal{F}^{-1,d}) \Psi + Q_4 \mathcal{F}^d P_3 \mathcal{F}^{-1,d} \Psi_{i-1},$$

$$\text{or } \Psi_i - \Psi = (Q_i \mathcal{F}^d P_3 \mathcal{F}^{-1,d})^i (\Psi_0 - \Psi), \text{ if } (\Psi_0 - \Psi) \in \varepsilon_3. \quad (66)$$

By the APT,
[MF454]

$$\lim_{i \to \infty} (Q_4 \mathcal{F}^d P_3 \mathcal{F}^{-1,d})^i (\Psi_0 - \Psi)$$

becomes the projection of $(\psi_0 - \psi)$ onto a CLM
[MF455]

$$\varepsilon'_c = \perp \varepsilon_4 \cap \varepsilon_3.$$

This CLM contains only the trivial function. Thus $\lim_{i \to \infty} \psi_i = \psi$.

The FD CE
[MF456]

$$\Psi[\ell]$$

is restored so that the parameters
[MF457]

$$k_d \text{ and } \ell_D$$

are estimated within $L\Delta t$ and $L\Delta f$. Similarly, the operator
[MF458]

$$P_4 \mathcal{F}^d P_3 \mathcal{F}^{-1,d},$$

i.e., another localization operator singles out the rectangle of $L\Delta t \times L\Delta f$ with chip-level and data-level addresses
[MF459]

$$((\rho,\rho'),\vec{p})$$

i.e., the intersection of the rectangular support of the CE
[MF460]

$$\Psi_{\rho',\vec{p}}^{(3)}$$

and that of the CE
[MF461]

$$\Psi_{\rho,\vec{p}}^{(4)},$$

[MF462]

$$[((p-1)N+\rho-\Delta a')T_c,((p-1)N+\rho+\Delta b')T_c] \times [((p'-1)N'+\rho'-\Delta a)F_c,((p'-1)N'+\rho'+\Delta b)F_c]$$

of the lattice
[MF463]

$$T_c \mathbb{Z} \times F_c \mathbb{Z}$$

and filters out the rest in the TFP. [End of proof]

<7. Twinned Filter Bank Multi-Carrier System>
<7.1 Transmitters for Generating Signature and Radar Signal>

Consider a multi-carrier filter bank for generating the TD-signature $v[k;\chi]$ and FD-signature
[MF464]

$$V[\ell;\chi],$$

defined in (25). Using a repetition of the TD-PC $X_m$ of period N to get an infinite code sequence at the time: $-\infty, \ldots, -T_c, 0, T_c, \ldots, \infty$ and that of the FD-PC $X'_{m'}$ of period N' to get an infinite code sequence at the frequency: $-\infty, \ldots, -F_c, 0, F_c, \ldots, \infty$, one can get: Proposition 6: Write $v[k;\chi]$ and
[MF465]

$$V[\ell;\chi]$$

in (25) respectively as
[MF466]

$$v[k;\chi] = \frac{1}{\sqrt{NN'}} \sum_{m'=0}^{N'-1} X'_{m'} \sum_{m \in \mathbb{Z}} X_m f^{TD}_{m,m'}[k - mM], \quad (67)$$

$$V[\ell;\chi] = \frac{1}{\sqrt{NN'}} \sum_{m=0}^{N-1} X_m \sum_{m' \in \mathbb{Z}} X'_{m'} f^{FD}_{m,m'}[\ell - m'M'],$$

where
[MF467]

$$f^{TD}_{m,m'}[k], f^{FD}_{m,m'}[\ell]$$

are modulated filters, defined by
[MF468]

$$\left. \begin{array}{l} f^{TD}_{m,m'}[k] = g[k]W^{-m'M'\left(k+\frac{mM}{2}\right)} = g[k]W^{-m'M'k}(-1)^{mm'}, \\ f^{FD}_{m,m'}[\ell] = G[\ell]W^{mM\left(\ell+\frac{m'M'}{2}\right)} = G[\ell]W^{mM\ell}(-1)^{mm'}. \end{array} \right\} \quad (68)$$

For an input $x[k]$ and output $y[n]$, Vaidyanathan[13, p 117] defined the input-output relation in the TD using three types of multi-rate filters with filter coefficient $h[\cdot]$: $M_f$-fold decimation filter:
[MF469]

$$y[n] = \sum_{k \in \mathbb{Z}} x[k]h[nM_f - k],$$

$L_f$-fold interpolation filter:

$$y[n] = \sum_{k \in \mathbb{Z}} x[k]h[n - kL_f],$$

and $M_j/L_f$-fold decimation filter:
[MF471]

$$y[n] = \sum_{k \in \mathbb{Z}} x[k]h[nM_j - kL_f].$$

[Proof]: The TD-signature $v[k;\chi]$ in (25) (resp. the FD-signature
[MF472]

$$V[\ell;\chi])$$

looks like the expression of a signal obtained at the output of a synthesis filter bank (SFB)[10, 12] with N' (resp. N) sub-bands and with an expansion factor equal to M (resp. M') and being phase-coded by the FD-PC $X'_{m'}$ (resp. the TD-PC $X_m$) on each sub-band. Indeed, if the
[MF473]

$$X_m, m \in \mathbb{Z} \text{ (resp. } X'_m, m' \in \mathbb{Z}\text{)}$$

is the input signal and the
[MF474]

$$f^{TD}_{m,m'}[k](\text{resp. } f^{FD}_{m,m'}[\ell])$$

is the filter on the (m,m')th sub-band of this SFB, then the output
[MF475]

$$v[k;\chi](\text{resp. } V[\ell;\chi])$$

can be written as (67). [End of proof]

Together with the symbols $\text{lcm}[M,N']=M_0N'=MN'_0$, $\text{lcm}[M',N]=M'_0 N=M'N_0$ [13],[10],[11] using $M_0N',M'_0 N$ polyphase component
[MF476]

$$E^g_e(z) = \sum_{k \in \mathbb{Z}} g[e + kM_0N']z^{-k}, \quad (69)$$

$$E^G_e(z) = \sum_{\ell \in \mathbb{Z}} G[e + \ell M'_0 N]z^{-\ell}$$

one can get polyphase filters (Vaidyanathan's[13, p 121] Type 1 polyphase)
[MF477]

$$F_{mm'}^{TD}(z) = \sum_{k=0}^{M_0N'-1} f_{mm'}^{TD}[k]z^{-k} = (-1)^{mm'} \sum_{e=0}^{M_0N'-1} E_e^g(zW^{m'M'}),$$

$$F_{mm'}^{FD}(z) = \sum_{k=0}^{M_0'N-1} f_{mm'}^{FD}[\ell]z^{-\ell} = (-1)^{mm'} \sum_{e=0}^{M_0'N-1} E_e^G(zW^{-mM}),$$

(70)

For $l_m = \text{lcm}[M,N']$, $g_d = \text{gcd}[M,N']$, there exist $N'_0, M_0$ satisfying $l_m = MN'_0 = N'M_0$. On the other hand, by the identity $l_m \cdot g_d = M \cdot N'$, $M = g_d \cdot M_0$, $N' = g_d \cdot N'_0$ hold.

Thus one can get the SFBs of 2-D modulated $v[k]$ and $V[\ell]$ by TD-, FD-PC as shown in FIGS. 4,5, respectively.

FIG. 4 shows the SFB with TD-, FD-PCs $X_m X'_{m'}$ for generating TD signature $v[k]$ in (25), (67), containing m'-th TD template
[MF478]

$$u_{m'}^{TD}[k], 0 \le m' \le N'-1.$$

FIG. 5 shows the SFB with TD-, FD-PCs $X_m X'_{m'}$ for generating FD signature
[MF479]

$$V[\ell]$$

in (25), (67), containing m-th FD template
[MF480]

$$U_m^{FD}[\ell], 0 \le m \le N-1.$$

While eq. (27) provides the SFBs for generating
[MF481]

$$\psi[k;\chi]$$

and
[MF482]

$$\Psi[\ell;\chi].$$

Proposition 7: The CEs $\psi[k;\chi]$ and
[MF483]

$$\Psi[\ell;\chi].$$

can be written respectively as
[MF484]

$$\psi[k;\chi] = \frac{1}{\sqrt{PP'}} \sum_{q,q'=0}^{P-1,P'-1} d_{\bar{q}} \cdot k_{q,q'}^{TD}[k-qNM],$$

$$\Psi[\ell;\chi] = \frac{1}{\sqrt{PP'}} \sum_{q,q'=0}^{P-1,P'-1} d_{\bar{q}} \cdot k_{q,q'}^{FD}[\ell-q'N'M'],$$

(71)

where
[MF485]

$$k_{q,q'}^{TD}[k], k_{q,q'}^{FD}[\ell]$$

are modulated filters of their associated SFBs, defined by
[MF486]

$$k_{q,q'}^{TD}[k] = v[k;\chi]W^{-q'N'M'(k+\frac{qNM}{2})} = v[k;\chi]W^{-q'N'M'k}(-1)^{qq'NN'},$$

$$k_{q,q'}^{FD}[\ell] = V[\ell;\chi]W^{qNM(\ell+\frac{q'N'M'}{2})} = V[\ell;\chi]W^{qNM\ell}(-1)^{qq'NN'}.$$

(72)

[Proof]: Equation (71) indicates that if
[MF487]

$$\{d_{q,q'}\}_{q=0}^{P-1}$$

(resp.
[MF488]

$$\{d_{q,q'}\}_{q'=0}^{P'-1})$$

denotes the input signal, and
[MF489]

$$k_{q,q'}^{TD}[k]$$

(resp.
[MF490]

$$k_{q,q'}^{FD}[\ell])$$

is the filter on the (q,q')th sub-band of its associated SFB, then the
[MF491]

$$TD\text{-}CE{:}\psi[k;\chi]$$

(resp.
[MF492]

$$FD\text{-}CE{:}\Psi[\ell;\chi])$$

is the output of its SFB with PP' sub-bands and with an expansion factor equal to NM (resp. N'M') on each sub-band. [end of proof]

Thus one can obtain the SFB for generating a transmit signal, that contains data symbols as shown in FIGS. 6,7. Conventional SFBs do not involve the process of generating signature as shown in FIGS. 4,5. In FIGS. 6,7, the case where N=N'=1 corresponds to the usual SFBs. Using the following modulated filter (MF)s for data transmission, given by
[MF493]

$$E_e^v(z) = \sum_{k \in \mathbb{Z}} v[e+kM_0N']z^{-k},$$

$$E_e^V(z) = \sum_{\ell \in \mathbb{Z}} V[e+\ell M_0'N]z^{-\ell},$$

(73)

one can obtain polyphase filters (Vaidyanathan's[13, p 121] Type 1 polyphase)
[MF494]

$$K_{qq'}^{TD}(z) = \sum_{k=0}^{P_0'MN-1} k_{qq'}^{TD}[k]z^{-k} = (-1)^{qq'NN'} \sum_{e=0}^{P_0'MN-1} E_e^v(zW^{q'N'M'}),$$

$$K_{qq'}^{FD}(z) = \sum_{\ell=0}^{P_0MN-1} k_{qq'}^{FD}[\ell]z^{-\ell} = (-1)^{qq'NN'} \sum_{e=0}^{P_0M'N'-1} E_e^V(zW^{-qNM}),$$

(74)

where $P'_0, P_0$ denote integers satisfying $P'_0 MN=1 \text{ cm}[P', MN]$, $P_0 MN=1 \text{ cm}[P,MN]$. [end of proof]

FIG. 6 shows the SFB for generating TD-complex envelope (CE) in (26)
[MF495]

$$\psi[k]$$

with input, complex-valued data
[MF496]

$$\{d_{p,p'}\}_{p,p'=1}^{P,P'},$$

FIG. 7 shows the SFB for generating FD-CE in (26)
[MF497]

$$\Psi[\ell]$$

with input, complex-valued data
[MF498]

$$\{d_{p,p'}\}_{p,p'=1}^{P,P'}.$$

<7.2 AFB: Receivers and Encoder Design>

Besides the attenuation factors $Ae^{i\kappa}$, the PD due to non-commutativity of modulation/demodulation by the carrier $1_c$ operations, accompanied by the delay $\hat{k}_d$,
[MF499]

$$W^{-\hat{k}_d \ell_c}$$

arises. The received signal in (28)
[MF500]

$$r[k; \chi, A, \kappa, \theta^{t,d}]$$

(resp. its FT
[MF501]

$$R[\ell; \chi, A, \kappa, \theta^{t,d}]),$$

(simply denoted by
[MF502]

$$r[k], R[\ell])$$

contains those PDs.

Define a type-3 (resp. type-4) CCF between the received signal $r[k]$(resp. $R[l]$ in (28) and the estimated TD-template CE of type 3 in (29)
[MF503]

$$W^{\hat{k}_d \ell_c} \mathcal{T}^d_{\hat{k}_d, \ell_\mu} u^{(3)}_{p',p}[k]|_{d_{\vec{p}}=1}$$

(resp. FD-CE in (33)
[MF504]

$$W^{-\hat{k}_\sigma \ell_c} \mathcal{T}^{t,d}_{\hat{\ell}_D, -\hat{k}_\sigma} \Psi_{\rho, \vec{p}}^{(4)}[\ell]|_{d_{\vec{p}}=1}),$$

respectively by
[MF505]

$$c^{(3),s}_{\rho',p}(\ell_\mu; \hat{k}_d) = \sum_{k \in \mathbb{Z}} r[k] \left( W^{\hat{k}_d \ell_c} \mathcal{T}^d_{\hat{k}_d, \ell_\mu} \mathcal{T}^d_{pNM;p'N'M'} \mathcal{T}^d_{0,p'M'} X'_{p'} u^{(3)}_{p'}[k; X] \right)^*,$$

$$C^{(4),R}_{\rho,p}(k_\sigma; \hat{\ell}_D) = \sum_{\ell \in \mathbb{Z}} R[\ell] \left( W^{k_\sigma \ell_c} \mathcal{T}^{f,d}_{\hat{\ell}_D, -k_\sigma} \mathcal{T}^{f,d}_{p'N'M', -pNM} \mathcal{T}^{f,d}_{0, -\rho M} X_\rho U^{(4)}_\rho[\ell; X^1] \right)^*,$$

where the phase factor
[MF506]

$$W^{\hat{k}_d \ell_c}$$

(resp.
[MF507]

$$W^{\hat{k}_\sigma \ell_c})$$

is designed to cancel out the one
[MF508]

$$W^{\hat{k}_d \ell_c}$$

in the signal component of $r[k]$ in (28), (38) (cf.
[MF509]

$$c^{(3)}_{\rho', \vec{p}}(\ell_\mu; \hat{k}_d))$$

(resp. that of
[MF510]

$$R[\ell])$$

(cf. in (28), (43)
[MF511]

$$C^{(4)}_{\rho, \vec{p}}(k_\sigma; \hat{\ell}_D)).$$

Then one can get a TD (resp. FD) analysis filter bank (AFB)[10, 12]:

Proposition 8: The CCFs of type-3 and of type-4 can be rewritten, suited to AFB realizations, respectively as
[MF512]

$$c^{(3),x}_{\rho',p}(\ell_\mu; \hat{k}_d) = \qquad (75)$$

$$\sum_{k \in \mathbb{Z}} r[k + \hat{k}_d] W^{-\hat{k}_d \ell_c} W^{\ell_p \left[k - \frac{pNM - \hat{k}_d}{2}\right]} h^{(3)}_{\rho', \vec{p}}[pNM - k + D],$$

$$C^{(4),R}_{\rho',p}(k_\sigma; \hat{\ell}_D) = \qquad (76)$$

$$\sum_{\ell \in \mathbb{Z}} R[\ell + \hat{\ell}_D] W^{-k_\sigma \ell_c} W^{-k_\sigma \left[\ell - \frac{p'N'M' - \ell_{x_z}}{2}\right]} h^{(4)}_{p,\vec{p}}[p'N'M' - \ell],$$

where $D = L - 1$ and
[MF513]

$$h^{(3)}_{\rho', \vec{p}}[k], h^{(4)}_{\rho, \vec{p}}[\ell]$$

are modulated filters of TD and FD AFBs
[MF514]

$$\left. \begin{array}{l} h^{(3)}_{\rho', p}[k] = X'_{p'} u^{(3),*}_{p'}[k; X] W^{(p'N'+\rho')M'\left(k - D - \frac{pNM - \hat{x}_d}{2}\right)}, \\ h^{(4)}_{\rho', p}[\ell] = X^*_\rho U^{(4),*}_\rho[\ell; X^1] W^{-(\rho N + \rho)M - D)\ell} W^{(pN + \rho)M \frac{p'N'M' + r_D}{2}}. \end{array} \right\} \qquad (77)$$

(When P×P'
[MF515]

$$\mathcal{M}\text{-ary symbols}$$

are transmitted,
one may evaluate the output at the address
[MF516]

$$\vec{p} = (p, p')$$

in the correlator array of p-band, p'-duration to estimate
[MF517]

$$\{d_{\vec{p}}\}_{p,p'=1}^{P,P'}.)$$

[Proof]: If the phase-modulated received TD signal
[MF518]

$$W^{-\hat{k}_d \ell_c} W^{\ell_\mu \left[k - \frac{vNM - \hat{u}_d}{2}\right]} r[k + \hat{k}_d]$$

(resp. the FD one
[MF519]

$$W^{-\hat{k}_\sigma \ell_c} W^{-k_a\left[\ell - \frac{p'N'M' - \hat{\ell}_D}{2}\right]} R[\ell + \hat{\ell}_D] \right)$$

denotes the input signal of the
[MF520]

$$(\rho', \vec{p})\text{-th}$$

(resp.
[MF521]

$$(\rho, \vec{p})\text{-th}$$

-sub-band of the AFB with P' (resp. P) sub-bands with a decimation factor equal to NM (resp. N'M') on each sub-band, given by (75) (resp. (76)), then two facts:
i) one is the TD symmetry property[10] (cf. (21))
[MF522]

$$g(-t)=g(t), \text{ i.e., } g[k]=g[D-k], u_\rho^{(3)}[k;X]=u_\rho^{(3)}[D-k; X]$$

and ii) the other is the property of the FD signal
[MF523]

$$G[-\ell]=W^{-D\ell} G[\ell], U_p^{(4)}[-\ell;X']=W^{-D\ell} U_\rho^{(4)}[\ell;X'],$$

that the TD symmetry entails, prove that its associated filter
[MF524]

$$h_{\rho',\vec{p}}^{(3)}[k]$$

(resp.
[MF525]

$$h_{\rho,\vec{p}}^{(4)}[\ell])$$

is defined by (77). [end of proof]
Note that two kinds of filters given in patent[2] contain neither the PD $W^{k\_d\ell\_c}$ nor its canceling-out terms $W^{-k\_d\ell\_c}, W^{-k\_o t c}$.
If AFB filter in (77) and P'$_0$MN, P$_0$M'N' polyphase components:
[MF526]

$$R_e^{u_{e'}}(z) = \sum_{k \in \mathbb{Z}} u_{s}^{TD}[e + kP'_0 MN]_z^{-k}, 1 \le e \le P'_0 MN, \quad (78)$$
$$R_{e'}^{U}(z) = \sum_{\ell \in \mathbb{Z}} U_{s}^{FD}[e + \ell P_0 M'N']_z^{-\ell}, 1 \le e' \le P_0 M'N',$$

then one can obtain N',N polyphase filters (Vaidyanathan's [13] Type 2 polyphase)
[MF527]

$$H_{p,s'}^{TD}(z; \hat{k}_d) = \sum_{k=0}^{P'_0 MN - 1} h_{p,s'}^{TD}[k] z^{-k} = (-1)^{pp'NN'} W^{(p'N'+s')} \quad (79)$$
$$M' \frac{R_d}{2} \sum_{e=0}^{P'_0 MN - 1} R_e^{u_{s'}}(zW^{(p'N'+s')M'}), 1 \le s' \le N'$$
$$H_{p,s}^{FD}(z; \hat{\ell}_d) = \sum_{k=0}^{P_0 M'N' - 1} h_{p,s}^{FD}[\ell] z^{-\ell} = (-1)^{pp'NN'} W^{-(pN+s)}$$
$$M \frac{r_D}{2} \sum_{e=0}^{P_0 M'N' - 1} R_{e'}^{U_s}(zW^{-(pN+s)M}), 1 \le s \le N$$

Thus one can get the AFBs as shown in FIGS. 8, 9. (The case where N=N'=1, N$_0$=N'$_0$=1 corresponds to the usual AFBs [12, 13].) The two CCFs (75) and (76) are FBMC-realizations of $c^{(3)}_{\rho',\vec{p}}(\ell_\mu;k_d), C^{(4)}_{\rho,\vec{p}}(k_\sigma; \ell_D)$, respectively;
The output bipolar symbol of the TD-AFB (resp. the FD-AFB) is given as the sign of

[MF528]

$$\Re \frac{X'_{p'} c^{(3),r}_{p',\vec{p}}(\ell_\mu; \hat{k}_d)}{\hat{A} e^{i\hat{\kappa}}}$$

(resp. that of
[MF529]

$$\Re \frac{X_p C^{(4),R}_{p,\vec{p}}(k_\sigma; \hat{\ell}_D)}{\hat{A} e^{i\hat{\kappa}}}),$$

where
[MF530]

$$\hat{A} e^{i\hat{\kappa}}$$

is the MLE of the attenuation factor $Ae^{i\kappa}$ with the MLE
[MF531]

$$\hat{\theta}'^{d}=(\hat{k}_d, \hat{\ell}_D)$$

(cf. (59)). Such a pair of SFBs and AFBs symmetrical in the TD and FD is referred to as a "twinned-FBMC".
FIG. 8 shows an AFB equipped with a TD-correlator array for decoding complex-valued data symbols
[MF532]

$$\{d_{p,p'}\}_{p=1}^{P}, 1 \le p' \le P'.$$

FIG. 9 shows the AFB equipped with an FD-correlator array for decoding complex-valued data symbols
[MF533]

$$\{d_{p,p'}\}_{p'=1}^{P'}, 1 \le p \le P,$$

In which the TD-correlator
[MF534]

$$C_{\vec{p},s'}^{TD}(\ell_\mu; \hat{k}_d)$$

and the FD-correlator
[MF535]

$$C_{\vec{p},s}^{FD}(k_\sigma; \hat{\ell}_D)$$

in FIGS. 8 and 9 correspond respectively to
[MF536]

$$c^{(3)}_{\rho',\vec{p}}(\ell_\mu; \hat{k}_d)$$

and
[MF537]

$$C^{(4)}_{\rho,\vec{p}}(k_\sigma; \hat{\ell}_D).$$

Note that if the PUL algorithm is implemented in the interface between the TD- and FD-AFBs, as shown in FIG. 10, then the resultant interface with time-varying or adaptive AFBs becomes a parameter estimator for a radar, and a synchroniser[3] for communication systems after the PUL algorithm converges. In addition, it also plays a role of an encoder of the transmitted
[MF538]

$$\mathcal{M}\text{-ary symbol } d_{\vec{p}} \in \mathbb{C}$$

for data communication on the basis of complex-valued CCFs
[MF539]

$$\frac{X'_{p'} c_{p',\vec{p}}^{(3),r}(\ell_\mu; \hat{k}_d)}{\hat{A} e^{i\hat{k}}}$$

and
[MF540]

$$\frac{X_p C_{p,\vec{p}}^{(4),R}(k_\sigma; \hat{\ell}_D)}{\hat{A} e^{i\hat{k}}}.$$

All the filters, defined by (68), (72), and (77) in this FBMC can be realized by the polyphase filters (called Vaidyanathan's type 1 or type 2 polyphase[13]). But such subjects are beyond our present interest and so are omitted here.

FIGS. 10a and 10c show the AFBs with the TD-correlator array and the FD-correlator array, respectively, and FIG. 10b shows an illustration of an alternative updating process between MLEs of two arrays based on the von Neumann's APT.

<8. Other Examples of Communication Exploiting the Non-Commutativity of Time and Frequency Shifts>

In the radar detection technique as a typical example of communication exploiting the non-commutative property (NCP) of time and frequency shift (TFS)s, a pair of TFSO of type 3 with $t_d$, $f_D$
[MF541]

$$\mathcal{T}_{t_d, f_D}$$

and TFSO of type 4
[MF542]

$$\mathcal{T}_{\hat{t}_d, \hat{f}_D}$$

with estimated parameters
[MF543]

$$\hat{t}_d, \hat{f}_D$$

at the receiver, has shown that a priori half shifts of $t_d$, $f_D$ play an important role in the estimation of those parameters. Other examples of communication systems exploiting the NCP of TFSs are given as follows.

Our discussion has been restricted to a single-target problem for simplicity. Of course, a simple way for detecting multiple targets is to adequately use the decision level $r_0$ of the statistic for estimating Doppler and the $r'_0$ of the one for delay, respectively in (32), (37) and to enumerate several targets as functions of $r_0, r'_0$.

<8.1 Multiple Target Detection Using CDMT>
Consider another approach to multiple target problems. Let $\{(k_{d,j}, \ell_{D,j})\}_{j=1}^{NPath}$ be $N_{path}$ pairs of delay and Doppler. Divide the target space $\Theta'=[0,T)\times[0,F)$ into 4 regions:
[MF544]

$$\mathcal{R}_1=[0,T/2)\times[0,F/2), \mathcal{R}_2=[0,T/2)\times[F/2,F),$$

$$\mathcal{R}_3=[T/2,T)\times[0,F/2), \mathcal{R}_4=[T/2,T)\times[F/2,F)$$

and assign TD- and FD-PCs:
[MF545]

$$\chi=\{X,X'\}, \mathcal{Y}=\{Y,Y'\}, \mathcal{Z}=\{Z,Z'\}, \mathcal{W}=\{W,W'\}$$

to each region. Suppose that the 2-D PCs
[MF546]

$$\chi, \mathcal{Z}, \mathcal{Y}, \mathcal{W}$$

have their chip address sets, defined as
[MF547]

$$\begin{aligned} \mathcal{M}_1 &= \left\{(m,m') | 0 \le m \le \frac{N}{2}-1, 0 \le m' \le \frac{N'}{2}-1\right\}, \\ \mathcal{M}_2 &= \left\{(m,m') | 0 \le m \le \frac{N}{2}-1, \frac{N'}{2} \le m' \le N'-1\right\}, \\ \mathcal{M}_3 &= \left\{(m,m') | \frac{N}{2} \le m \le N-1, 0 \le m' \le \frac{N'}{2}-1\right\}, \\ \mathcal{M}_4 &= \left\{(m,m') | \frac{N}{2} \le m \le N-1, \frac{N'}{2} \le m' \le N'-1\right\}. \end{aligned} \quad (80)$$

and their associated signature waveforms, defined by
[MF548]

$$\begin{aligned} v^{(i)}[k; \mathcal{X}^{(i)}] &\sum_{(m,m') \in \mathcal{M}_i} X_m^{(i)} X_m'^{(i)} \mathcal{T}_{m,M,m'M'}^d z[k]. \\ \mathcal{X}^{(i)} &= (\{X_m^{(i)}\}, \{X'^{(i)}_m\}), X_m^{(i)} \in \{-1,1\}, (m,m') \in \mathcal{M}_i, \end{aligned} \quad (81)$$

where $\chi^{(1)}, \chi^{(2)}, \chi^{(3)}, \chi^{(4)}$ correspond to
[MF549]

$$\chi, \mathcal{Y}, \mathcal{Z}, \mathcal{W}.$$

Then the CE of the radar signal has the multiple targets form
[MF550]

$$\varphi[k] = \sum_{i=1}^{4} \sum_{\vec{q}} d_{\vec{q}} \cdot \mathcal{T}_{qNM,qN'M'}^1, v^{(i)}[k; \mathcal{X}^{(i)}]. \quad (82)$$

If this CE is transmitted through $N_{path}$ doubly dispersive channels with delay, Doppler, and attenuation factor, respectively denoted by
[MF551]

$$\{(t_{d,i}, f_{D,i}, A_i e^{i\nu_i})\}_{i=1}^{N_{path}},$$

then the signal component of its received signal is given by
[MF552]

$$r[k] = \sum_{i=1}^{N_{path}} A_i e^{iN_i} \mathcal{T}_{t_{d,i}, f_{D,i}}^d \psi[k]. \quad (83)$$

While, the receiver uses the 2-D PC
[MF553]

$$\chi (\text{or } \mathcal{Y})$$

for the TD-template CE of type 3 and FD-template CE of type 4
[MF554]

$$\Psi_{p',\vec{p}}^{(3)}[k] \text{ and } \Psi_{p,\vec{p}}^{(4)}[\ell]$$

in (29), (33) and restricts the range of controlling
[MF555]

$$\ell_\mu \text{ and } k_\sigma,$$

respectively of the CCR of type 3 in (38) and of the CCR of type 4 in (43):
[MF556]

$$c_{\rho',\vec{p}}^{(3)}(\ell_\mu;\hat{k}_d) \text{ and } C_{\rho,\vec{p}}^{(4)}(k_\sigma;\hat{\ell}_D)$$

to
[MF557]

$$0 \leq \ell_\mu \leq \left\lfloor \frac{M'N'}{2} \right\rfloor - 1, 0 \leq k_\sigma \leq \left\lfloor \frac{MN}{2} \right\rfloor - 1$$

for $R_1$ and to
[MF558]

$$\left\lfloor \frac{M'N'}{2} \right\rfloor \leq \ell_\mu \leq M'N', 0 \leq k_\sigma \leq \left\lfloor \frac{MN}{2} \right\rfloor - 1$$

for $R_2$, then it gets the MLEs for the target subspaces $R_1, R_2$. Similarly the receiver gets MLEs for other regions $R_3, R_4$. This technique is based on the philosophy behind the CDMA and so is referred to as the code-division multiple target (CDMT)s.

Numerical simulations with N=N'=64, $N_{path}$=4, SNR ≥5 dB showed that 3,4 targets are successfully detected with probability 80% by using the PUL algorithm.

<8.2 Multiple Target Detection Using Artificial Delay-Doppler>

As shown in the proof of the convergence of PUL algorithm, TD-CCF of type 3 and FD-CCF of type 4
[MF559]

$$c_{\rho',\vec{p}}^{(3)}(\ell_\mu;\hat{k}_d) \text{ and } C_{\rho,\vec{p}}^{(4)}(k_\sigma;\hat{\ell}_D),$$

respectively using the orthogonal projection operators $P_3$ onto the $T_s$-time limited (TL) TD-space and $P_4$ onto $F_s$-band limited (BL) FD-space tell us that a pair of TFSOs of type 3 and of type 1:
[MF560]

$$(\mathcal{T}^d_{k_d,\ell_D}, \mathcal{T}^d_{k_i,\ell_\mu})$$

(or that of the frequency dual of TFSO of type 3 and the TFSO of type 2:

[MF561]

$$(\mathcal{T}^{f,d}_{\ell_D,-k_d}, \mathcal{T}^{f,d}_{\ell_D,-k_\sigma}))$$

is an inherent operator due to the NCP of delay and Doppler, and thus plays an essential role in radar and multiplexed communication systems because such a pair contains either a pair of two unknowns
[MF562]

$$(\ell_D, k_d)$$

or that of two control-parameters
[MF563]

$$(\ell_\mu, k_\sigma)$$

for getting a pair of two MLEs
[MF564]

$$(\hat{\ell}_D, \hat{k}_d).$$

On the contrary, the modulation and demodulation TFSOs
[MF565]

$$\mathcal{T}^d_{0,\ell_c}, \mathcal{T}^d_{0,-f_c}$$

and the data-level and chip-level TFSOs
[MF566]

$$\mathcal{F}^d_{pNM,p'N'M'}, \mathcal{F}^d_{\rho M,0}, \mathcal{F}^{f,d}_{\rho'M',0},$$

with data-level and chip-level addresses
[MF567]

$$((\rho,\rho'),\vec{p})$$

are independent of $(\ell_D, k_d)$.

While, the TD- and FD-CCF pair in (41), (45)
[MF568]

$$c_{\rho',\vec{p}}^{(3)}(\ell_\mu;\hat{k}_d), C_{\rho,\vec{p}}^{(4)}(k_\sigma;\hat{\ell}_D),$$

with address parameters
[MF569]

$$((\rho,\rho'),\vec{p}),$$

contains the data
[MF570]

$$d_{\vec{p}}$$

together with several PDs.

This suggests that if the artificial parameters
[MF571]

$$\{k_{d,i}, \ell_{D,i}\}_{i=1}^{N_{push}}$$

(for simplicity setting
[MF572]

$$A_i e^{j\kappa_i} = 1)$$

are embedded in
[MF573]

$$d_{\vec{p}},$$

then such parameters are available for a multiple target problem. For example, consider communication systems based on the NCP of delay and Doppler using $N_{path}$ pairs of TD-TFSOs and TD-CCFs and $N_{path}$ pairs of FD-TFSOs and FD-CCFs, defined as
[MF574]

$$\left. \begin{array}{l} \text{pair of TD-TFSOs:} \left( \mathcal{T}^d_{k_d,i,\ell_{D,i}}, \mathcal{T}^d_{k_{d,i},\ell_p,} \right), \text{TD-CCF:} c_{\rho',p}^{(3)}(\ell_{\mu,i};\hat{k}_{d,i}) 1 \leq i \leq N_{path}, \\ \text{pair of FD-TFSOs:} \left( \mathcal{T}^{f,d}_{\ell_{D,i}-k_{d,i}}, \mathcal{T}^{f,d}_{\ell_{D,i},-k_{d,i}} \right), \text{FD-CCF:} C_{\rho',p}^{(4)}(k_{\sigma,i};\hat{\ell}_{D,i}) 1 \leq i \leq N_{path}. \end{array} \right\} \quad (84)$$

with $N_{path}$ pairs of parameters
[MF575]

$$\{(k_{d,i}, \ell_{D,i})\}_{i=1}^{N_{path}}.$$

Such systems use $N_{path}$ pairs of TD-, FD-templates embedded in transmitted TD- and FD-signatures and PUL algorithm for estimating
[MF576]

$$(k_{d,i}, \ell_{D,i}),$$

where the PUL algorithm was called the "active" PUL[25, 30] in the sense that updating is done at the transmitter; but the adjective active was something of a misnomer because updating is applicable to the receiver only. The above MLE is based on identifying $N_{path}$ pairs of known shifts

[MF577]
$$\{(k_{d,i}, \ell_{D,i})\}_{i=1}^{N_{path}}$$

from signals with embedded those shifts. Namely, it is relatively different from the single-target problem. Hence the above PUL is an ordinary PUL.

The CDMT technique can be applied to
[MF578]
$$\mathcal{M}\text{-ary}$$

phase-shift-keying (PSK) communication with data
[MF579]
$$d_q = W_{\mathcal{M}}^{-kq}, W_{\mathcal{M}} = e^{-i\frac{2\pi}{\mathcal{M}}}, k_q \in \mathbb{Z}, 0 \le k_q \le \mathcal{M}-1.$$

Using $N_{path}$ 2-D PCs and two twiddle factors
[MF580]
$$W_{\mathcal{M}}^{\ell}, W_{\mathcal{M}}^{\ell'}, 0 \le \ell, \ell' \le \mathcal{M}-1$$

placed in the front of N' TD-CCF and N FD-CCF arrays
[MF581]
$$c_{\rho,\vec{p}}^{(3)}(\ell_u;\hat{k}_d) \text{ and } C_{\rho,\vec{p}}^{(4)}(k_\sigma;\vec{\ell}_D),$$

called a "phase tuned layer (PTL)" and replacing the
[MF582]
$$\arg\max_{\rho',\ell_u}, \arg\max_{\rho,k_\sigma}$$

operations for MLE in the PUL by
[MF583]
$$\arg\max_{\rho',\ell_u,\ell'}, \arg\max_{\rho,k_\sigma,\ell'}$$

by augmenting two PTL variables
[MF584]
$$\ell, \ell'.$$

one can get a PTL that plays a role of replacing
[MF585]
$$d_{\vec{p}}$$

of the pair of CCFs in (41), (45) by
[MF586]
$$d_{\vec{p}} \cdot W_{\mathcal{M}}^{\ell}, d_{\vec{p}} \cdot W_{\mathcal{M}}^{\ell'}$$

with the result that phase errors in the real parts of the CCFs have Gaussian distribution with mean 0.

The inventor can get good numerical simulation results with N=N'=16,
[MF587]
$$\mathcal{M} = 8, 16$$

and SNR 30 dB. However, when
[MF588]
$$\mathcal{M} = 16,$$

sidelobes arise the left- and right-hand sides of the main lobe in the distribution, which means decoding errors may occur. Hence only use of simple PD-cancellation methods limit to setting
[MF589]
$$\mathcal{M} = 8.$$

Thus, in order to try M-ary communication with
[MF590]
$$\mathcal{M} \ge 32,$$

one can divide the delay-Doppler space $\Theta'$ and the signal TFP S into
[MF591]
$$\frac{\mathcal{M}}{8}$$

delay-Doppler sub-spaces and sub-TFPs and assign
[MF592]
$$\{X^{(i)} = (\{X_m^{(i)}\}, \{X_m'^{(i)}\}), X_m^{(i)}, X_m'^{(i)} \in \{-1, 1\}\}_{i=1}^{\frac{\mathcal{M}}{8}}$$

to each sub-TFP. Moreover, let us suppose that artificial shifts
[MF593]
$$(k_{d,i}, \ell_{D,i})$$

are around the center of i-th delay-Doppler sub-space and use the PTLs of $W_8 = \exp(-i2\pi/8)$ and $W_\mathcal{M} = \exp(-i2\pi/\mathcal{M})$, placed in the front of TD- and FD-CCFs, namely,
[MF594]
$$W_8^{\lambda_p} \cdot W_\mathcal{M}^{j_T}, \text{ for TD-CCF}, \lambda_p \in \{0, 1, \ldots, 7\}, j_T \in \left\{0, 1, \ldots, \frac{\mathcal{M}}{8}\right\} \quad (85)$$
$$W_8^{\lambda'_p} \cdot W_\mathcal{M}^{j_F}, \text{ for FD-CCF}, \lambda'_p \in \{0, 1, \ldots, 7\}, j_F \in \left\{0, 1, \ldots, \frac{\mathcal{M}}{8}\right\}$$

This results in the following replacement of the PTL for
[MF595]
$$d_{\vec{p}}$$

and arg max operation
[MF596]
$$\begin{aligned} d_{\vec{p}} &\Rightarrow d_{\vec{p}} \cdot W_8^{\lambda_p} \cdot W_\mathcal{M}^{j_T}, \arg\max_{\rho',\ell_p;\lambda_p;j_T}, \text{ for } TD\text{-CCF}, \\ d_{\vec{p}} &\Rightarrow d_{\vec{p}} \cdot W_8^{\lambda_p} \cdot W_\mathcal{M}^{j_F}, \arg\max_{\rho,k_\sigma;\lambda'_p,j_F}, \text{ for } FD\text{-CCF}. \end{aligned} \quad (86)$$

Hence one should require
[MF597]
$$\frac{\mathcal{M}}{8} \cdot 8 \cdot (N + N')$$

CCFs in total. Therefore, one can obtain numerical decoding simulation results for 128-PSK, 256-PSK using 16, 32 2-D PCs. This M-ary PSK communication realized a new class of multiplexing communication, called "delay-Doppler space division multiplex (dD-SDM)"[35, 34]. However, the phase resolution of this system remains within $W_\mathcal{M} = \exp(-i2\pi/\mathcal{M})$. So, it is consequently unable to realize a high
[MF598]
$$\mathcal{M}$$

-ary PSK communication. A new technique to realize a high M-ary PSK communication is proposed as follows.

The inventor can give communication systems with modulation and demodulation of high
[MF599]

$$\mathcal{M}$$

-PSK in cooperating with establishing synchronisation, that are capable of being used also as a synchroniser for communication and or radar. First of all, one can provide explanations of FIGS. 12-17 relating to
[MF600]

$$\mathcal{M}$$

-ary PSK encoder and decoder as follows.

FIG. 12 illustrates the block-diagram of a transmitter (or an encoder) that is capable of being used also as an efficient and high-resolution radar equipped with
[MF601]

$$\mathcal{M}$$

-ary PSK communication.

There are two different kinds of states: one is synchronizer/radar state (when the data $d_{\vec{q}}$ is on the upward sides of the switches 1-1,1-2) and another is
[MF602]

$$\mathcal{M}$$

-ary PSK communication state (when the data $d_{\vec{q}}$ is connected to the down-ward of the switches 1-1,1-2). Each state is controlled by the switches. When
[MF603]

$$d_{\vec{q}}$$

is
[MF604]

$$\mathcal{M}$$

-ary PSK, i.e., the data communication state, the switches are on downward.

The leftmost part of the transmmitter is the input
[MF605]

$$d_{\vec{q}}.$$

When the transmitter is in the synchronizer/radar state, it performs four procedures to a chip waveform:
[MF606]

$$\begin{pmatrix} (m',\bar{q}) & -TD\text{-template} \\ (m,\bar{q}) & -FD\text{-template} \end{pmatrix} \text{generation by the 2-D PC}_X$$

$\&(N'/N)$-$TD$-/$FD$-template multiplexing $\&(P'/P)$-$TD$-/$FD$-signature-, and $d_{\vec{q}}$-multiplexing while when the transmitter is in the data communication state, it performs six procedures to a chip waveform:
[MF607]

$$\begin{pmatrix} (m',\bar{q}) & -TD\text{-template} \\ (m,\bar{q}) & -FD\text{-template} \end{pmatrix} \text{generation by the 2-D PCs}_X^{(i)}$$

$\&(N_1'/N_1)$-$TD$-/$FD$-template multiplexing $\&\left(\left[\frac{M-1}{M_0}\right]+1\right)$-PC multiplexed signature $\&\left(\left[\frac{M-1}{M_0}\right]+1\right)$-signature multiplexing $\&(P'/P)$-$TD$-/$FD$-signature-, and $d_{\vec{q}}$-multiplexing Next, in the block of the k-encoder, consisted of the j'-th AC chosen from
[MF608]

$$\left(\left[\frac{M-1}{M_0}\right]+1\right)$$

parallel ACs, where the symbol
[MF609]

$$\vdots$$

denotes the set of the ACs and the dot . simply its one.

In accordance with an embodiment of the present invention, the encoder-switches 1-3, 1-4 choose the j-th AC in the block of the k-encoder, according to j, and the transmitter phase-modulates the output of the encoder by the j'-th PSK symbol
[MF610]

$$w_{M_0}^{j'}$$

which is determined by an encoding of k with integers j,j', defined as
[MF611]

$$k = jM_0 + j', \, j = \left[\frac{k}{M_0}\right], \, j' = \left\{\frac{k}{M_0}\right\}.$$

When the switch 1-2 is on upward and downward sides, respectively
[MF612]

TD-CE$\psi[k]$ and FD-CE$\Psi[\ell]$ in (27) and
[MF613]

TD-CE$\psi^{AC}[k]$ and FD-CE$\Psi^{AC}[\ell]$ as defined below in (87) respectively, might be passed through the switch. Furthermore, in accordance with an embodiment of the present invention, the transmitter (or the encoder) modulates those CEs by a carrier
[MF614]

$$\ell_c,$$

transmits the resultant passband (PB) signal through the main channel (MC) with shifts
[MF615]

$$(k_d, \ell_D),$$

and demodulates the noisy PB signal, contaminated by noise, by the carrier
[MF616]

$$\ell_c,$$

resulting a received signal.

The explanation of the block-diagram shown in FIG. 12 is over.

If a high
[MF617]

$$\mathcal{M}$$

-PSK modulated symbol
[MF618]

$$\exp\left(\frac{i2\pi k}{M}\right)$$

is transmitted and is contaminated by both phase noise and additive noise, then a signal
[MF619]

$$\exp\left(\frac{i2\pi k}{M}\right)$$

should be resolved. However, its resolution is unrealizable. To solve it, in a k-encoder (the right block in the lower part of FIG. 12), the transmitter encodes k in the form
[MF620]

$$k = jM_0 + j', \ j = \left[\frac{k}{M_0}\right], \ j' = \left\{\frac{k}{M_0}\right\}$$

so as to transmit a lower
[MF621]

$$M_0$$

-PSK modulated symbol
[MF622]

$$\exp\left(\frac{i2\pi j'}{M_0}\right).$$

While to transmit the encoded integer
[MF623]

$$j = \left[\frac{k}{M_0}\right],$$

the transmitter relies heavily on the joint estimation method of delay and Doppler with high precision, proposed by this disclosure. Namely, the transmitter firstly divides the ($t_d$, $f_D$)-parameter space $\Theta'$ and the signal time-frequency plane (TFP) S equally into
[MF624]

$$\left(\left[\frac{M-1}{M_0}\right]+1\right)$$

sub-parameter spaces $\Theta^{(i),'}$ and sub-TFP $S^{(i)}$; secondly assigns 2-D PC $\chi^{(i)}$ to each sub-TFPs; thirdly 2-DBPSK modulates a chip waveform by
[MF625]

$$\{\chi^{(i)}\}_{i=0}^{\left[\frac{M-1}{M_0}\right]}$$

2-D PCs; fourthly combines those BPSK-modulated signals by
[MF626]

$$\left(\left[\frac{M-1}{M_0}\right]+1\right)-\chi^{(i)}$$

-multiplexing; fifthly assumes a situation that the resultant multiplexed signal is transmitted through the j-th channel, called the j-th artificial channel (AC), chosen from
[MF627]

$$\left(\left[\frac{M-1}{M_0}\right]+1\right)$$

parallel ACs, according to j, so that those multiplexed signal is time-frequency shifted by about the center of the sub-parameter space $\Theta^{(j),'}$; sixthly PSK-modulates the output of the j-th AC by the j'-th
[MF628]

$$M_0$$

-PSK symbol
[MF629]

$$W_{M_0}^{-j'} = \exp\left(\frac{i2\pi j'}{M_0}\right)$$

to get a transmit CE. The transmitter modulates this CE by the carrier
[MF630]

$$\ell_c$$

and inputs the resultant PB signal to the MC with shifts
[MF631]

$$(k_d, \ell_D).$$

External noise is added to the output of the MC. The transmitter demodulates the noisy PB signal by the carrier
[MF632]

$$\ell_c.$$

The resultant BB signal yields a received CE.

Next, the explanation of the block-diagram as shown in FIG. 13 is given.

FIG. 13 shows a block-diagram of a receiver/synchroniser (or a decoder) of a communication system of capable of being used also as an efficient and high-resolution radar, equipped with
[MF633]

$$M$$

-ary PSK communication.

When the receiver is in the synchronizer/radar state (i.e., the switch 2-1 is on the upward side), it performs two procedures to a chip waveform:
[MF634]

$$\begin{pmatrix}(\rho', \vec{q})\text{-TD-template}\\(\rho, \vec{q})\text{-FD-template}\end{pmatrix} \text{ generation by the 2-}D\ PC\chi$$

while when the receiver is in the data communication state (i.e., the switch 2-1 is on the downward side), it firstly decodes k in the k-decoder, denoted by k^ and defined as

[MF635]

$$\hat{k} = \hat{j}M_0 + \hat{j}', \hat{j} = \left[\frac{\hat{k}}{M_0}\right], \hat{j}' = \left\{\frac{\hat{k}}{M_0}\right\},$$

and secondly performs two procedures a chip waveform:
[MF636]

$$\begin{pmatrix}(\rho',\vec{q}) & \text{-TD-template}\\ (\rho,\vec{q}) & \text{-FD-template}\end{pmatrix} \text{ generation by the 2-D } PCs\chi^{(\hat{j})}$$

so as to select the $\hat{j}$-th AC from
[MF637]

$$\left(\left[\frac{M-1}{M_0}\right]+1\right)$$

parallel ACs, where the symbol
[MF638]

$$\vdots$$

denotes the set of the ACs and the dot . simply its one.

In accordance with an embodiment of the present invention, when the switch 2-1 is on downward side, the decoder chooses the
[MF639]

$$\hat{j}$$

-th AC in the block of the k-decoder, according to $\hat{j}$, and the receiver phase-modulates the output of the AC by the $\hat{j}'$-th PSK symbol
[MF640]

$$w_{M_0}^{-\hat{j}'}$$

to get a template CE. The receiver calculates the CCR between the received CE and this template CE, in the COR-block of the lower part of the diagram of FIG. 13.

The symbol COR means correlation. The big block in the right-hand-side of the COR indicates the block of maximum likeklihood estimating
[MF641]

$$(k_d, \ell_D),$$

and $Ae^{i\kappa}$, recovering
[MF642]

$$d_{\vec{q}},$$

and decoding $\hat{k}$ for the selected chip-level addresses $(\rho',\rho)$: When the receiver is in the synchroniser/radar state (i.e., the switch 2-2 is on the upward side), it performs
[MF643]

$$\operatorname*{argmax}_{\rho',\ell_\mu} \mathcal{R}\left[c^{(3)}_{\rho',\vec{p}}(\ell_\mu; \hat{k}_d)/(X'_{\rho'}, Ae^{i\kappa})\right]$$

$$\Updownarrow PUL\, k^*_\sigma \to \hat{k}_d \searrow^{\nearrow} \ell^*_\mu \to \hat{\ell}_D \to \begin{pmatrix}MLE:(k^*_\sigma, \ell^*_\mu)\\ MLE:\hat{A}e^{i\kappa}\end{pmatrix} \to d_{ij} \text{ reconstruction}$$

$$\operatorname*{argmax}_{\rho,k_\sigma} \mathcal{R}\left[C^{(4)}_{\rho',\vec{p}}(k_\sigma; \hat{\ell}_D)/(X_\rho, Ae^{i\kappa})\right]$$

While when the receiver is in the data communication state (i.e., the switch 2-2 is on the downward side), it performs
[MF644]

$$\operatorname*{argmax}_{\rho',\ell_\rho,\hat{j},\hat{j}'} \mathcal{R}\left[c^{AC,(3)}_{\rho',\vec{p},\hat{j},\hat{j}'}(\ell_\mu; \hat{k}_d, \hat{j}, \hat{j}')/(X'_{\rho'}, Ae^{i\kappa})\right]$$

$$\Updownarrow PUL\, k^*_\sigma \to \hat{k}_d \searrow^{\nearrow} \ell^*_\mu \to \hat{\ell}_D \to \begin{pmatrix}MLE:(k^*_\sigma, \ell^*_\mu)\\ MLE:\hat{A}e^{i\kappa}\end{pmatrix} \to \begin{matrix}k\text{ decoding}\\ \hat{k}=\hat{j}^*M_0+\hat{j}'^*\end{matrix}$$

$$\operatorname*{argmax}_{\rho,k_\sigma,\hat{j},\hat{j}'} \mathcal{R}\left[C^{AC,(4)}_{\rho',\vec{p},\hat{j},\hat{j}'}(k_\sigma; \hat{\ell}_D, \hat{j}, \hat{j}')/(X_\rho, Ae^{i\kappa})\right]$$

The explanation of the block-diagram shown in FIG. 13 is over.

Next, consider a situation that a received CE is 2-DBPSK demodulated by a 2-D PC phase modulated chip waveform. When the receiver is in the the data communication state (i.e., the switch 2-1 is on downward), it 2-D BPSK modulates a chip waveform by the estimated
[MF645]

$$\hat{j}$$

-th 2-D PC
[MF646]

$$\chi^{(\hat{j})}$$

and inputs the 2-DBPSK modulated signal to the
[MF647]

$$\hat{j}$$

-th AC, chosen from
[MF648]

$$\left(\left[\frac{M-1}{M_0}\right]+1\right)$$

parallel ACs and
[MF649]

$$\mathcal{M}_0$$

-PSK demodulates the output signal of the AC by the symbol
[MF650]

$$w_{M_0}^{-\hat{p}}.$$

In the final step in the MLE block, the real parts of TD-CCFs and FD-CCFs, normalized by the PC and the attenuation factor
[MF651]

$$\mathcal{R}\left[c^{AC,(3)}_{\rho',\vec{p},\hat{j},\hat{j}'}(\ell_\mu, \hat{k}_d, \hat{j},\hat{j}')/(X'_{\rho'}, Ae^{i\kappa})\right], \mathcal{R}\left[C^{AC,(4)}_{\rho',\vec{p},\hat{j},\hat{j}'}(k_\sigma, \hat{\ell}_D, \hat{j},\hat{j}')/(X_\rho, Ae^{i\kappa})\right]$$

are maximized in terms of 4 variables
[MF652]

$$(\rho', \vec{p}, \hat{j}, \hat{j}'), (\rho, \vec{p}, \hat{j}, \hat{j}')$$

to get MLEs of
[MF653]

$$(k_d, \ell_D).$$

If the PUL algorithm converges, then the receiver gets convergence
[MF654]

$$(k^*_d, \ell^*_D).$$

Thus the convergence is common in two states. When the receiver is in the synchroniser/radar state (i.e., the switch 2-2 is on the upward side), it recovers
[MF655]

$$d_{\vec{q}},$$

while, when the receiver is in the data communication state (i.e., the switch 2-2 is on the downward side), it decodes k in the form
[MF656]

$$k^* = j^* M_0 + j^{*'}$$

by using MLEs for
[MF657]

$$(\hat{j}, \hat{j}').$$

Note that even when the receiver is in the usual synchroniser/radar state (i.e., the switch 2-2 is on the upward side), it is capable of low
[MF658]

$$M_0$$

-PSK modulating/demodulating to convey data
[MF659]

$$d_{\vec{q}}.$$

e.g.,
[MF660]

$$M_0 = 8.$$

FIG. 14 shows the distribution of magnitudes of the real parts of the CCFs on the main channel (MC)'s delay τ and Doppler τ parameter space. It indicates that the main lobe is isolated.

When the transmitter is in the synchroniser/radar state, the main lobe locates at
[MF661]

$$(k_d, \ell_D)$$

and it is discriminated from side lobes, where the double-wave symbol denotes background noise.

FIG. 15 shows the distribution of magnitudes of the real parts of the CCFs on the τ-ν plane when three parallel ACs are added to the MC.

Three parallel ACs are connected in series in the front of the MC in order to encode k using the
[MF662]

$$M$$

-PSK modulated signal. The MC still remains at
[MF663]

$$(k_d, \ell_D).$$

However, when the ACs are added to the MC and the three series channels, MC+AC0,MC+AC1,MC+AC2 locate at
[MF664]

$$(k_d + k_d^{(0)}, \ell_D + \ell_D^{(0)}), (k_d + k_d^{(1)}, \ell_D + \ell_D^{(1)}), (k_d + k_d^{(2)}, \ell_D + \ell_D^{(2)}),$$

respectively.

The time shifts and frequency shifts are simply additive in quantitative terms, However, several new PDs simultaneously arise and are accompanied by group-theoretical property. In order to obtain the distribution as shown in FIG. 15, one needs the rigorous estimation of several PDs and maximization of the real part of the CCFs by using MLE, together with augmenting parameter variables j,j' to cancel out the PDs, as described in written description of this disclosure. The augmented variables j,j' may take
[MF665]

$$\left[\frac{M-1}{M_0}\right] + 1, M_0.$$

different values, respectively.

FIG. 16 shows the symbol's fundamental TFP S of [0, $T_s$)×[0, $F_s$) and its 4 partitioned sub-TFPs $S^{(i)}$. This partitioning is intended to exploit the AC parameter space of co-dimension 2 having the NCP of TFSs, where the term "co-dimension" means the dimension of the parameter space.

In FIG. 16, the 4-partition (Gabor's partition) of the signal's TFP of time duration $T_s$ and bandwidth $F_s$ ($S^{(0)}, S^{(1)}, S^{(2)}, S^{(3)}$) and the vertical axis is perpendicularly added to the TFP, where a scale of 4 pairs of AC shifts
[MF666]

$$(k_d^{(0)}, \ell_D^{(0)}), (k_d^{(1)}, \ell_D^{(1)}), (k_d^{(2)}, \ell_D^{(2)}), (k_d^{(3)}, \ell_D^{(3)}),$$

is attached to it, associated as a third variable of the TFP besides the T and F coordinate axes.

FIG. 17 shows also the 4-partitioned sub-TFPs $S^{(i)}$ with assigned PC $X^{(i)}$ that is intended to exploit the AC parameter space of co-dimension 2 having the NCP of TFSs.

As shown in FIG. 17, each $S^{(i)}$ is time-frequency shifted by $(k^{(i)}_d, l^{(i)}_D)$, 0≤i≤3. The signal's TFP S can be identified with the target space of the parameter of the MC
[MF667]

$$(k_d, \ell_D)$$

having its fundamental unit plane
[MF668]

$$[0, T_s) \times [0, F_s).$$

That is, if a target exists around the TFP with data-level address
[MF669]

$$\vec{p} = (p, p')$$

i.e., around the neighborhood of sub-TFP [(p−1)$T_s$,p$T_s$)× [(p'−1)$F_s$,p'$F_s$) then the target should be discriminated within the data-level address
[MF670]

$$\vec{p} = (p, p'), \ 1 \leq p \leq P-1, \ 1 \leq p' \leq P'-1$$

Hence the argmax operation on the two real parts of the CCFs in FIG. 13 needs the data-level address
[MF671]

$$\vec{p}$$

regardless of the use of data communication.

As discussed above, in the transmitter and receiver, respectively in FIGS. 12 and 13 the upward and downward systems are alternatively switched.

The systems connected to the upward sides of the switches 1-1, 1-2, 2-1, 2-2 in FIGS. 12 and 13 are those in accordance with an embodiment of the patent[6], while in an embodiment of the present disclosure, the systems connected to the downward sides of these switches are multiplexed communication systems based on the encoder/decoder exploiting the NCP of the TFSs.

FIGS. 12 and 13 enables us to discriminate against the synchroniser/radar not equipped with high M-ary communication and to show originality in this disclosure.

In accordance with an embodiment of this disclosure, in the transmitter and receiver system, in order to transmit

[MF672]

$\mathcal{M}$-ary PSK modulated symbol
[MF673]

$$\exp\left(\frac{i2\pi k}{\mathcal{M}}\right), 0 \leq k \leq \mathcal{M}-1$$

and to embed efficiently "information" k into its transmit signal, for an integer
[MF674]

$\mathcal{M}_0, 1 \leq \mathcal{M}_0 \leq \mathcal{M}$, the transmitter prepares
[MF675]

$$\left(\left[\frac{\mathcal{M}-1}{\mathcal{M}_0}\right]\left(\stackrel{def}{=} \text{the integer part of } \frac{\mathcal{M}-1}{\mathcal{M}_0}\right)+1\right)$$

pairs of 2-DBPSK codes, i.e., pairs of TD-PCs of period N
[MF676]

$X^{(j)} = \{X_m^{(j)}\}$ and FD-PCs of period N'
[MF677]

$X^{(j),\prime} = \{X_m^{(j),\prime}\}$ and divides the fundamental unit plane $\Theta' = [0, T_s) \times [-F_s/2, F_s/2)$ of the delay and Doppler-parameter space
[MF678]

$\Theta_{max} = [0, T_{max}) \times [-F_{max}/2, F_{max}/2)$ and the signal's TFP $S = [0, T_s) \times [0, F_s)$ equally into
[MF679]

$$\left(\left[\frac{\mathcal{M}-1}{\mathcal{M}_0}\right]+1\right)$$

sub-parameter spaces and sub-TFPs, respectively denoted as
[MF680]

$\Theta^{(i)}, S^{(i)}, 0 \leq i \leq \left[\frac{\mathcal{M}-1}{\mathcal{M}_0}\right]$, where $T_s = NM\Delta t$, $F_s = N'M'\Delta f$ denote the time duration and band-width of the symbol
[MF681]

$d_{\vec{q}}, \vec{q} = (q, q')$, $T_{max} = PT_s$, $F_{max} = P'F_s$ denote the maxima of delay and Doppler to be detected with integers P, P', and the sampling intervals $\Delta t$, $\Delta f$.
Next the transmitter decomposes information k given as
[MF682]

$$k = \left[\frac{k}{\mathcal{M}_0}\right]\mathcal{M}_0 + \left\{\frac{k}{\mathcal{M}_0}\right\} = j\mathcal{M}_0 + j'$$

and transmits an integer pair (j, j'), i.e., an integer part
[MF683]

$$j = \left[\frac{k}{\mathcal{M}_0}\right]\left(\stackrel{def}{=} \text{the integer part of } \frac{k}{\mathcal{M}_0}\right),$$

$0 \leq j \leq \left[\frac{\mathcal{M}-1}{\mathcal{M}_0}\right]$ and its fraction fraction part
[MF684]

$$j' = \left\{\frac{k}{\mathcal{M}_0}\right\}\left(\stackrel{def}{=} \text{the fractional part of } \frac{k}{\mathcal{M}_0}\right),$$

$0 \leq j' \leq \mathcal{M}_0 - 1$, in place of k. To transmit the encoded integer pair (j, j'), the transmitter 1) 2-D BPSK-modulates a chip waveform of time duration $T_c = M\Delta t$ and bandwidth $F_c = M\Delta f$ by 2-D PC $X^{(j)}$; 2) gets a 2-D phase-modulated signal, called a TD-signature and its Fourier Transform (FT), called an FD-signature; 3) time-frequency shifts by data-level shift ($T_s$, $F_s$) and combines these time-frequency shifted signatures in a non-overlapping form to obtain a
[MF685]

$$\left(\left[\frac{\mathcal{M}-1}{\mathcal{M}_0}\right]+1\right)\text{-signature-multiplexed}$$

signal. Next the transmitter assumes that the multiplexed signal may transmit through an artificial channel (AC) with delay-Doppler shifts
[MF686]

$(k_d^{(j)}, \ell_D^{(j)})$, located at around the center of the sub-parameter space $\Theta^{(j),\prime}$. To simulate such a situation, the transmitter makes two TFSOs of type 4
[MF687]

$T^{d}_{k_d^{(j)}, \ell_D^{(j)}}, T^{fd}_{\ell_D^{(j)}, -k_d^{(j)}}$ act on the multiplexed TD- and FD-signals, respectively. Thirdly, the transmitter PSK-modulates the resulting time-frequency shifted TD-signal by
[MF688]

$\mathcal{M}_0$-ary symbol
[MF689]

$W_{\mathcal{M}_0}^{-j'}$

[MF690]

$$\left(W_{\mathcal{M}_0} = \exp\left(\frac{-i2\pi}{\mathcal{M}_0}\right)\right),$$

(i.e., multiplies the PSK-modulated signal by the symbol
[MF691]

$d_{\vec{q}}$), and combines these (P/P') signals in non-overlapping form on the TFP to generate TD-CE and its DFT, FD-CE (cf. FIG. 12), equipped with
[MF692]

$\mathcal{M}_0$

-ary PSK communication, in place of (27), given by
[MF693]

$$\psi^{AC}\left[k;\{\chi^{(i)}\}_{i=0}^{\left[\frac{M-1}{M_0}\right]}, j, j'\right] = \frac{1}{\sqrt{PP'}} \sum_{q,q'=0}^{P-1,P'-1} \frac{d'_q \cdot W_{M_0}^{-j'}}{\left[\frac{M-1}{M_0}\right]+1} \mathcal{T}_{k_d^{(j)},\ell_D^{(j)}}^d \sum_{i=0}^{\left[\frac{M-1}{M_0}\right]} \mathcal{T}_{qNM,q'N'M'}^d \cdot v[k;\chi^{(i)}], \quad (87)$$

$$\Psi^{AC}\left[\ell;\{\chi^{(i)}\}_{i=0}^{\left[\frac{M-1}{M_0}\right]}, j, j'\right] = \frac{1}{\sqrt{PP'}} \sum_{q,q'=0}^{P-1,P'-1} \frac{d'_q \cdot W_{M_0}^{-j'}}{\left[\frac{M-1}{M_0}\right]+1} \mathcal{T}_{\ell_D^{(j)},-k_d^{(j)}}^{f,d} \sum_{i=0}^{\left[\frac{M-1}{M_0}\right]} \mathcal{T}_{q'N'M',-qNM}^{f,d} \cdot V[\ell;\chi^{(i)}],$$

where
[MF694]

$$v[k;\chi^{(i)}], V[\ell;\chi^{(i)}]$$

denote TD- and FD-signatures (cf. (25)). defined by
[MF695]

$$v[k;\chi^{(i)}] = \frac{1}{\sqrt{N_1 N_1'}} \sum_{(m,m') \in I^{(i)}} X_m^{(i)} X_{m'}^{(i),\prime} \mathcal{T}_{mM,m'M'}^d g[k], \quad (88)$$

$$V[\ell;\chi^{(i)}] = \frac{1}{\sqrt{N_1 N_1'}} \sum_{(m,m') \in I^{(i)}} X_m^{(i)} X_{m'}^{(i),\prime} \mathcal{T}_{m'M',-mM}^{f,d} G[\ell],$$

where
[MF696]

$$I^{(i)}, 0 \leq i \leq \left[\frac{M-1}{M_0}\right]$$

denotes the i-th sub-set of the chip address set $\{(m,m')\}_{m=0,m'=0}^{N-1,N'-1}$ of S, associated with the i-th sub-TFP $S^{(i)}$ as shown in FIGS. 16 and 17 and
[MF697]

$$N_1 = \frac{N}{\sqrt{\left[\frac{M-1}{M_0}\right]+1}}, \quad N_1' = \frac{N'}{\sqrt{\left[\frac{M-1}{M_0}\right]+1}}.$$

The TD- and FD-CEs in (87) are designed to convey the encoded integers (j,j') of k to receivers through the MC. However, M-ary communication leads us to set the periods of the TD-PCs and FD-PCs to be nearly
[MF698]

$$\sqrt{\left[\frac{M-1}{M_0}\right]+1}$$

multiples of those for synchronization of communication or target detection to keep estimation precision (a situation that the switches (1-1,1-2,2-1,2-2) are on the downward and upward sides in FIGS. 12 and 13 corresponds to with/without the use of data communication).

Eq. (87) tells us that TD- and FD-signatures
[MF699]

$$v[k;\chi^{(i)}], V[\ell;\chi^{(i)}]$$

are firstly 2-D BPSK-modulated by 2-D PC $X^{(i)}$ and secondly the resultant phase modulated signatures are combined in non-overlapped form such as a
[MF700]

$$\left(\left[\frac{M-1}{M_0}\right]+1\right) - X^{(i)} \ \&\text{-signature-multiplexed}$$

signal and thirdly such a doubly-multiplexed signal is PSK-modulated by
[MF701]

$$\mathcal{M}_0\text{-ary}$$

symbol
[MF702]

$$W_{\mathcal{M}_0}^{-k}$$

and fourthly the PSK-modulated signal is transmitted through the j-th AC with shifts
[MF703]

$$(k_d^{(j)}, \ell_D^{(j)}),$$

and fifthly is PSK-modulated by
[MF704]

$$\mathcal{M}_0\text{-ary}$$

data symbol
[MF705]

$$d'_q \cdot W_{M_0}^{-j'}$$

The final signal is the TD-CE
[MF706]

$$\psi^{AC}\left[k;\{\chi^{(i)}\}_{i=0}^{\left[\frac{M-1}{M_0}\right]}, j, j'\right]$$

and its DFT, i.e., the FD-CE
[MF707]

$$\psi^{AC}\left[\ell;\{\chi^{(i)}\}_{i=0}^{\left[\frac{M-1}{M_0}\right]}, j, j'\right]$$

where
[MF708]

$$d'_q$$

with data-level address $\vec{q}=(q, q')$ has the value of 1.

At the receiver, an estimated k, denoted by k^
[MF709]

$$\hat{k}, 0 \leq \hat{k} \leq \mathcal{M}-1$$

is decomposed with a decoded pair of integers
[MF710]

$$\hat{j} = \left\lfloor \frac{\hat{k}}{M_0} \right\rfloor, 0 \le \hat{j} \le \left\lfloor \frac{M-1}{M_0} \right\rfloor, \hat{j}' = \left\{ \frac{\hat{k}}{M_0} \right\} 0 \le \hat{j}' \le M_0 - 1.$$

The receiver first makes the estimated TD- and FD-TFSOs of type 4
[MF711]

$$\mathcal{T}^d_{k_d^{(j)}, \ell_D^{(j)}} \text{ and } \mathcal{T}^{f,d}_{\ell_D^{(j)}, -k_d^{(j)}}$$

representing the $\hat{j}$-th-AC with shifts
[MF712]

$$(k_d^{(\hat{j})}, \ell_D^{(\hat{j})})$$

act on such TD- and FD-signatures, respectively and secondly PSK-demodulates those time-frequency shifted TD- and FD-signatures by
[MF713]

$$M_0\text{-ary } W_{M_0}^{\hat{j}'}$$

to cancel out the PSK-modulation phase (cf. FIG. 13).
The CCFs of type 3 and of type 4 exploiting AC shifts, with encoded integer pair (j,j') and its augmented pair for argmax operations
[MF714]

$$(\hat{j}, \hat{j}'),$$

are concretely given by respectively, in place of (38) and (43)
[MF715]

$$c^{AC,(3)}_{p',\tilde{p},\hat{j},\hat{j}'}(\ell_\mu; \hat{k}_d, j, j') = A e^{j\kappa} W^{k_d} \ell_c \sum_{k \in \mathbb{Z}} \mathcal{T}^d_{k_d,\ell_D} \psi^{AC}\left[k; \{X^{(i)}\}_{i=0}^{\lfloor \frac{M-1}{M_0} \rfloor}, j, j'\right] \times \qquad (89)$$

$$\left( W^{\hat{k}_d \ell_c} \mathcal{T}^d_{\hat{k}_d \ell_c} W^{-\hat{j}'}_{M_0} \mathcal{T}^d_{k_d^{(j)}, \ell_D^{(j)}} \mathcal{T}^d_{pNM, p'N'M'} \frac{X^{(j)'}_{p'}}{\sqrt{N_1}} \sum_{n \in I_P^{(j)}} \mathcal{T}^d_{n,M,p'M'} X^{(j)}_n g[k] \right)^*,$$

$$C^{AC,(4)}_{p',\tilde{p},\hat{j},\hat{j}'}(k_\sigma; \hat{\ell}_D, j, j') = A e^{j\kappa} W^{k_d} \ell_c \sum_{\ell \in \mathbb{Z}} \mathcal{T}^{f,d}_{\ell_{D'}-k_d} \Psi^{AC}\left[\ell; \{X^{(i)}\}_{i=0}^{\lfloor \frac{M-1}{M_0} \rfloor}, j, j'\right] \times \qquad (90)$$

$$\left( W^{k_\sigma \ell_c} \mathcal{T}^{f,d}_{\hat{\ell}_D - k_n} W^{-\hat{j}'}_{M_0} \mathcal{T}^{f,d}_{\ell_D^{(j)}-k_d^{(j)}} \mathcal{T}^{f,d}_{p'N'M', -pNM} \frac{X^{(j)}_\rho}{\sqrt{N_1'}} \sum_{n' \in I_P^{(j)}} \mathcal{T}^{f,d}_{n'M', -pM} X^{(j)}_{n'} G[\ell] \right)^*,$$

each of which is called a correlator of type-3 with AC shifts and a correlator of type-4 with AC shifts, respectively. In the transmitter-signal-part (cf. (87)) of the two CCFs above, (i.e., the input part of statistic g (13)) the TFSO of type 4 (or its frequency dual)
[MF716]

$$\mathcal{T}^d_{k_d^{(j)}, \ell_D^{(j)}} \text{ or } \mathcal{T}^{f,d}_{\ell_D^{(j)}, -k_d^{(j)}}$$

is inserted between the product of chip- and data-level shifting TFSO of type 4 (or its frequency dual) at the transmitter (cf. υ[k;X$^{(i)}$], V[$\ell$;X$^{(i)}$] in (88))
[MF717]

$$\mathcal{T}^d_{qNM,qN'M'} \cdot \mathcal{T}^d_{m,M,m'M'} \text{ or } \mathcal{T}^{f,d}_{qN'M', -qNM} \cdot \mathcal{T}^{f,d}_{m'M', -mM}$$

and TFSO of type 3, representing the MC with shifts
[MF718]

$$(k_d, \ell_D),$$

[MF719]

$$\mathcal{T}^d_{k_d, \ell_D}$$

While, in the receiver-signal-part of the two CCFs (89), (90) (i.e., the signal-to-be-detected part of statistic g(13)), for
[MF720]

$$M$$

-ary PSK modulation, there are
[MF721]

$$\left(\left\lfloor \frac{M-1}{M_0}\right\rfloor + 1\right)$$

different pairs of AC shifts
[MF722]

$$(k_d^{(j)}, \ell_D^{(j)})$$

Then the associated estimated TFSOs of type 3 representing those ACs
[MF723]

$$\mathcal{T}^d_{k_d^{(j)}, \ell_D^{(j)}}$$

(or their frequency dual ones
[MF724]

$$\mathcal{T}^{f,d}_{\ell_D^{(j)}, -k_d^{(j)}})$$

are defined. These TFSOs are inserted between the estimated TFSO of type 1
[MF725]

$$\mathcal{T}^d_{\hat{k}_d, \ell_D}$$

(or the estimated TFSO of type 2
[MF726]

$$\mathcal{T}_{\hat{\ell}_D, -\hat{k}_d}^{f,d})$$

for estimating the MC shifts
[MF727]

$$(k_d, \ell_D)$$

and the product of chip- and data-level shifting TFSOs of type 4 or its frequency dual at the receiver
[MF728]

$$\mathcal{T}^d_{pNM, p'N'M'} \cdot \mathcal{T}^d_{n,M,p'M'} \text{ or } \mathcal{T}^{f,d}_{p'N'M', -pNM} \cdot \mathcal{T}^{f,d}_{n'M', -pM}$$

The transmitter/receiver system shown in FIGS. 12 and 13 that is capable of being used also as an efficient and high-resolution radar, equipped with

[MF729]
$$\mathcal{M}$$

-ary PSK communication is a typical example of multiplexing communication systems utilizing non-commutative delay and Doppler shifts of the MC and AC parameter spaces of co-dimension 2, where the fundamental unit plane Θ' of the delay and Dopler parameter space of the MC is exclusively divided, denoted as $\Theta^{(i),'}$. So, it is obvious that the term "delay-Doppler space division multiplexing (dD-SDM)" [30], patent[6] is used to refer such a multiplexed system. In this system, in place of transmitting
[MF730]
$$\mathcal{M}$$

-ary data k, the transmitter sends a signal containing encoded integers
[MF731]

$$\hat{j} = \left[\frac{\hat{k}}{\mathcal{M}_0}\right], \check{j} = \left\{\frac{\hat{k}}{\mathcal{M}_0}\right\}.$$

The integer j is recovered by using the PD due to the delay shift
[MF732]
$$k_d^{(j)}$$

and Doppler shift
[MF733]
$$\ell_D^{(j)},$$

located at around the center of $\Theta^{(j^\wedge),'}$ (cf. FIGS. 14,15). To embed (j, j') into a signal, the transmitter firstly 2-D BPSK-modulates a chip waveform by different 2-D PCs $\chi^{(i)}$, secondly combines these modulated signals (signatures) in non-overlapped form by
[MF734]

$$\left(\left[\frac{M-1}{\mathcal{M}_0}\right]+1\right)-\chi^{(i)}$$

-multiplexing, thirdly inputs it to the
[MF735]
$$\hat{j}$$

-th AC, and fourthly
[MF736]
$$\mathcal{M}_0$$

-PSK demodulates the output signal of the AC by the symbol
[MF737]

$$\mathcal{M}_0\; ary\; \exp\left(\frac{-i2\pi\check{j}'}{\mathcal{M}_0}\right).$$

For
[MF738]

$$\left(\left[\frac{M-1}{\mathcal{M}_0}\right]+1\right)$$

different values of
[MF739]
$$\hat{j},$$

the transmitter requires
[MF740]

$$\left(\left[\frac{M-1}{\mathcal{M}_0}\right]+1\right)$$

parallel ACs and the set of those associated 2-D PCs
[MF741]

$$\{\chi^{(i)}\}_{i=0}^{\left[\frac{M-1}{\mathcal{M}_0}\right]}.$$

While, at the receiver to detect the template from a fourfold-multiplexed chip waveform, the receiver selects an estimated
[MF742]
$$\hat{j}$$

-th AC and constructs maximum-likelihood estimates of
[MF743]
$$(k_d, \ell_D).$$

High
[MF744]
$$\mathcal{M}$$

-ary PSK communication at the transmitter is realized by
[MF745]

$$\left(\left[\frac{M-1}{\mathcal{M}_0}\right]+1\right)$$

-multiplexed low
[MF746]
$$\mathcal{M}_0$$

-ary PSK modulations based on using non-commutative AC shifts and 2-D PCs.

Such a multiplexed system, called "delay-Doppler space division multiplexing (dD-SDM)" is a system by dividing the signal space $S=[0,T_s)\times[0,F_s)$ into several sub-TFPs and assigning a 2-D PC to each sub TFP for 2-D BPSK modulation. The use of 2-D PC results in adding a new axis perpendicular to the TFP as a third axis (see FIGS. 16 and 17). Namely, this third axis represents a shift-axis, being inherited the NCP from AC shifts of co-dimension 2. Therefore, the dD-SDM is radically different from the conventional division multiple access (DMA): TDMA, FDMA, CDMA, and Multi-carrier (MC)-CDMA. The spread spectrum (SS) code used in the latter two that makes DMA easy by the orthogonality of the code-modulated rectangular chip pulse. The PUL algorithm based on the von Neumann's APT that enables us to jointly estimate delay and Doppler with high precision, and is capable of being used also for an efficient and high resolution radar. Such an M-ary PSK modulation is a proposing and primitive technique in optical communication because the notion of the AC with non-commutative shifts is applicable to a "physical" optical fiber. Such a multiplexed system, called "delay-Doppler space division multiplexing (dD-SDM)" is a system using a non-commutative shift parameter space of co-dimension 2. This has a three-dimensionalized time-frequency space (TFS), layered by AC shifts (see FIGS. 16 and 17), in which the perpendicular co-ordinate axis to the symbol space, time-frequency plane (TFP) of $[0,T_s]\times[0,F_s]$, (which is identified with the unit plane of the target space), is a shift-axis with a scale of non-commutative AC shifts. Thus the dD-SDM is different from the conventional divisions of signal-TFP: TDMA and FDMA. The PUL algorithm based on APT that enables us to estimate parameters with high-speed and high-precision is a fundamental technique. Note that higher M-ary PSK modulation is a promising and primitive technique which is applicable to optical communication because the AC with non-commutative shifts may be replaced by several kinds of physical transmission lines.

The references[30] and patent[6] regarded a multiple targets problem with
[MF747]

$$\{(k_{d,i}, \ell_{D,i})\}_{i=1}^{N_{path}}$$

as an application of Code-Division Multiple Target (CDMT)s and gave an target-detection method using $N_{path}$ 2-D PCs and TFSOs with shifts
[MF748]

$$\{(k_{d,i}, \ell_{D,i})\}_{i=1}^{N_{path}},$$

together with the phase-cancellations by the product of two twiddle factors
[MF749]

$$W_{\mathcal{M}_0}^{\lambda,\rho} \times W_{\mathcal{M}}^{j}, \lambda_{\vec{p}} \in \{0, 1, \ldots, \mathcal{M}_0 - 1\},$$

$$j \in \left\{0, 1, \ldots, \left[\frac{\mathcal{M}}{\mathcal{M}_0}\right] - 1\right\},$$

$$W_{\mathcal{M}} = \exp\left(\frac{-i2\pi}{\mathcal{M}}\right).$$

However, this method forces us to resolve small phase quantity
[MF750]

$$\exp\left(\frac{-i2\pi}{\mathcal{M}}\right).$$

Thus when
[MF751]

$$\mathcal{M} \geq 16,$$

decoding errors arise due to phase noise and phase distortions. Furthermore, in the references above, without using both the TFSO of type 3
[MF752]

$$T_{k_d,\ell_D}^{d}$$

representing MC shifts
[MF753]

$$(k_d, \ell_D)$$

and its estimated TFSO of type 4
[MF754]

$$T_{\hat{k}_d,\hat{\ell}_D}^{d},$$

[MF755]

$$\mathcal{M}$$

-ary communication were done. Moreover, this approach was not suited to multiple targets problems of a doubly delay-Doppler shifted signal and has no estimation algorithm with guaranteed proof.

To solve this, in accordance with an embodiment of the present invention, the inventor defines two new CCFs exploiting the NCP of AC shifts
[MF756]

$$c_{\rho',\vec{p},\hat{j},\hat{j}'}^{AC,(3)}(\ell_u;\hat{k}_d,j,j'), C_{\rho,\vec{p},\hat{j},\hat{j}'}^{AC,(4)}(k_\sigma;\hat{\ell}_D,j,j')$$

respectively defined by (89), (90), in which several PDs are estimated and canceled out, precisely and rigorously. It is not easy to recover
[MF757]

$$d_{\vec{q}}' \cdot W_{\mathcal{M}_0}^{-\vec{j}'}$$

embedded in TD-CE in (87)
[MF758]

$$\psi^{AC}\left[k; \{\chi^{(i)}\}_{i=0}^{\left[\frac{M-1}{\mathcal{M}_0}\right]}, j, j'\right]$$

(or FD-CE
[MF759]

$$\Psi^{AC}\left[\ell; \{\chi^{(i)}\}_{i=0}^{\left[\frac{M-1}{\mathcal{M}_0}\right]}, j, j'\right])$$

by
[MF760]

$$\mathcal{M}_0\text{-ary PSK } W_{\mathcal{M}_0}^{\vec{j}}$$

The detail of cumbersome calculations of (89), (90) are omitted here. However, the two CCFs for high
[MF761]

$$\mathcal{M}$$

-ary PSK demodulation are required by using
[MF762]

$$\left(\left[\frac{\mathcal{M}-1}{\mathcal{M}_0}\right]+1\right)$$

2-D PCs
[MF763]

$$\{(X^{(j)}, X^{(j)'}\}_{j=0}^{\left[\frac{M-1}{\mathcal{M}_0}\right]}$$

and replacing
[MF764]

$$(k_d, \ell_D) \Rightarrow (k_d + k_d^{(j)}, \ell_D + \ell_D^{(j)}), d_{\vec{p}} \Rightarrow \mathbf{N} d_{\vec{p}} W_{\mathcal{M}_0}^{\vec{j}'}$$

at the transmitter and
[MF765]

$$(\hat{k}_d, \hat{\ell}_D) \Rightarrow (\hat{k}_d + k_d^{(j)}, \hat{\ell}_D + \ell_D^{(j)}), d_{\vec{q}}' \Rightarrow d_{\vec{q}}' W_{\mathcal{M}_0}^{\vec{j}'}, (N,N') \Rightarrow (N_1, N_1')$$

at the receiver. This replacement is accompanied by the occurrence of several new PDs. Hence one should replace 2 variables for MLE operation of 2 variables
[MF766]

$$\text{argmax}_{\rho',\vec{p}}$$

(or
[MF767]
$$\text{argmax}_{\rho,\vec{p}})$$
by the one of 4 variables
[MF768]
$$\text{argmax}_{\rho,\vec{p},\hat{j},\hat{j}'}$$
(or
[MF769]
$$\text{argmax}_{\rho,\vec{p},\hat{j},\hat{j}'}),$$
where
[MF770]
$$\rho' \in I_F^{(\hat{j})}$$
(or
[MF771]
$$\rho \in I_T^{(\hat{j})}).$$

One can obtain generalized versions of (39), (44):
[MF772]

$$c^{AC,(3)}_{\rho',\vec{p},\hat{j},\hat{j}'}(\ell_\mu; \hat{k}_d, j, j') = \qquad (91)$$

$$Ae^{i\kappa}W^{(k_d-\hat{k}_d)\ell_c}$$

$$\frac{W_{M_0}^{-(j'-\hat{j}')}}{\sqrt{PP'}} \sum_{\vec{q}} \frac{d_{\vec{q}}}{\left[\frac{M-1}{M_0}\right]} \sum_{i=1}^{\left[\frac{M-1}{M_0}\right]} \frac{X_{\rho'}^{(j)',*}}{N_1\sqrt{N_1'}}$$

$$\sum_{\substack{(m,m') \in I^{(i)}, \\ n \in I_T^G}} X_m^{(i)} X_{m'}^{(i),\prime} X_n^{(j),*} \times \theta_{gg}\left[(\hat{k}_d - k_d) + \left(\hat{k}_d^{(j)} - k_d^{(j)}\right) + \right.$$

$$(p-q)MN_1 + (n-m)M, (\ell_\mu - \ell_D) +$$

$$\left(\hat{\ell}_D^{(j)} - \ell_D^{(j)}\right) + (p'-q')M'N_1' + (\rho'-m')M'\right] \times$$

$$W^{\frac{1}{2}\left(k_d\ell_\mu - \hat{k}_d\ell_D - \tau_0[k_\sigma]\left(\ell_D^{(j)} + \ell_D^{(j)}\right) + \left(k_d^{(j)} + \hat{k}_d^{(j)}\right)\nu_0[\ell_\mu] - k_d^{(j)}\ell_D^{(j)} + \hat{k}_d^{(j)}\ell_D^{(j)}\right)}$$

$$\times$$

$$W^{\frac{1}{2}(2MN_1q\tilde{\nu}_0[\ell_\mu,j] - 2M'N'q'\tau_0[k_\sigma,j])} \times$$

$$W^{\frac{1}{2}((m\rho'-m'n)MM' - (m'+\rho')M'\tilde{\tau}_0[k_\sigma,j] + (m+n)M\tilde{\nu}_0[\ell_\mu,j])}.$$

$$c^{AC,(4)}_{\rho,\vec{p},\hat{j},\hat{j}'}(k_\sigma; \hat{\ell}_D, j, j') = \qquad (92)$$

$$Ae^{i\kappa}W_{M_0}^{\hat{j}}W^{-\tau_0[k_\sigma]\ell_c}$$

$$\frac{W_{M_0}^{-(j'-\hat{j}')}}{\sqrt{PP'}} \sum_{\vec{q}} \frac{d_{\vec{q}}}{\left[\frac{M-1}{M_0}\right]} \sum_{i=1}^{\left[\frac{M-1}{M_0}\right]} \frac{X_{\rho'}^{(j),*}}{N_1'\sqrt{N_1}}$$

$$\sum_{\substack{(m,m') \in I^{(i)}, \\ n' \in I_F^G}} X_m^{(i)} X_{m'}^{(i),\prime} X_n^{(j),*} \times \Theta_{GG}\left[(\hat{\ell}_D - \ell_D) + \left(\hat{\ell}_D^{(j)} - \ell_D^{(j)}\right) + \right.$$

$$(p'-q')M'N_1' + (n'-m')M', -(k_\sigma - k_d) -$$

$$\left(\hat{k}_d^{(j)} - k_d^{(j)}\right) - (p-q)MN_1 - (\rho-m)M\right] \times$$

$$W^{\frac{1}{2}\left(k_d\hat{\ell}_D - k_\sigma\ell_D - \tau_0[k_\sigma]\left(\ell_D^{(j)} + \hat{\ell}_D^{(j)}\right) + \nu_0[\ell_D]\left(k_d^{(j)} + \hat{k}_d^{(j)}\right) - k_d^{(j)}\hat{\ell}_D^{(j)} + \hat{k}_d^{(j)}\ell_D^{(j)}\right)}$$

$$\times W^{\frac{1}{2}(2MN_1q\tilde{\nu}_0[\ell_\mu,j] - 2M'N_1'q'\tilde{\tau}_0[k_\sigma,j])} \times$$

$$W^{\frac{1}{2}((mn'-m'\rho)MM' - (m'+n')M'\tilde{\tau}_0[k_\sigma,j] + (m+\rho)M\tilde{\nu}_0[\ell_\mu,j])}.$$

where
[MF773]
$$\tilde{\tau}_0[k_\sigma,\hat{j}] = k_\sigma - k_d + k_d^{(\hat{j})} - k_d^{(j)}, \tilde{\nu}_0[\ell_\mu,\hat{j}] = \ell_\mu - \ell_D + \ell_D^{(\hat{j})} - \ell_D^{(j)},$$

[MF774]
$$I_T^{(\hat{j})}, I_F^{(\hat{j})}$$

denote the sets of chip TD- and FD-addresses n,n', associated with the ĵ-th sub-TFP
[MF775]
$$S^{(\hat{j})},$$

and the product of the address sets
[MF776]
$$I^{(\hat{j})} = I_T^{(\hat{j})} \times I_F^{(\hat{j})}.$$

The ambiguity function (AF)s: $\theta_{gg}[\tau,\upsilon]$ and $\Theta_{GG}[\tau,\upsilon]$ respectively in (91) and (92) with Gaussian functions g,G are separable and decay exponentially in terms of $\tau,\upsilon$. This well-known property and the disjoint chip address sets
[MF777]
$$I^{(\hat{j})}, I_T^{(\hat{j})}, I_F^{(\hat{j})}$$

and the fact that
[MF778]
$$(k_d^{(j)}, \ell_D^{(j)})$$

is at around the center of $\Theta^{(j)}$ tell us that among the first and second arguments of the AF all of the terms relating to $(p-q)MN_1$; $(p'-q')M'N_1'$ with $p' \neq q'$, $p \neq q$ and
[MF779]
$$(m,m') \in I^{(i)}, n, \rho \in I_T^{(\hat{j})}, n', \rho' \in I_F^{(\hat{j})}$$

with i≠ĵ can be neglected. Thus, the terms with p'=q', p=q and
[MF780]
$$i=\hat{j}$$

remain and thus only the term equal to
[MF781]
$$\vec{p}$$

is selected from the summation
[MF782]
$$\sum_{\vec{q}}$$

and
[MF783]
$$\hat{j}=j$$

is identified via the functions $\tilde{\tau}_0[k_\sigma,\hat{j}], \tilde{\nu}_0[\ell_\mu,\hat{j}]^{[<]BEGINI-TALm']}$ with $k_\sigma \approx k_d$, $\ell_\mu \approx \ell_D$.

This is the reason why the transmitter divides exclusively $\Theta$, 2-D BPSK modulates a chip waveform by 2-D PCs $\chi^{(i)}$, and combines these modulated signatures in non-overlapped form to realize
[MF784]

$$\left(\left[\frac{M-1}{M_0}\right]+1\right)$$

-multiplexing based on
[MF785]

$$\left(\left[\frac{M-1}{M_0}\right]+1\right)$$

parallel ACs that are intended to introduce non-commutative shifts. While
[MF786]

$$\hat{j}'=j'$$

is identified by the PD cancellation term
[MF788]

$$W_{M_0}^{-(j'-\hat{j}')}.$$

The two CCFs above use independent 2-D PCs
[MF789]

$$\{\chi^{(i)}\}_{i=0}^{\left[\frac{M-1}{M_0}\right]}$$

and PDs due to non-commutative AC shifts
[MF790]

$$(k_D^{(j)}, \ell_D^{(j)})$$

as functions of an estimated integer
[MF791]

$$\hat{j} = \left[\frac{\hat{k}}{M_0}\right]$$

for an encoded integer
[MF792]

$$j = \left[\frac{k}{M_0}\right]$$

of an integer k.
The TD- and FD-CCFs provide us with a decoding method using PUL-based MLEs. This method can guarantee the phase resolution at least
[MF793]

$$W_{M_0} = \exp\left(-\frac{i2\pi}{M_0}\right)$$

and hence is resistant to phase noise.
It is natural to precisely estimate delay and Doppler for radar and establish synchronization of communication systems before encoding and decoding
[MF794]

$$\ell$$

-ary PSK data. Since one should confront a realistic situation that a transmitted signal through the MC with shifts
[MF795]

$$(k_d, \mathcal{M}_D)$$

is processed at the receiver, we need two CCFs with AC shifts in (91) and in (92). Such receivers when the switches are on upward in FIGS. 12,13 work as a synchronizer (i.e., acquisition and tracking) when the switches are on the downward side, combine a synchronizer and a decoder for
[MF796]

$$\mathcal{M}$$

-ary PSK communication, and work as a radar equipped with data transmission. This system is an amplitude-shift-keying (ASK)-free
[MF797]

$$\mathcal{M}$$

-ary PSK communication and provides a secret wireless communication system whose secret keys are 2-D PCs
[MF798]

$$\{\chi^{(i)} = (X^{(i)}, X^{(i),\prime})\}_{i=0}^{\left[\frac{M-1}{M_0}\right]}.$$

The main reason that receivers employ ASK-free modulation is twofold: (1) adaptive and dynamic estimation of the attenuation factor $Ae^{i\kappa}$; (2) a simplification of a decoder. Estimating and Canceling out PDs enable us to realize high
[MF799]

$$\mathcal{M}$$

-ary PSK communication as an efficient use of radio resources. Note that the use of
[MF800]

$$\left(\left[\frac{M-1}{M_0}\right]+1\right)$$

2-DPCs implies
[MF801]

$$\left(\left[\frac{M-1}{M_0}\right]+1\right)$$

-user multiplexed communication.
<8.3 Signal Processing Exploiting Multi-Dimensional Non-Commutative Spatial-Spatial Frequency Shifts>
Daughman [33, 34] gave a 2-D version of Gabor elementary functions
[MF802]

$$g_{m,n}(t) \triangleq g(t-mT_c)e^{i2\pi n F'_c(t-mT_c)}, t \in \mathbb{R}$$

and pointed out that 2-D Gabor representation(to be defined below) is useful for image analysis and segmentation. Before discussing Daughman study, one should consult the Heisenberg group theory reviewed by Howe [5].
For
[MF803]

$$t, \tau, \nu \in \mathbb{R}^n$$

define two shift operators
[MF804]

$$T_\tau f(t) \triangleq f(t-\tau), M_\nu f(t) \triangleq e^{i2\pi \nu \cdot t} f(t). \quad (93)$$

where $\nu \cdot t$ denotes the inner product. For
[MF805]

$$z \in \mathbb{T}$$

introduce the scalar operator
[MF806]

$$S_z x(t) \triangleq zx(t).$$

Then the set
[MF807]

$$\{M_\nu T_\tau S_z : \nu, \tau \in \mathbb{R}^n, z \in \mathbb{T}\}$$

is a group of unitary operators on
[MF808]

$$L^2(\mathbb{R}).$$

Consider the set
[MF809]

$$H = \mathbb{R}^n \times \mathbb{R}^n \times \mathbb{T},$$

called the (reduced) Heisenberg group of degree n and define on it a law of combination
[MF810]

$$(\nu_1, \tau_1, z_1)(\nu_2, \tau_2, z_2) = (\nu_1 + \nu_2, \tau_1 + \tau_2, e^{-2\pi i \nu_2 \cdot \tau_1} z_1 z_2). \quad (94)$$

Define a map ρ, i.e., a faithful unitary representation of H and an automorphism r of H by the rule
[MF811]

$$\begin{aligned}\rho:(\nu, \tau, z) &\to M_\nu T_\tau S_z, \\ r(\nu, \tau, z) &\to (-\tau, \nu, e^{2\pi i \tau \cdot \nu} z).\end{aligned} \quad (95)$$

Then it is immediate to verify that the FT, denoted as ˆ intertwines the two representations of H
[MF812]

$$\rho \text{ and } \rho \circ r$$

with each other. That is, [5]
[MF813]

$$\hat{\rho}(h) = \rho(r(h))\hat{}. \quad (96)$$

Daughman[35] pointed out that the model of the 2-D receptive field profiles encountered experimentally in cortical simple cells, which captures their salient tuning properties of spatial localization, orientation selectivity, spatial frequency selectivity, and quadrature phase relationship, is the parameterized family of "2-D Gabor filters". In terms of a space-domain (SD) impulse response function (or a complex Gabor function) g(x) with SD variables
[MF814]

$$x = (x, y)$$

and its associated 2-D FT, i.e., spatial frequency-domain (SFD) function
[MF815]

$$\hat{g}(u) = \mathcal{F}^2[g(x)]$$

with SFD variables
[MF816]

$$u = (u, v),$$

the general functional form of 2-D Gabor filter family is specified in [35, 36]
[MF817]

$$\begin{aligned} g(x) &= K e^{-\pi[a^2(x-x_0)_r^2 + b^2(y-y_0)_r^2]} \cdot e^{i(2\pi(u_0 x + v_0 y) + P)}, \\ \hat{g}(u) &= \frac{K}{ab} e^{-\pi[(u-u_0)_r^2 a^{-2} + (v-v_0)_r^2 b^{-2}]} \cdot e^{i(-2\pi(x_0(u-u_0) + y_0(v-v_0)) + P)} \end{aligned} \quad (97)$$

where P denotes the phase of the sinusoid such that the dc component is zero, and
[MF818]

$$(x-x_0)_r, (y-y_0)_r$$

stand for a clockwise rotation of the operation by θ such that
[MF819]

$$\begin{aligned}(x - x_0)_r &= (x - x_0) \cos \theta + (y - y_0) \sin \theta, \\ (y - y_0)_r &= -(x - x_0) \sin \theta + (y - y_0) \cos \theta.\end{aligned} \quad (98)$$

The SD function g(x), SFD function
[MF820]

$$\hat{g}(u)$$

are perfectly symmetrical and have their shifts
[MF821]

$$x_0 = (x_0, y_0), u_0 = (u_0, v_0)$$

at which 2-D Gaussian envelope has the peak value. An important property of the family of 2-D Gabor filters is their achievement of the theoretical lower bound of joint uncertainty in the two conjoint domains of x and u. Defining uncertainty in each of the four variables by the normalized second moments
[MF822]

$$\sqrt{\sigma_x^2}, \sqrt{\sigma_y^2}, \sqrt{\sigma_u^2}, \sqrt{\sigma_v^2}$$

about the principle axes, a fundamental uncertainty principle exists[35, 36]:
[MF823]

$$\sqrt{\sigma_x^2}\sqrt{\sigma_u^2} \geq 1/4\pi, \sqrt{\sigma_y^2}\sqrt{\sigma_v^2} \geq 1/4\pi \quad (99)$$

and the lower bound of the inequality is achieved by the family of 2-D Gabor filters (97). where
[MF824]

$$u_0 = (u_0, v_0), \vec{\alpha} = (\alpha, \beta)$$

are modulation, scaling parameters of Gaussian.

He proposed a simple neural network (NN) architecture for finding optimal coefficient values in arbitrary 2-D signal transforms which in general might be neither complete nor orthogonal as follows.

Consider some discrete 2-D signal I[x], say, an image supported on [256×256] pixels in x, which one wants to analyze or compress by representing it as a set of expansion coefficients {$a_i$} on some set of 2-D elementary functions
[MF825]

$$\{g[x; \vec{\theta}_i]\}, \vec{\theta}_i = (x_{0i}, u_{0i}, \vec{\alpha}_i), x_{0i} = (x_{0i}, y_{0i}), u_{0i} = (u_{0i}, v_{0i}),$$
$$\alpha_i = (\vec{\alpha}_i, \beta_i).$$

The attempt to represent I[x] either exactly or in some optimal sense by projecting it onto a chosen set of vectors {$g[x; \vec{\theta}_i]$} is reduced to finding projection coefficients {$a_i$} such that the resultant vector H[x]
[MF826]

$$H[x] = \sum_{i=1}^{n} a_i g[x; \vec{\theta}_i] \quad (100)$$

minimizes the squared norm of the difference-vector E=∥I[x]−H[x]∥². If a given image I[x] is regarded as a vector in an n-D vector space (e.g. n=65 536), then the optimal coefficients
[MF827]

$$\{a_i\}_{i=1}^n$$

is determined by a system of n simultaneous equations in n unknowns; but it is impractical to solve this huge system. So he proposed NN architectures with connection strength
[MF828]

$$\{g[x;\vec{\theta}_i]\}$$

and input image I[x]. 2-D Gabor representations for image analysis and compression, edge detections, feature detectors etc. have been proposed. [37, 38, 39]
In this disclosure, the inventor points out that the 2-D Gabor expansion (100) can be regarded as a conjoint 2-D spatial/spatial frequency (S/SF) representation using non-commutative shifts $(x_{0i}, u_{0i})$ in terms of 2-D Gabor functions
[MF829]

$$\{g[x;\vec{\theta}_i]\}$$

with shifts $(x_{0i}, u_{0i})$: According to an important precedent for 1-D signal processings exploiting the non-commutativity of time-frequency shifts, presented in the previous sections in this disclosure, it is natural to consider SD representation (100) and its associated SFD representation, symmetrically. To do it, let 2-D FT of I[x] and H[x]
[MF830]

$$\hat{I}[u] = \mathcal{F}^{(2)}[I[x]],\ \hat{H}[u] = \mathcal{F}^{(2)}[H[x]].$$

Then the conjoint spatial/spatial frequency representation, in place of (100), is defined as
[MF831]

$$H[x] = \sum_{i=1}^{n} a_i g[x;\vec{\theta}_i],\ \hat{H}[u] = \sum_{i=1}^{n} a'_i \hat{g}[u;\vec{\theta}_i]. \tag{101}$$

and let ε,ε' be two subspaces of the Hilbert space. Suppose that
[MF832]

$$I[x] \in \varepsilon, \hat{I}[u] \in \varepsilon'.$$

The squared norms of errors
[MF833]

$$\|I[x]-H[x]\|^2,\ \|\hat{I}[u]-\hat{H}[u]\|^2$$

are minimized by the use of two orthogonal projection operator (PO)s projecting onto $\varepsilon_i$, $\varepsilon'_i$ (defined below), respectively
[MF834]

$$\{P_{g(x;\vec{\theta}_i)}, P_{\hat{g}(u;\vec{\theta}_i)}\}_{i=1}^n.$$

The projection theorem [27] tells us that
[MF835]

$$I[x], \hat{I}[u]$$

possess their unique decomposition
[MF836]

where $g^{\perp}(x;\vec{\theta}_i)$, $g^{[<]\text{BEGINITAL}m\perp}(u;\vec{\theta}_i)$ are orthogonal complements of $g(x;\vec{\theta}_i)$, $\hat{g}(u;\vec{\theta}_i)$, respectively. Therefore it is important to choose a set of templates
[MF837]

$$\{g(x;\vec{\theta}_i), \hat{g}(u;\vec{\theta}_i)\}_{i=1}^n,$$

For example, let $\varepsilon_i$ be the set of all $f \in \ell_2(Z)$ that are $(L_1\Delta x \times L_2\Delta y)$ space-limited (SL) signals and let $\varepsilon'_i$ be that of $(L_1\Delta u \times L_2\Delta v)$ spatial frequency-limited (SFL) signals. Suppose that
[MF838]

$$g(x;\vec{\theta}_i) \in \varepsilon_i \text{ and } \hat{g}(u;\vec{\theta}_i) \in \varepsilon'_i.$$

Then,
[MF839]

$$P_{g(x;\vec{\theta}_i)}, P_{\hat{g}(u;\vec{\theta}_i)}$$

are POs projecting onto $\varepsilon_i, \varepsilon'_i$; respectively. Apply the von Neumann's APT to the two POs and we use 2 2×2-D localization operators (LOs) defined by
[MF840]

$$P_{g(x;\vec{\theta}_i)} \mathcal{F}^{-1,(2),d} P_{\hat{g}(u;\vec{\theta}_i)} \mathcal{F}^{(2),d} P_{\hat{g}(u;\vec{\theta}_i)} \mathcal{F}^{(2),d} P_{g(x;\vec{\theta}_i)} \mathcal{F}^{-1,(2),d} \tag{103}$$

then one can get optimized expansion coefficients given as
[MF841]

$$a_i = P_{g(x;\vec{\theta}_i)} I(x), a'_i = P_{\hat{g}(u;\vec{\theta}_i)} \hat{I}(u), a_i = a'_i,\ 1 \le i \le n. \tag{104}$$

Such 2-D LOs select a limited 4-D cube
[MF842]

$$[L_1\Delta x \times L_2\Delta y] \times [L'_1\Delta u \times L'_2\Delta v] \subset \mathbb{R}^4$$

around the peak address $(x_{0i}, u_{0i})$ in the 4-D spatial/spatial frequency plane and filter out the rest. where
[MF843]

$$g^{\perp}(x;\vec{\theta}_i) \in \varepsilon_i^{\perp} \text{ and } \hat{g}^{\perp}(u;\vec{\theta}_i) \in \varepsilon_i^{\perp,\prime}.$$

[MF844]

$$\varepsilon_i^{\perp}, \varepsilon_i^{\perp,\prime}$$

are orthogonal complements of
[MF845]

$$\varepsilon_i, \varepsilon'_i.$$

Contrary to Howe's shift operators (93), for the SD- and SFD-signals
[MF846]

$$z(x), \hat{z}(u)$$

the inventor introduces "half-shifts" for the symmetrical property
[MF847]

$$e^{-\pi u_0 \cdot x_0}, e^{j\pi x_0 \cdot u_0}, x_0 = (x_0, y_0),\ u_0 = (u_0, v_0) \in \mathbb{R}^2$$

$$\left. \begin{array}{l} I(x) = \sum_{i=1}^{n} P_{g(x;\vec{\theta}_i)} I(x) g(x;\vec{\theta}_i) + g^{\perp}(x;\vec{\theta}_i),\ P_{g(x;\vec{\theta}_i)} I(x) = \dfrac{\Sigma_x g^*(x;\vec{\theta}_i) \cdot I(x)}{\Sigma_x \|g(x;\vec{\theta}_i)\|^2}, \\[2ex] \hat{I}(u) = \sum_{i=1}^{n} P_{\hat{g}(u;\vec{\theta}_i)} \hat{I}(u) \hat{g}(u;\vec{\theta}_i) + \hat{g}^{\perp}(u;\vec{\theta}_i),\ P_{\hat{g}(u;\vec{\theta}_i)} \hat{I}(u) = \dfrac{\Sigma_u \hat{g}^*(u;\vec{\theta}_i) \cdot \hat{I}(u)}{\Sigma_u \|\hat{g}(u;\vec{\theta}_i)\|^2}, \end{array} \right\} \tag{102}$$

and uses 2×2-D von Neumann's symmetrical spatial-spatial frequency shift operator (SSFSO)s with those half-shifts, defined by
[MF848]

$$\mathcal{T}^{(2)}_{x_0,u_0} z(x) = z(x - x_0) \cdot e^{i2\pi u_0 \cdot (x - \frac{x_0}{2})}, \quad (105)$$

$$\mathcal{T}^{(2),f}_{u_0,-x_0} \hat{z}(u) = \hat{z}(u - u_0) \cdot e^{-i2\pi x_0 \cdot (u - \frac{u_0}{2})}$$

for the 2-D Gabor function with peak-address $x_0 = (x_0, y_0)$, $u_0 = (u_0, v_0) \in R^2$ in 2×2-D SD-SFD space
[MF849]

$$g(x; \vec{\theta}_i)$$

and its FT
[MF850]

$$\hat{g}(u; \vec{\theta}_i) = \mathcal{F}^{(2)}[g(x; \vec{\theta}_i)].$$

Thus, the inventor can rewrite the Gabor functions as
[MF851]

$$\left. \begin{array}{l} g(x; \vec{\theta}_i) = \mathcal{T}^{(2)}_{x_{0i}, u_{0i}} \left[ e^{-\pi(x^2 \alpha_i^2 + y^2 \beta_i^2)} \cdot e^{2i\pi x \cdot u} \right] \cdot e^{-\pi i u_{0i} \cdot x_{0i}}, \\ \hat{g}(u; \vec{\theta}_i) = \mathcal{T}^{(2),f}_{u_{0i}, -x_{0i}} \left[ e^{-\pi(v^2 \alpha_i^{-2} + v^2 \beta_i^{-2})} \cdot e^{-2i\pi x \cdot u} \right] \cdot e^{\pi i x_{0i} \cdot u_{0i}}. \end{array} \right\} \quad (106)$$

Consider the DFT of the above signals. Let $(\Delta x, \Delta y)$ be the sampling intervals of 2-D space variables
[MF852]

$$x = (x, y)$$

with Cartesian lattice dimensions $(L_1, L_2)$. Let
[MF853]

$$z[\vec{k}]$$

be a discrete SD function whose discrete space variable is
[MF854]

$$\vec{k} = (k_1, k_2) \in \mathbb{Z}^2, k_1 = \left\lfloor \frac{x}{\Delta x} \right\rfloor, k_2 = \left\lfloor \frac{y}{\Delta y} \right\rfloor.$$

Then the sampling interval of 2-D spatial frequencies
[MF855]

$$u = (u, v)$$

appropriate to the $L_1$, $L_2$ spatial lattice are given by
[MF856]

$$\Delta u = 1/(L_1 \Delta x), \Delta v = 1/(L_2 \Delta y)$$

and its discrete spatial frequency variable is given by
[MF857]

$$\vec{\ell} = (\ell_1, \ell_2) \in \mathbb{Z}^2, \ell_1 = \left\lfloor \frac{u}{\Delta u} \right\rfloor, \ell_2 = \left\lfloor \frac{v}{\Delta v} \right\rfloor.$$

Using 2 twiddle factors
[MF858]

$$W_1 = e^{-i\frac{2\pi}{M}}, W_2 = e^{-i\frac{N}{\sqrt{2\pi}}}$$

and 2-D DFT
[MF859]

$$\mathcal{F}^{(2),d}[\cdot], \text{ and 2-}D \text{ IDFT } \mathcal{F}^{-1,(2),d}[\cdot],$$

one can obtain the relationships between an SFD function
[MF860]

$$Z[\vec{\ell}]$$

and an SD function
[MF861]

$$z[\vec{k}]$$

[MF862]

$$\left. \begin{array}{l} Z[\vec{\ell}] = \mathcal{F}^{-1,(2),d}[z[\vec{k}]] \stackrel{def}{=} \frac{1}{\sqrt{L_1 L_2}} \sum_{k_1, k_2=0}^{L_1-1, L_2-1} z[\vec{k}] W_1^{k_1 \ell_1} W_2^{k_2 \ell_2}, 0 \leq \ell_i \leq L_i, i = 1, 2, \\ z[\vec{k}] = \mathcal{F}^{(2),d}[Z[\vec{\ell}]] \stackrel{def}{=} \frac{1}{\sqrt{L_1 L_2}} \sum_{\ell_1, \ell_2=0}^{L_1-1, L_2-1} Z[\vec{\ell}] W_1^{-k_1 \ell_1} W_2^{-k_2 \ell_2}, 0 \leq k_i \leq L_i, i = 1, 2. \end{array} \right\} \quad (107)$$

Thus the SD function
[MF863]

$$z[\vec{k}]$$

(or the SFD function
[MF864]

$$Z[\vec{\ell}])$$

has support
[MF865]

$$L_1 \Delta x \times L_2 \Delta y$$

(or
[MF866]

$$L_1 \Delta u \times L_2 \Delta v).$$

If the spacing of the peak-address $x_{0i}$ (or $u_{0i}$) on the SD space (or SFD space) is
[MF867]

$$(M_x \Delta x, M_y \Delta y) \text{ or } (M_u \Delta u, M_v \Delta v)$$

and the normalization condition
[MF868]

$$M_x \Delta x \times M_u \Delta u = M_y \Delta y \times M_v \Delta v = 1$$

is imposed, then
[MF869]

$$L_1 = M_x M_u, L_2 = M_y M_v.$$

If discrete space/spatial frequency shifts of
[MF870]

$$g(x; \vec{\theta}_i), \hat{g}(u; \vec{\theta}_i)$$

are given as
[MF871]

$$a_i = (a_{i1}, a_{i2}), b_i = (b_{i1}, b_{i2}) \in \mathbb{Z}^2,$$

$$a_{i1} = \left\lfloor \frac{x_{0i}}{\Delta x} \right\rfloor, a_{i2} = \left\lfloor \frac{y_{0i}}{\Delta y} \right\rfloor, b_{i1} = \left\lfloor \frac{u_{0i}}{\Delta u} \right\rfloor, b_{i2} = \left\lfloor \frac{v_{0i}}{\Delta v} \right\rfloor.$$

then 2×2-D von Neumann's discrete SSFSOs become
[MF872]

$$\mathcal{T}_{a_i,b_i}^{(2),d} z[\vec{k}] = z[\vec{k} - \vec{a}] W_1^{-b_1\left(k_1 - \frac{a_1}{2}\right)} W_2^{-b_2\left(k_2 - \frac{a_2}{2}\right)}, \quad (108)$$

$$\mathcal{T}_{b_i,-a_i}^{(2),f,d} Z[\vec{\ell}] = Z[\vec{\ell} - \vec{b}] W_1^{a_1\left(\ell_1 - \frac{b_1}{2}\right)} W_2^{a_2\left(\ell_2 - \frac{b_2}{2}\right)}.$$

These 2×2-D symmetrical SSFSOs contain 2-D half shifts
[MF873]

$$W_1^{\frac{b_1 a_1}{2}} \cdot W_2^{\frac{b_2 a_2}{2}}, W_1^{-\frac{b_1 a_1}{2}} \cdot W_2^{-\frac{b_2 a_2}{2}}$$

respectively, as phase terms of SD and SFD signals
[MF874]

$$z[\vec{k}], Z[\vec{\ell}].$$

Thus the SFSOs (108) may be useful for image analysis, feature extraction, and data compression because
[MF875]

$$(a_i, b_i) \text{ i.e., } (x_{0i}, u_{0i})$$

are efficiently extracted through the inner product of the projection coefficients in (102). Note that image analysis which involves a temporal change is considered to be a subject of a signal processing exploiting three-dimensional NCP.

<9 Distinguishing Characteristics of the Invention, and of the Manner and Process of Making and Using It>

Embodiments, mathematical formulae and figures, described in a written description of the invention, and of the manner and process of making and using it are merely just ones of examples of the process and/or method of the invention. The inventor can honestly say that some of embodiments are realized examples of communication systems exploiting the NCP of TFSs, that Gabor prospected deliberately in the 1952 paper.[2]

The non-overlapping superposition of signals on the TFP necessarily entails PDs due to the NCP of TFSs. Most of researchers in the field of communication, however, has little or no understanding of TFSs with the NCP. Under such a situation, communication systems exploiting the NCP of TFSs are expected to provide a new class of digital multiplexed communication systems.

Communication systems exploiting the NCP of TFSs, given in this disclosure, can be restated from the following five different points of view.

(Viewpoint 1)
The symmetrical time and frequency shift operator (TFSO), defined and introduced in the references (patent[1] and [26, 27, 30]) has the properties: (i) its "half shifts", i.e., TD- and FD-PDs that are embedded into TD- and FD-signatures makes clear shift's important role in parameter estimation; (ii) the PD due to modulation and demodulation by the carrier $1_c$, accompanied by the delay $k_d$
[MF876]

$$W^{j k_d \ell_c}$$

always arises; (iii) the fact that any PDs being embedded into a signal can be compactly expressed in terms of powers of the twiddle factor
[MF877]

$$W = e^{-i\frac{2\pi}{L}},$$

makes estimations of several PDs and canceling out the PDs easy.

(Viewpoint 2)
The TD- and FD-PC modulation, i.e., 2-D binary phase-shift-keying (BPSK)) is a well-known modulation technique. However if one can regard it as an example that TFSOs are available, then one can see that TD- and FD-templates are embedded in a wide-band signal modulated by 2D-PCs.

(Viewpoint 3)
The non-overlapped superposition of signals on the TFP is a conventional method as an efficient use of radio resources. However, this superposition needs the use of TFSO that causes a data-level PD. Fortunately, such a PD plays an important role in parameter estimation.

(Viewpoint 4)
Contrary to conventional use of maximum likelihood (ML) TD-functionals only, the ML TD- and FD-functionals define arrays of TD- and FD-CCFs, respectively for detecting TD- and FD-templates. TD- and FD-CCFs define orthogonal projection operator (PO)s $P_3$, $P_4$ (or $P_1$, $P_2$), respectively projecting onto time-limited (TL) and band-limited (BL) spaces as subspaces of the Hilbert space. These POs provide a frame on which a deeper understanding of the APT can be built.

(Viewpoint 5)
Contrary to popular belief that a non-Nyquist Gaussian is useless,
The Alternative POs Representing a Conjunction of the Two POs
[MF878]

$$P_3 \mathcal{F}^{-1,d} P_4 \mathcal{F}^d$$

(or
[MF879]

$$P_4 \mathcal{F}^d P_3 \mathcal{F}^{-1,d})$$

becomes a localization operator in cooperation with the use of Gaussian having properties: self-dual of the FT, separable and exponentially decaying Gaussian's AF in terms of delay and Doppler. This leads the fact that arrays of TD- and FD-CCFs yield excellent receivers.

The inventor makes all of the above viewpoints clear after publications in the patents and non-patent references. This disclosure features its own novelty. All features of novelty are prescribed as follows (Point 1 of Novelty)
Multiplexed communication systems exploiting the NCP of the TFSs on the TFP are provided. Also algorithms for evaluating PDs due to the TFSs and for canceling out their PDs are given based on symmetrical TFSOs in (4), (24).

Furthermore, such an operation pair of embedding- and canceling-out-PDs is shown to be of crucial importance.

(Point 2 of Novelty)
Doppler- and delay-estimate likelihood TD- and FD-functionals, respectively enable us to get ML estimators of parameters and realize canceling-out-PDs by their associated MLE correlators.

(Point 3 of Novelty)
It is shown that the classical BPSK modulation is causing PDs due to the NCP of its TFSs, but fortunately these PDs provide a clue about parameter estimation and signal reconstruction.

(Point 4 of Novelty)
Both the non-overlapped superposition of signals on the TFP and modulation (or demodulation) for a baseband (or passband) signal, accompanied by a delay, as a conventional technique in communication, induce PDs due to the NCP of their TFSs. Fortunately, embedding-and-canceling-out-PD techniques play an important role in detecting a data-level signal.

(Point 5 of Novelty)
All of the above PDs are canceled out by TD- and FD-CCFs. These CCFs induce TD- and FD-POs projecting onto the TL- and BL-signal spaces, respectively as subspaces of the Hilbert space. Applying the von Neumann's alternative projection theorem (APT) to the two subspaces defines the combined operator of the two POs, called a localization operator (LO) on the TFP.

(Point 6 of Novelty)
Youla's signal restoration method using the APT enables us to prove that the LO guarantees the convergence of the alternative parameter-updating algorithm, called PUL. This implies that the LO, as a function of data- and chip-level addresses, becomes a new kind of filters in place of a conventional sharp filter in the DSP and works well for a radar with no limitation on the maxima of delay and Doppler.

(Point 7 of Novelty)
A 2-D signal, i.e., image is usually described by conjoint spatial (S)/spectral frequency (SF) representations, 2-D Gabor representations in particular. However, many researchers using conventional techniques are unaware that 2-D S and SF shift (SSFS)s, implicitly involved in 2-D Gabor functions induce unexpectedly PDs due to their NCP like 1-D TFSs. The inventor treats an S domain (SD) signal and an SF domain (SFD) signals symmetrically and introduces conjoint S/SF representations of dimension 2×2 in terms of 2-D Gabor functions and their 2-D FTs, defined as (101), in place of the problem of representing image in terms of 2-D Gabor functions (100).

Such a new symmetrical conjoint problem of representing image (101) can be solved by the SD and SFD decomposition (102) using orthogonal projection operator (PO)s projecting onto SD- and SFD-limited spaces as subspaces of the Hilbert space, respectively defined as

[MF880]

$$P_{g(x;\vec{\theta}_j)}, P_{\tilde{g}(u;\vec{\theta}_j)}.$$

2-D Gabor functions are defined using symmetrical space and spatial frequency shift operator (SSFSO)s (105) (or (108)). Furthermore, the combined 2×2-D localization operator (LO)s (103) of the two POs that the von Neumann's APT can be applied provide the basics of 2-D signal processing theory exploiting the NCP of SSFSs for purposes such as image analysis, feature extraction, and data compression.

Example 1 of Embodiments of
Transmitter-Receiver System

An example as an embodiment of transmitter-receiver systems based on the above-described theoretical aspects is given together with cited figures.

According to an embodiment of the present invention, FIG. 18 shows a block-diagram representing the transmitter-receiver system with the number 1 attached to its surrounding dotted line. The communication system with the number 1 comprises the transmitter apparatus 100 and the receiver apparatus 200. This transmitter-receiver system with the number 1 is used for both a radar and a communication system (e.g., transmitter-receiver system to convey voice data and or image data).

(The Transmitter Apparatus 100)
The transmitter apparatus 100 is an apparatus that executes a program imposed on a transmitter as described in the above description.

As shown in FIG. 18, the transmitter apparatus 100 comprises an acquisition part of transmitting data 101, a generator part of a transmitting signal 102, and a transmitter part 103 as an example.

(The Acquisition Part of Transmitting Data 101)
The acquisition part of transmitting data 101 makes acquisition of data to be transmitted; The transmitting data is, e.g., acoustic data, image data, and may be text data such as any digitized data.

If the transmitter-receiver system with the number 1 is used for radar, then the transmitting data may be a radar pulse wave.

(The Generator Part of a Transmitting Signal 102)
The generator part of a transmitting signal 102 performs signal processing transmitting data obtained by the acquisition part of transmitting data 101 and generates a transmitting signal.

The generator part of a transmitting signal 102 comprises SFBs as shown in FIGS. 4-7 or at least one of them as an example.

As above mentioned, an example of processing for generators of a signal to be transmitted is the modulation by TD- and FD-phase code (PC)s of periods N,N', i.e., 2-D BPSK modulation.

Examples of a transmitting signal generated by the generator part of a signal to be transmitted 102 are e.g., as mentioned above

[MF881]

TD, FD pulse waveforms: $g[k]$, $G[\ell]$,
TD, FD templates: $u_m^{(3)}[k; X]$, $U_m^{(4)}[\ell; X']$,
TD, FD signatures: $v[k; \chi]$, $V[\ell; \chi]$,
TD, FD signals to be transmitted: $s[k; \chi]$, $S[\ell; \chi]$,
CE of $s[k; \chi]$, FT of $\psi[k; \chi]$:$\psi[k; \chi]$, $\Psi[\ell; \chi]$, The inventor can enumerate processing, described in the subsection <4. signature waveforms and templates in TD and FD> as concrete examples of processing in the generator part of a transmitting signal.

The generator part of a signal to be transmitted with the number 102 may be an apparatus that executes a program imposed on a transmitter as described in subsection <7.1 transmitters for generating signature and radar signal>. Or the generator part of a signal to be transmitted with the number 102 may be an apparatus that executes a program imposed on a transmitter apparatus as described in subsections <8.1 multiple target detection using CDMT> and <8.2 multiple target detection using artificial delay-Doppler>.

(Transmitter Part 103)

The transmitter part 103 transmits a transmitter signal generated by the generator part of a signal to be transmitted with the number 102.

(Receiver Apparatus 200)

The receiver apparatus 200 is an apparatus that executes a program imposed on a receiver as described in the above description.

As shown in FIG. 18, the receiver apparatus 200 comprises the receiver part 201, the shift estimation and received-data extraction parts 202, and the received-data decision part 203 as an example.

(Receiver Part 201)

The receiver part 201 receives a transmitter signal, transmitted by the transmitter apparatus 100. Examples of a received signal that the receiver part 201 receives are e.g., as mentioned above

[MF882]

$$\text{received TD-, FD-signals:} r[k;\chi], R[\ell;\chi],$$

(Shift Estimation and Received-Data Extraction Parts 202)

The shift estimation and received-data extraction parts 202, (simply called the estimation part) shifts a received signal by the receiver part 201 by estimated shifts and extract the received data.

The shift estimation and received-data extraction parts 202 comprises at least one of AFBs shown in FIGS. 8 to 10, as an example. The shift estimation and received-data extraction parts 202 executes several programs e.g., as described in subsections <5. M-ary detection and estimation of TD and FD signals> and <6. TD and FD cross-correlations for parameter estimation>.

The shift estimation and received-data extraction parts 202 is an apparatus that executes a program as described in subsection <7.2 AFB; receivers and encoder design>. Moreover, the generator part of a signal to be transmitted 102 is an apparatus that executes a program as described in subsection <8.2 High M-PSK communication based on exploiting non-commutative time-frequency shifts>.

Thus, the shift estimation and received-data extraction parts 202 is a method for receiving a signal and executes a program according to the estimation step for estimating a time shift and a frequency shift from a received signal (cf. FIG. 13 and (38), (43) (or (89), (90)), corresponding to switches 2-1, 2-2 on the upward (or downward) side by referring to a non-commutative shift parameter space of co-dimension 2 (cf. FIG. 17).

The generator part of a signal to be transmitted 102 executes a program according to the shift steps for time-frequency shifting the signal to be transmitted (cf. FIG. 12 and (25), (27) (or (87), (88))), corresponding to switches 1-1,1-2 are on the upward (or downward) side by referring the non-commutative shift parameter space of co-dimension 2 (cf. FIG. 17).

The non-commutative shift parameter space of co-dimension 2 is a 3-dimensionalized space version of the 2-D time-frequency plane with the time- and frequency-coordinates by augmenting non-commutative time-frequency shifts as a third coordinate (cf. FIG. 17).

As above mentioned, a pair of unknown delay and Doppler

[MF883]

$$(k_d, \ell_D)$$

is itself the pair of non-commutative shifts on the parameter space of co-dimension 2 like the pair of AC shifts. The parameter space is related to the shift operations acting on a signal on the time-frequency plane (TFP); Such a "shift plane" should be discriminated against the TFP (FIG. 16). Namely, to draw a distinction between four fundamental arithmetic operations as well as differential and integral calculus in terms of variables time t, frequency f and non-commutative shift operations for calculating phase terms, one should notice that the NCP of the shift operation is peculiarity of the proposed time-frequency analysis (e.g., the third coordinate of FIG. 17).

Several comments to the patent[6]-patent[8] are listed as follows.

a) The phase distortion (PD)

[MF884]

$$e^{i2\pi t_d f_D}$$

(or its discretized version

[MF885]

$$W^{k_d \ell_D}$$

that the modulation and demodulation by the carrier $f_c$ accompanied by the delay $t_d$ (or $k_d$) are causing was neglected in the above patents. While in this disclosure, this PD and the PD $e^{i\kappa}$ of the attenuation factor $Ae^{i\kappa}$ are jointly and co-operatively canceled out. The reason that the co-operative treatment of PDs is needed is as follows; Firstly, each PD is not independent of each other; Secondly, the PD is propagated due to its group-theoretic property; Thus it is not an easy task to cancel out these PDs precisely. Consequently, the process in updating estimates of time and frequency shifts should be undertaken in co-operation with the phase cancellations (i.e., simultaneous and parallel processing is necessary: e.g., (59)).

b) Time and frequency shifts in this disclosure are referred to as variables of the parameter space of co-dimension 2, associated with two variables: time and frequency on the signal's TFP, respectively. The non-commutative shift operations induce the PDs. While, time and frequency offsets in communication are deviations from the pulse's period and the carrier, respectively.

(1) the estimated time and frequency offsets in patents[7, 8] and time and frequency offsets in OFDM-based communication system in patents[7] are deviations from the period of a chip pulse and the carrier, respectively and correspond to the time shift $t_d$ and the frequency shift $f_D$ in this disclosure, respectively. Namely, the above both of two patents can be regarded as conventional acquisition and tracking methods for synchronisation because these are unaware of the non-commutativity of $t_d$, $f_D$.

(2) To avoid confusion between the intended shifts and offsets, the inventor uses the term: not the offsets but "half-shifts of the exponent of the exponential function" (in the sense that the conventional shifts are halved). One of main features in this disclosure is to design a transmitting signal so that its phase function always contains half shifts beforehand and to cancel out the PDs based on the group-theoretic property of the NCP of TFSs.

c) The patent[8] discussed the preamble of the received signal as a template signal only in TD but was unaware of signals in FD and gave a conventional channel estimation method, being unaware of the NCP.

(1) In order to give a convergence proof of the phase updating loop (PUL) algorithm, proposed in the reference patent[6], the inventor 1) defines subspaces of the Hilbert space $\varepsilon_i$, $1 \le i \le 4$ to which the template belongs; 2) shows that each of N' TD-CCFs, CCFs of type 3 (or CCFs of type 1) yields a projection operator $P_3$ (or $P_1$) projecting onto NMΔt- (or LΔt-)time limited (TL) Hilbert subspace $\varepsilon_3$ (or $\varepsilon_1$) and that each of N FD-CCFs, CCFs of type 4 (or CCFs of type 2) gives a projection operator $P_4$ (or $P_2$) projecting onto N'M'Δf- (or LΔf-) band limited (BL) Hilbert subspace $\varepsilon_4$ (or $\varepsilon_2$); 3) proves that the PUL algorithm using the localization operator (LO), i.e., the von Neumann's alternative projection Theorem (APT) operator $P_3F^{-1,d}P_4F^d$ (or $P_4F^dP_3F^{-1,d}$) for 2-D template matching on the TFP converges on the intersection of the TL Hilbert subspace and the BL Hilbert subspace ($F^{-1,d},F^d$ denote IDFT and DFT); furthermore, 4) shows that the interaction is empty by the Youla's theorem and that the PUL can give estimates of $t_d$, $f_D$ with precision within time duration LΔt and bandwidth LΔf of a Gaussian chip waveform and with computational complexity of but O[N+N'] of not O[N×N'], where N,N' denote the numbers of TD- and FD-CCFs (L=(ΔtΔf)$^{-1}$=MM').

(2) The MMSE algorithm for estimating the channel characteristics, proposed by the patent[8] is based on Bayes's rule and 2-parameter estimation method. Thus this algorithm has computational complexity of O[N×N']. While this disclosure uses a large number of likelihood functional (LF)s that comprises N' TD-LFs for estimating Doppler and N FD-LFs for estimating delay. Each LF is based on Bayes's rule. One TD-LF among TD-LFs and FD-LF among FD-LFs in TL-TD and BL-FD Hilbert subspaces, respectively are chosen alternatively and in the sense of maximum likelihood estimate (MLE). Thus the alternative algorithm with computational complexity of O[N+N'] is radically different from conventional methods.

The shift estimation and received-data extraction parts 202 executes a program e.g., a program according to the estimation step for estimating a time shift and a frequency shift from a received signal, as described in (84) and its related description. The estimation step uses the TFSO of type-1 with estimated time shift and frequency shift
[MF886]

$$T^d_{\hat{t}_{d,i},\hat{\ell}_{p,i}}$$

and the TFSO of type-2 with time shift and estimated frequency shift
[MF887]

$$T^{f,d}_{\hat{\ell}_{D,i},-k_{\sigma,i}}$$

and estimates a time shift and a frequency shift that are embedded in the received signal.

The estimation step mentioned above uses 4 different types of TFSOs: a TFSO of type-1 with estimated time shift, frequency shift, and a phase term representing a half shift of the estimated time shift
[MF888]

$$T^d_{\hat{t}_d,\ell_p}$$

a TFSO of type-2 with time shift, estimated frequency shift, and a phase term representing a half shift of the estimated frequency shift
[MF889]

$$T^{f,d}_{\hat{\ell}_D,-k_\sigma}$$

a TFSO of type-3 with an observable time shift to be estimated, an observable frequency shift to be estimated, and a phase term representing a half shift of the time shift to be estimated
[MF890]

$$T^d_{\hat{k}_a,\hat{\ell}_D}$$

(or a frequency dual of the TFSO of type 3
[MF891]

$$T^{f,d}_{\hat{\ell}_D,-\hat{k}_\sigma}),$$

and a TFSO of type-4 representing the estimated time shift, the estimated frequency shift, and the phase term due to the half shift of the estimated time shift
[MF892]

$$T^d_{\hat{k}_d,\hat{\ell}_D}$$

(or a frequency dual of the TFSO of type 4
[MF893]

$$T^{f,d}_{\hat{\ell}_D,-\hat{k}_\sigma}),$$

and estimates a time shift and a frequency shift that are embedded in the received signal.

The phase function of a TD-signal to be transmitted contains the phase term representing half shifts of one or more time shift-parameters; The phase function of an FD-signal to be transmitted contains the phase term representing half shifts of one or more frequency shift-parameters.

The receiver apparatus 200 mentioned above can realize a receiving apparatus with high efficiency. For example, when the receiver 200 is used for a radar receiver, it becomes a high rate receiving apparatus.

As described in (84) and its related description, in the estimation step above in the program that the shift estimation and received-data extraction parts 202 executes, the receiver uses the CCF of type-1 (C.f., MF309, (38)) that is represented by using the TFSO of type-1 mentioned above
[MF894]

$$c^{(3)}_{\rho',\vec{p}}(\ell_{u,i};\hat{k}_{d,i})$$

and the CCF of type-2 (C.f., MF336, (43)) that is represented by using the TFSO of type-2 mentioned above
[MF895]

$$C^{(4)}_{\rho,\vec{p}}(k_{\sigma,i};\hat{\ell}_{D,i}),$$

refers to these CCFs, and estimates a time shift and a frequency shift that are embedded in the received signal as an example.

As mentioned above, the above CCF of type-1 can be represented by (c.f., MF309, (38))
[MF896]

$$c^{(3)}_{\rho',\vec{p}}(\ell_\mu;\hat{k}_d) = Ae^{i\kappa}W^{k_d\ell_c} \times \sum_{k\in Z} T^d_{\hat{k}_d,\ell_D}\psi[k;\chi]\left(W^{\hat{k}_d,\ell_c}T^d_{\hat{k}_d,\ell_p}T^d_{pNM,p'N'M'}T^d_{0,p'M'}Y'_{p'}u^{(3)}_{p'}[k;Y]\right)^*,$$

and the above CCF of type-2 can be represented by (c.f., MF336, (43))
[MF897]

$$c^{(4)}_{\rho',\vec{p}}(\ell_\sigma;\hat{\ell}_D) = Ae^{i\kappa}W^{k_d\ell_c} \times \sum_{\ell\in Z} T^{f,d}_{\hat{\ell}_D,-k_d}\Psi[\ell;\chi]\left(W^{k_\sigma,\ell_c}T^{f,d}_{\hat{\ell}_D,-k_\sigma}T^{f,d}_{p'N'M',\cdots pNM}T^{f,d}_{0,\cdots pM}Y_p U^{(4)}_p[\ell;Y']\right)^*.$$

In the estimation step above in the program, the receiver apparatus 1) uses the CCF of type-1 with AC shifts that is represented by using the TFSO of type-1, of type-3, and of type-4, mentioned above, (cf. MF715, (89)).

[MF898]

$$c^{AC,(3)}_{p',p,j,j'}(\ell_\mu; \hat{k}_d, j, j') = Ae^{i\kappa} W^{k_d \ell_c} \sum_{k \in Z} \mathcal{T}^d_{k_d, \ell_D} \Psi^{AC}\left[k; \{\chi^{(i)}\}_{i=0}^{\{\frac{M-1}{M_0}\}}, j, j'\right] \times \left(W^{\hat{k}_d \ell_c} \mathcal{T}^d_{\hat{k}_d, \ell_p} W^{-\hat{j}'}_{M_0} \mathcal{T}^d_{k^{(j)}_d, \ell^{(j)}_D} \mathcal{T}^d_{pNM, p'N'M'} \frac{X^{(j)'}_{p'}}{\sqrt{N_1}} \sum_{n \in I^{(j)}_T} \mathcal{T}^d_{nM, \rho'M'} X^{(j)}_n g[k]\right)^*,$$

and the above CCF of type-2 with AC shifts that is represented by using the TFSO of type-2, of type-3, and of type-4, mentioned above, (cf. MF715, (90)).

[MF899]

$$c^{AC,(4)}_{p,p,j,j'}(k_\sigma; \hat{\ell}_D, j, j') = Ae^{i\kappa} W^{k_d \ell_c} \sum_{\ell \in Z} \mathcal{T}^{f,d}_{\ell_D, \cdots \ell_D} \Psi^{AC}\left[\ell; \{\chi^{(i)}\}_{i=0}^{\{\frac{M-1}{M_0}\}}, j, j'\right] \times \left(W^{k_\sigma \ell_c} \mathcal{T}^{f,d}_{\hat{\ell}_D, \cdots k_\sigma} W^{-\hat{j}'}_{M_0} \mathcal{T}^d_{\ell^{(j)}_D, \cdots k^{(j)}_d} \mathcal{T}^{f,d}_{p'N'M', -pNM} \frac{X^{(j)}_p}{\sqrt{N_1}} \sum_{n' \in I^{(j)}_F} \mathcal{T}^{f,d}_{n'M', -\rho M} X^{(j)'}_{n'} G[\ell]\right)^*,$$

2) refers to these CCFs, and 3) estimates a time shift and a frequency shift that are embedded in the received signal as an example.

As described above, the TD-CCF of type-1 with AC shifts (see MF715, (89)) and the FD-CCF of type-2 with AC shifts (see MF715, (90)) contain the PD due to the NCP of modulation and demodulation by the carrier $f_c$ (or $1_c$), accompanied by the delay $t_d$ (or $k_d$)

[MF900]

$$e^{i2\pi t_d f_c}$$

or its discretized version

[MF901]

$$W^{k_d \ell_c}$$

and the PD due to the phase term $e^{i\kappa}$ of the attenuation factor $Ae^{i\kappa}$.

As described in MF400, (cf. (60), (61)) and in its related description, the shift estimation and received-data extraction parts 202 updates a pair of the estimated delay and estimated Doppler

[MF902]

$$(\hat{k}_{d,s}, \hat{\ell}_{D,s+1})$$

or

[MF903]

$$(\hat{k}_{d,s+1}, \hat{\ell}_{D,s})$$

by using the recursion formula for the CP (the AC shift version of (60), MF400, but the AC shift version of the formula for the OP (61) is omitted)

[MF904]

$$(\rho'^*, \ell^*_\mu, \hat{j}^*, \hat{j}'^*) = \mathrm{argmax}_{\rho', \ell_\mu, j, j'} \Re \frac{\sqrt{PP} \, c^{AC,(3)}_{\rho',p,j,j'}(\ell_\mu; \hat{k}_d, j, j')}{X'_{\rho'} \hat{A}(\theta'^{,d}_s) e^{i\hat{\kappa}(\theta'^{,d}_s)}},$$

$$(\rho^*, k^*_\sigma, \hat{j}^*, \hat{j}'^*) = \mathrm{argmax}_{\rho, k_\sigma, j, j'} \Re \frac{\sqrt{PP} \, C^{AC,(4)}_{\rho,p,j,j'}(k_\sigma; \hat{\ell}_D, j, j')}{X_\rho \hat{A}(\theta'^{,d}_s) e^{i\hat{\kappa}(\theta'^{,d}_s)}}$$ (109)

for the CP and sets the pair of the MLEs

[MF905]

$$(\ell^*_\mu, k^*_\sigma)$$

to the the pair of two estimates

[MF906]

$$(\hat{k}_{d,s+1}, \hat{\ell}_{D,s+1}).$$

Furthermore, executions in the shift estimation and received-data extraction parts 202 are 1) to refer to the TD-CCF of type-1 with AC shifts (cf. MF715, MF898, (89))

[MF907]

$$c^{AC,(3)}_{\rho',p}(\ell_\mu; \hat{k}_d, j, j')$$

whose real part is maximized by varying $\ell_\mu$; 2) to determine the MLE

[MF908]

$$\ell^*_\mu$$

and 3) to set it to

[MF909]

$$\hat{\ell}_{D,s+1}.$$

Other executions in the parts 202 are 1) to refer to the FD-CCF of type-2 with AC shifts (cf. MF715, MF899, (90))

[MF910]

$$C^{AC,(4)}_{\rho,p}(k_\sigma; \hat{\ell}_D, j, j')$$

whose real part is maximized by varying $k_\sigma$; 2) to determine the MLE

[MF911]

$$k^*_\sigma$$

and 3) to set it to

[MF912]

$$\hat{k}_{d,s+1}.$$

Thus the execution in the shift estimation and received-data extraction parts 202 is to alternatively update estimates of a time shift and a frequency shift.

The above estimation step in the shift estimation and received-data extraction parts 202 estimates the time shift and the frequency shift that are embedded in the signal, with use of MLEs of frequency shift for detecting N' TD-templates and MLEs of time shift for detecting N FD-templates.

Furthermore, in the above estimation step in the shift estimation and received-data extraction parts 202, when referring to the TD-CCF of type-1 with AC shifts (cf. MF715, MF898, (89))

[MF913]

$$c^{AC,(3)}_{\rho',p}(\ell_\mu; \hat{k}_d, j, j')$$

and the FD-CCF of type-2 with AC shifts (cf. MF715, MF899, (90))
[MF914]

$$C_{\rho,\vec{p}}^{AC,(4)}(k_\sigma;\vec{\ell}_D,j,j'),$$

the receiver apparatus firstly replaces the rhs of the first equation of (60)
[MF915]

$$C_{\rho',\vec{p}}^{(3)}$$

and the rhs of the second equation of (60)
[MF916]

$$C_{\rho,\vec{p}}^{(4)}$$

by the associated CCFs with AC shifts and secondly applies the argmax operation to those CCFs with AC shifts, and thirdly augments variables of the argmax operation by a pair of two estimated integers(cf. MF904, (109))
[MF917]

$$(\hat{j},\hat{j}').$$

The receiving apparatus in the above estimation step in the shift estimation and received-data extraction parts 202 is a receiver part of receiving a signal
[MF918]

$$\text{TD-CE}\psi^{AC}[k]/\text{FD-CE}\Psi^{AC}[\ell]$$

that is the output signal of the j-th AC with delay and Doppler shifts
[MF919]

$$(k_d^{(j)}, \ell_D^{(j)})$$

having an integer j, one of two encoded integers by an encoder of k for
[MF920]

$$\mathcal{M}$$

-ary communication.

In accordance with an embodiment of the present invention, as discussed above, the receiving apparatus that is an apparatus of receiving a signal comprises an estimation part for estimating a time shift and a frequency shift that are embedded in the signal, with reference to a non-commutative shift parameter space of co-dimension 2.

Furthermore, in the MLE, the transmitting TD- and FD-CE signals (87) (or (27)) (according to the state that the switches 1-1,1-2 in the transmitter of FIG. 12 are on the downward or upward side, respectively, the degree of multiplexing is varied) are given by multiplexing their associated TD- and FD-signatures (88) (or (25)). While the signatures themselves are obtained by 2-D BPSK modulating a Gaussian function and its FD function by 2-D PCs. As shown in (87), the transmitting TD- and FD-CE signals for
[MF921]

$$\mathcal{M}$$

-ary communication are obtained as follows; The TD- and FD-signatures first are multiplexed using 2-D BPSK modulation by the j-th PC chosen among the set of independent 2-D PCs
[MF922]

$$\{\chi^{(i)} = (\{X_m^{(i)}\}, \{X_{m'}^{\prime(i)}\})\}_{i=0}^{\{\frac{M-1}{M}\}}$$

according to the encoded integer pair of k
[MF923]

$$j = \left[\frac{k}{M_0}\right], j' = \left\{\frac{k}{M_0}\right\},$$

and secondly, are passed to the AC channel with its associated time and frequency shifts
[MF924]

$$(k_d^{(j)}, \ell_D^{(j)})$$

or equivalently the transmitter makes the associated TFSOs
[MF925]

$$T_{k_d^{(j)},\ell_D^{(j)}}^{d} \text{ (or } T_{\ell_D^{(j)},-k_d^{(j)}}^{t,d})$$

act on the multiplexed TD- or FD-signature.

In accordance with an embodiment of the present invention, as discussed above, the transmitting method that is a method for transmitting a signal to be transmitted comprises a shift step for time-frequency shifting the signal to be transmitted, with reference to a non-commutative shift parameter space of co-dimension 2.

Furthermore, in the above MLE step, when using the CCFs in (89), (90) that are cross-correlations between the received signal
[MF926]

$$\text{TD-CE}\psi^{AC}[k]/\text{FD-CE}\Psi^{AC}[\ell],$$

being passed through the AC channel with its associated time and frequency shifts
[MF927]

$$(k_d^{(j)}, \ell_D^{(j)}),$$

characterized by the encoder of k for
[MF928]

$$\mathcal{M}$$

-ary communication and an estimated received template (the first and second terms of the rhss of (89), (90) indicate a transmitting signal and an estimated received template, respectively), one should notice the fact that the symbol $\Sigma$ in (87)-(90) implies the multiplexing, being equivalent to the non-overlapped superposition of a signal, and that such multiplexing can be simulated by using several kinds of TFSOs. In the generation process of a transmitting signal in FIG. 12, several kinds of multiplexing are performed. In (87), (88), TD- and FD-signatures are obtained by multiplexing 2-D BPSK modulated TD- and FD-chip waveforms by 2-D PCs
[MF929]

$$\chi^{(i)} = (\{X_m^{(i)}\}, \{X_{m'}^{\prime(i)}\})$$

respectively of periods
[MF930]

$$N_1 = N/\sqrt{\left[\frac{M-1}{M_0}\right]+1}, N_1' = N'/\sqrt{\left[\frac{M-1}{M_0}\right]+1}.$$

The transmitting TD- and FD-CE are obtained by time-frequency shifting the resultant TD- and FD-signatures by data level-shifts and multiplexing those signatures. If the superposition of signals is simply done without the use of time and frequency shifts, then the detection of templates is difficult; One should pay the price for the PDs due to shift operations: It is, however, obvious that fortunately, the PDs are valuable clues in detecting templates and thus the TFSOs are essential tools for precise evaluations of PDs and canceling out the PDs. Furthermore, the rhss of (89), (90)

contain the PD due to modulation and demodulation by the carrier $\ell_c$, accompanied by the delay $k_d$
[MF931]

$$W^{k_d;\ell_c}$$

and the compensation
[MF932]

$$M_0\text{-ary } W_{M_0}^{-j'}$$

for canceling out the PD due to the phase modulation by the encoded integer j' of k
[MF933]

$$M_0\text{-ary } W_{M_0}^{-j'}, \; j' = \left\{\frac{k}{M_0}\right\}.$$

As shown above, the shift step generates the signal to be transmitted by PSK-modulating a chip pulse wave in the TD by the TD-PC of period N and PSK-modulating the TD-PSK modulated TD-pulse wave by the FD-PC of period N' to generate a multicarrier version of the TD-PSK modulated TD-pulse wave that is a transmitting signal.

In accordance with an embodiment of the present invention, in the transmitting apparatus in accordance with an embodiment of the present invention, the transmitter, when the switches 1-1,1-2 are on downward in FIG. 12, first PSK modulates a TD-chip waveform by a TD-PC of period N and secondly PSK modulates the PSK modulated signal by an FD-PC of period N', thirdly multiplexes the doubly-modulated multi-carrier signal by data symbols, and fourthly passes the data-multiplexed signal through the AC with shifts
[MF934]

$$(k_d^{(j)}, \ell_D^{(j)}),$$

having the encoded integer j of k
[MF935]

$$j = \left[\frac{k}{M_0}\right].$$

The output signal of the AC gives
[MF936]

$$\text{TD-CE}\psi^{AC}[k]/\text{FD-CE}\psi^{AC}[\ell].$$

In accordance with an embodiment of the present invention, in the receiver apparatus in accordance with an embodiment of the present invention, the receiver, when the switches 2-1,2-2 switch on downward in FIG. 13, the receiver performs maximization of the real parts of the CCFs (cf. MF715, (89), (90)) in terms of 4 variables of the argmax operation
[MF937]

$$(\rho', \vec{p}, \hat{j}, \hat{j}')(\text{or } (\rho', \vec{p}, \hat{j}, \hat{j}')).$$

If the PUL algorithm for updating MLEs
[MF938]

$$(k^*_\sigma, \ell^*_\mu)$$

converges, then the data symbol
[MF939]

$$d_{\vec{q}}$$

can be recovered and the decoding of k can be done.

In accordance with an embodiment of the present invention, the generalization of several apparatuses with applications to images in subsection 8.3 is a natural 2-D extension of 1-D signal, exploiting the half shifts due to the NCP of the space-spatial frequency shift (SSFS)s (see (102)-(108)).

(An Extended Version of an Embodiment for Images)
In accordance with an embodiment of the present invention, this disclosure gives a method for receiving an image that comprises an estimation step for estimating a space shift and a spatial frequency shift that are embedded in the received image signal, with reference to a parameter space of co-dimension 2, wherein each of the space shift and the spatial frequency shift has dimension ≥2.

(An Extended Version of an Embodiment for Images)
In accordance with an embodiment of the present invention, the receiver in the above estimation step refers to the 2×2-D symmetrical SSFS operator (SSFSO)s
[MF940]

$$\mathcal{T}_{a_i,b_i}^{(2),d}$$

and its frequency dual
[MF941]

$$\mathcal{T}_{b_i,-a_i}^{(2),fd}$$

and estimates space shifts and spatial frequency shifts.

(An Extended Version of an Embodiment for Images)
In accordance with an embodiment of the present invention, this disclosure gives a method for transmitting an image signal, comprising a shift step for space-spatial frequency shifting the image signal to be transmitted, with reference to a parameter space, wherein each of the space shift and the spatial frequency shift has dimension ≥2.

(An Extended Version of an Embodiment for Images)
In accordance with an embodiment of the present invention, the transmitter in the above estimation step refers to the 2×2-D symmetrical SSFS operator (SSFSO)s
[MF942]

$$\mathcal{T}_{a_i,i}^{(2),d}$$

and its frequency dual
[MF943]

$$\mathcal{T}_{b_i,-a_i}^{(2),fd}$$

and space- and spatial frequency-shifts an image.

(The Received-Data Output Part 203)
The received-data output part 203 outputs the extracted data by the shift estimation and received-data extraction parts 202

<The Signal Flow-Chart Between a Transmitter and a Receiver>
FIG. 19 shows a flow-chart of transmitter-receiver using the transmitter-receiver system with the number 1.

(S101)
In the step S101, the data acquisition part 101 gets data to be transmuted. Concrete procedures by the part 101 have been described above.

(S102)
In the step S102, the signal generation part 102 generates a signal to be transmitted. Concrete procedures by the part 102 have been described above.

(S103)
In the step S103, the transmitter part 103 transmits the signal to be transmuted. Concrete procedures by the part 103 have been described above.

(S201)
In the step, the receive part 201 receives a transmitted signal by the transmitter part S103. Concrete procedures by the part 201 have been described above.

(S202)

In the step S202, the shift estimation and received-data extraction parts 202 estimates shifts and extracts received data, simultaneously. Concrete procedures in the shift estimation and received-data output part 202 are as described above.

(S203)

In the step S203, the received-data output parts 203 outputs the received data extracted by the shift estimation and received-data extraction parts 202. Concrete procedures in the received-data output part 203 are as described above.

Example 2 of Embodiments of Communication Systems

The example 1 of embodiments of communication systems that is based on the theoretical basis as explained above is explained, together with cited figures.

FIG. 20 shows a block-diagram representing the transmitter-receiver system with the number 1a attached to its surrounding dotted line, according to an embodiment of the present invention. As shown in FIG. 20, the system with the number 1a comprises a transmitter apparatus 100a and a receiver apparatus 200a. The transmitter-receiver system with the number 1a, like the transmitter-receiver system with the number 1 in FIG. 18 as discussed above, can be used for both a radar and a communication system (e.g., transmitter-receiver system to convey voice data and or image data). Other parts are labelled with the same number as their associated parts in the transmitter-receiver system with the number 1 and hence no explanation for them is necessary.

<Transmitter Apparatus 100a>

The transmitter apparatus 100a is an apparatus that executes a program imposed on a transmitter as described in the above description.

As shown in FIG. 20, the transmitter apparatus 100a comprises the acquisition part of transmitting data 101, the generator part of a transmitting signal 102a, and the transmitter part 103 as an example.

(The Transmitting Signal Generation Part 102a)

the transmitting signal generation part 102a comprises the generator part of a transmitting signal 102 relating to the example 1 of embodiments of transmitter-receiver system and the embedding shift part 110 as well.

As discussed in (84) just below, the embedding shift part 110 generates a transmitting signal into which a set of $N_{path}$ delay and Doppler parameters

[MF944]

$$\{(k_{d,i}, \ell_{D,i})\}_{i=1}^{N_{path}}.$$

are embedded.

The generator part of a transmitting signal 102a time-frequency shifts a signal to be transmitted by using one time shift (or multiple time shifts) and one frequency shift (or multiple frequency shifts)

[MF945]

$$\{(k_{d,i}, \ell_{D,i})\}_{i=1}^{N_{path}}.$$

<Receiver Apparatus 200a>

The receiver apparatus 200a is an apparatus that executes a program imposed on a receiver as described in the above description.

As shown in FIG. 20, the receiver apparatus 200a comprises a receiver part 201, a shift estimation and received-data extraction parts 202a, and a received-data decision part 203 as an example (The Shift Estimation and Received-Data Extraction Parts 202a)

The shift estimation and received-data extraction parts 202a comprises the parts similar as parts that the shift estimation and received-data extraction parts 202 comprises, relating to the example 1 of embodiments of transmitter-receiver system as an example.

<The Signal Flow-Hart Between a Transmitter and a Receiver>

FIG. 21 shows a flow-chart of transmitter-receiver using the transmitter-receiver system with the number 1a. The steps S101, S103, S201, and S203 are same processing as the description using FIG. 19 and hence no explanation for them is necessary.

(S102a)

In the step S102a, the generator part of a transmitting signal 102a with the embedding-shift part 110 generates a transmitting signal. Concrete procedures by the generator part of a transmitting signal S102a have been described above.

(S202a)

In the S202a, the shift estimation and received-data extraction parts 202a estimates shifts and extracts the received data, simultaneously. Concrete procedures in the shift estimation and received-data extraction parts 202a are as described above.

<<Example 3 of Embodiments of Communication Systems>>

The transmitter-receiver system that is explained by referring to FIGS. 18-21 may be an embodiment that executes programs as described in subsection <8.3 signal processing exploiting multi-dimensional non-commutative apatial-spatial frequency shifts>:

As described in subsection <8.3 signal processing exploiting multi-dimensional non-commutative spatial-spatial frequency shifts>, the received apparatus 200 executes the estimation step for estimating SSFSs that are embedded in the received images by referring to the parameter space, i.e., SSFS parameter space of co-dimension ≥2 as an example.

As described in subsection <8.3 signal processing exploiting multi-dimensional non-commutative spatial-spatial frequency shifts>, the above estimation step, the receiver refers to the 2×2-D symmetrical spatial shift and spatial frequency shift (SSFS) operator (SSFSO)s representing the half-shift-PDs due to the NCP of the SSFSs

[MF946]

$$\mathcal{T}_{a_i,b_i}^{(2),d}$$

and its frequency dual

[MF947]

$$\mathcal{T}_{b_i,-a_i}^{(2),fd}$$

and estimates SSFSs.

Similarly, in accordance with an embodiment of the present invention, the transmitter, i.e., the method for transmitting an image refers to the SSFS parameter space of co-dimension ≥2 and comprises 2 different SSFSOs that represent spatial-spatial frequency shifting an image to be transmitted and the PD due to the half-shift of the spatial frequency shift (or the PD due to the half-shift of the spatial shift).

In the above shift step, the transmitter refers to the symmetrical SSFSOs

[MF948]

$$\mathcal{T}_{a_i,b_i}^{(2),d}$$

and its frequency dual
[MF949]

$$T_{b_i,-a_i}^{(2),f,d}$$

and estimates SSFSs.

Example of Embodiments Using Software

The control-block in the transmitter apparatuses 100, 100a and the receiver apparatuses 200,200a (in particular, the generator parts of a transmitting signal 102, 102a and the shift estimation and received-data extraction parts 202,202a) may be realized by logical circuits implemented by integrated circuit (IC chip)s or by software.

In the case of the implementation by software, the transmitter apparatuses 100, 100a and the receiver apparatuses 200,200a are equipped with a computer that executes programs for each of several functions; e.g., this computer comprises multiple processors and computer-readable memories. The computer executes the programs that the processors read from the memories so that it can perform the aim of the present invention. non-transitory memory, e.g, read-only-memory (ROM), tape, disc, card, IC memory, and programmable logical circuits, etc are used for the memories. The computer may be equipped with random access memory (RAM) performing the above programs. The above programs may be installed via any transmission media (such as communication network, broadcast, radio wave) and supplied by the above computer. In accordance with an embodiment of the present invention, the above program that may be embodied in an embedded data signal into a carrier wave by electronic transmission and may be realized.

Program products by computer that realize several functions of the transmitter apparatuses 100, 100a and the receiver apparatuses 200,200a include one of embodiments of the present invention. The above program product by computer loads programs that are provided by any transmission media by using at least one computer and makes the computer to execute at least one program. Thus, at least one processor associated with the computer executes at least one program. Thus each of functions of the transmitter apparatuses 100, 100a and the receiver apparatuses 200,200 can be realized. The program product by computer makes at least one of program-installed computers to execute steps in transmitting process(method of transmission) and receiving process(method of receiving).

In accordance with an embodiment of the present invention, the above mentioned embodiments have no limitation. The embodiments are modified within the claims. Comprising several methods or techniques given in different embodiments leads to an embodiment of the present patent and includes one of methods of the present patent. Furthermore, adequate comprising several methods or techniques given in different embodiments may provide a new technical characteristic feature.

INDUSTRIAL APPLICATION

The present patent is ideally suited to wireless transmitter-receiver communication systems and to radar systems.

LIST OF SYMBOLS FOR PARTS OF EMBODIMENT

1,1a: transmitter-receiver system
100,100a: transmitter apparatus
101: acquisition part of transmitting data
102,102a: transmitting signal generation part
103: transmitter part
110: embedding-shift part
200,200a: receiver apparatus
201: receiver part
202,202a: shift estimation and received-data extraction parts (estimation part)
203: received-data decision part

What is claimed is:

1. A method for receiving a signal, comprising receiving a signal at a receiver apparatus, and performing an estimation step at the receiver apparatus for estimating a time shift and a frequency shift that are embedded in the signal, wherein the estimation step refers to a non-commutative shift parameter space of co-dimension 2, and in the estimation step, the time shift and the frequency shift that are embedded in the signal are estimated with an operator including a half shift that is a shift symmetrical in time and frequency.

2. The method recited in claim 1, wherein the non-commutative shift parameter space of co-dimension 2 is a space obtained by 3-dimensionalizing a plane, which is defined by a first axis indicative of time and a second axis indicative of frequency, by attaching, to the plane, a third axis indicative of time-frequency shifts.

3. The method recited in claim 1, wherein the estimation step estimates the time shift and the frequency shifts that are embedded in the signal, with use of a time-frequency shift operator(TFSO) of type 1 representing an estimated time shift, frequency shift, and a phase term due to a half shift of the estimated time shift

[MFC1]

$$T_{\hat{k}_d,\ell_D}^d,$$

a TFSO of type 2 representing time shift, an estimated frequency shift, and a phase term due to a half shift of the estimated frequency shift

[MFC2]

$$T_{\ell_D,-\hat{k}_n}^{i,d},$$

a TFSO of type 3 representing an observable time shift to be estimated, an observable frequency shift to be estimated, and a phase term due to a half shift of the time shift to be estimated

[MFC3]

$$T_{k_d,l_D}^{d}$$

or a frequency dual of the TFSO of type 3

[MFC4]

$$T_{l_D,-k_d}^{f,d},$$

and a TFSO of type 4 representing the estimated time shift, the estimated frequency shift, and the phase term due to the half shift of the estimated time shift

[MFC5]

$$T_{\hat{k}_d,l_D}^{d}$$

or a frequency dual of the TFSO of type 4

[MFC6]

$$T_{l_D,-\hat{k}_d}^{f,d},$$

wherein
$\hat{k}_d$ denotes an integer-valued estimate of $k_d$,
$k_d$ denotes time delay/shift,
k is an integer given by $$k=j\mathcal{M}_o+j',\ j=[k/\mathcal{M}_o],\ j'=\{k/\mathcal{M}_o\},$$

where j and j' are integers, and $\mathcal{M}_0$ denotes multiplex count, $l_\mu'$ is a maximum likelihood estimate (MLE) of $l_\mu$ for a given $\hat{k}_d$, $l_\mu$ denotes an integer-valued control parameter for estimating $l_D$, $\hat{l}_D$ is an integer-valued maximum likely estimate of $l_D$, $k_\theta$ is a maximum likelihood estimate of $k_d$ for a given $\hat{l}_D$, and $l_D$ denotes frequency delay/shift.

4. The method recited in claim 3, wherein the estimation step estimates the time shift and the frequency shift that are embedded in the signal, with use of a time-domain-cross-correlation function(TD-CCF) of type 1, represented in terms of the TFSOs of type 1, of type 3, and of type 4, and a frequency-domain-cross-correlation function(FD-CCF) of type 2, represented in terms of the TFSOs of type 2, of type 3, and of type 4.

5. The method recited claim 4, wherein the TD-CCF of type 1 and the FD-CCF of type 2 contain a phase distortion (PD) due to a non-commutative shift operation between modulation and demodulation by a carrier $f_c$ and a time shift $t_d$

[MFC7]

$$e^{j2\pi t_d f_c}$$

or a discretized version of the PD

[MFC8]

$$W^{k_d l_c},$$

and a PD due to the phase term $e^{i\kappa}$ of the attenuation factor $Ae^{i\kappa}$.

6. The method recited in claim 4, wherein the estimation step includes two alternative updating steps: (1) updating the estimated frequency shift with reference to the TD-CCF of type 1 and (2) updating the estimated time shift with reference to the FD-CCF of type 2.

7. The method recited in claim 1, wherein the estimation step estimates the time shift and the frequency shift that are embedded in the signal, with use of maximum-likelihood estimate(MLE)s of frequency shift for detecting N' time-domain(TD)-templates and MLEs of time shift for detecting N frequency-domain(FD)-templates.

8. A receiving apparatus for receiving a signal, comprising
a receiving circuitry for receiving a signal, and
an estimation circuitry for estimating a time shift and a frequency shift that are embedded in the signal, with reference to a non-commutative shift parameter space of co-dimension 2, wherein the estimation circuitry estimates the time shift and the frequency shift that are embedded in the signal with use of an operator including a half shift that is a shift symmetrical in time and frequency.

9. A method for transmitting a signal, comprising
performing shift step at a transmitter apparatus for time-frequency shifting the signal to be transmitted, with reference to a non-commutative shift parameter space of co-dimension 2, and in the shift step, a time and a frequency of the signal to be transmitted are shifted by a half shift that is a shift symmetrical in time and frequency, and
transmitting the signal at the transmitter apparatus.

10. The method recited in claim 9, wherein the shift step generates the signal to be transmitted by phase-shift-keying (PSK)-modulating a chip pulse wave in the time domain (TD) by the TD-phase code(PC) of period N and PSK-modulating the TD-PSK modulated TD-pulse wave by the FD-PC of period N' to generate a multicarrier version of the TD-PSK modulated TD-pulse wave.

11. A transmitter apparatus for transmitting a signal, comprising
a time-frequency shift circuitry for time-frequency shifting the signal to be transmitted, with reference to a non-commutative shift parameter space of co-dimension 2, wherein the shift circuitry shifts a time and a frequency of the signal to be transmitted with use of a half shift that is a shift symmetrical in time and frequency, and
a transmitting circuitry for transmitting the signal.

12. A transmitter-receiver system, comprising:
a transmitter apparatus; and
a receiver apparatus,
the transmitter apparatus including a time-frequency shift part for time-frequency shifting a signal to be transmitted, with reference to a non-commutative shift parameter space of co-dimension 2,
the receiver apparatus including an estimation part for estimating a time shift and a frequency shift that are embedded in the signal to be transmitted, with reference to the non-commutative shift parameter space of co-dimension 2.

13. A method for receiving a signal, comprising
receiving a signal at a receiver apparatus, and
performing an estimation step at the receiver apparatus for estimating a time shift and a frequency shift that are embedded in the signal, wherein the estimation step refers to a non-commutative shift parameter space of co-dimension 2,
wherein the non-commutative shift parameter space of co-dimension 2 is a space obtained by 3-dimensionalizing a plane, which is defined by a first axis indicative of time and a second axis indicative of frequency, by attaching, to the plane, a third axis indicative of time-frequency shifts.

14. A method for receiving a signal, comprising
receiving a signal at a receiver apparatus, and
performing an estimation step at the receiver apparatus for estimating a time shift and a frequency shift that are embedded in the signal, wherein the estimation step refers to a non-commutative shift parameter space of co-dimension 2,
wherein the estimation step estimates the time shift and the frequency shifts that are embedded in the signal, with use of a time-frequency shift operator(TFSO) of type 1 representing an estimated time shift, frequency shift, and a phase term due to a half shift of the estimated time shift $$\mathcal{T}_{k_d, l_\mu'}$$

a TFSO of type 2 representing time shift, an estimated frequency shift, and a phase term due to a half shift of the estimated frequency shift

[MFC2]

$$\mathcal{T}_{l_D, -k_\theta}{}^{fd},$$

a TFSO of type 3 representing an observable time shift to be estimated, an observable frequency shift to be estimated, and a phase term due to a half shift of the time shift to be estimated

[MFC3]

$$\mathcal{T}_{k_d, l_D}{}^{d}$$

or a frequency dual of the TFSO of type 3

[MFC4]

$$\mathcal{T}_{l_D, -k_d}{}^{fd},$$

and a TFSO of type 4 representing the estimated time shift, the estimated frequency shift, and the phase term due to the half shift of the estimated time shift
[MFC5]

$$\mathcal{T}_{\hat{k}_d, l_D}{}^d$$

or a frequency dual of the TFSO of type 4
[MFC6]

$$\mathcal{T}_{l_D, -\hat{k}_d}{}^{fd},$$

wherein
$\hat{k}_d$ denotes an integer-valued estimate of $k_d$,
$k_d$ denotes time delay/shift,
k is an integer given by $$k = j \mathcal{M}_0 + j', j = [k/\mathcal{M}_0], j' = \{k/\mathcal{M}_0\},$$

where j and j' are integers, and $\mathcal{M}_0$ denotes multiplex count,
$l_\mu'$ is a maximum likelihood estimate (MLE) of $l_\mu$ for a given $\hat{k}_d$,
$l_\mu$ denotes an integer-valued control parameter for estimating $l_D$,
$\hat{l}_D$ is an integer-valued maximum likely estimate of $l_D$,
$k_{o'}$ is a maximum likelihood estimate of $k_d$ for a given $\hat{l}_D$, and
$l_D$ denotes frequency delay/shift.

15. A method for receiving a signal, comprising
receiving a signal at a receiver apparatus, and
performing an estimation step at the receiver apparatus for estimating a time shift and a frequency shift that are embedded in the signal, wherein the estimation step refers to a non-commutative shift parameter space of co-dimension 2,
wherein the estimation step estimates the time shift and the frequency shift that are embedded in the signal, with use of maximum-likelihood estimate(MLE)s of frequency shift for detecting N' time-domain(TD)-templates and MLEs of time shift for detecting N frequency-domain(FD)-templates.

16. A method for transmitting a signal, comprising
performing shift step at a transmitter apparatus for time-frequency shifting the signal to be transmitted, with reference to a non-commutative shift parameter space of co-dimension 2,
wherein the shift step generates the signal to be transmitted by phase-shift-keying(PSK)-modulating a chip pulse wave in the time domain(TD) by the TD-phase code(PC) of period N and PSK-modulating the TD-PSK modulated TD-pulse wave by the FD-PC of period N' to generate a multicarrier version of the TD-PSK modulated TD-pulse wave, and
transmitting the signal at a transmitter apparatus.

* * * * *